United States Patent
Wu et al.

(10) Patent No.: US 12,516,293 B2
(45) Date of Patent: Jan. 6, 2026

(54) REAGENTS AND METHODS WITH Wnt AGONISTS AND BIOACTIVE LIPIDS FOR GENERATING AND EXPANDING CARDIOMYOCYTES

(71) Applicant: The Board of Trustees of the Leland Stanford Junior University, Stanford, CA (US)

(72) Inventors: Sean M. Wu, Stanford, CA (US); Jan W. Buikema, Stanford, CA (US); Arun Sharma, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1062 days.

(21) Appl. No.: 16/981,077

(22) PCT Filed: Mar. 15, 2019

(86) PCT No.: PCT/US2019/022469
§ 371 (c)(1),
(2) Date: Sep. 15, 2020

(87) PCT Pub. No.: WO2019/178478
PCT Pub. Date: Sep. 19, 2019

(65) Prior Publication Data
US 2021/0002615 A1    Jan. 7, 2021

Related U.S. Application Data

(60) Provisional application No. 62/644,091, filed on Mar. 16, 2018.

(51) Int. Cl.
*C12N 5/077* (2010.01)
*A61K 35/34* (2015.01)

(52) U.S. Cl.
CPC ............ *C12N 5/0657* (2013.01); *A61K 35/34* (2013.01); *C12N 2501/415* (2013.01); *C12N 2501/727* (2013.01); *C12N 2503/02* (2013.01); *C12N 2506/45* (2013.01)

(58) Field of Classification Search
None
See application file for complete search history.

(56) References Cited

U.S. PATENT DOCUMENTS

| | | | |
|---|---|---|---|
| 9,074,188 B2 * | 7/2015 | Yamashita | G01N 33/5061 |
| 2005/0261189 A1 | 11/2005 | Larsen et al. | |
| 2008/0044848 A1 | 2/2008 | Heidaran | |
| 2008/0076736 A1 | 3/2008 | Goddard et al. | |
| 2013/0244262 A1 | 9/2013 | Yamashita et al. | |
| 2014/0134733 A1 | 5/2014 | Wu et al. | |
| 2016/0194608 A1 | 7/2016 | Srivastava et al. | |

FOREIGN PATENT DOCUMENTS

| | | |
|---|---|---|
| CN | 104894058 A | 9/2015 |
| JP | 2010508846 A | 3/2010 |
| JP | 2013-544071 A1 | 12/2013 |
| WO | WO2016040895 A1 | 3/2016 |
| WO | WO 2018/035574 A1 | 3/2018 |

OTHER PUBLICATIONS

Kleger A, Liebau S, Lin Q, von Wichert G, Seufferlein T. The impact of bioactive lipids on cardiovascular development. Stem Cells Int. 2011;2011:916180. doi: 10.4061/2011/916180. Epub Aug. 2, 2011. PMID: 21876704; PMCID: PMC3159013. (Year: 2011).*

Kleger, A., et al., "The Impact of Bioactive Lipids on Cardiovascular Development", Stem Cells International, Jun. 5, 2011, pp. 1-15, vol. 20, No. 1.

Tseng, A., et al., "The GSK-3 Inhibitor Bio Promotes Proliferation in Mammalian Cardiomyocytes", Chemistry and Biology, Sep. 2006, pp. 957-963, vol. 13.

American Heart Association, Scientific Sessions, late-breaking Basic Science Abstract, 2015, e126, No. 23170.

Japanese Office Action dated Mar. 7, 2023 for Japanese Patent Application No. 2020-549020.

Uosaki, et al., "Identification of chemicals inducing cardiomyocyte proliferation in developmental stage-specific manner with pluripotent stem cells", Circ Cardiovasc Genet, Dec. 1, 2013, pp. 624-633, vol. 6, No. 6.

Buikema, et al., "Wnt/beta-catenin signaling directs the regional expansion of first and second heart field-derived ventricular cardiomyocytes", Development140, 2013, pp. 4165-4176.

Heallen et al., "Hippo pathway inhibits Wnt signaling to restrain cardiomyocyte proliferation and heart size", Science, Apr. 22, 2011, pp. 458-461, vol. 332.

Mills, et al., "Functional screening in human cardiac organoids reveals a metabolic mechanism for cardiomyocyte cell cycle arrest", Proceedings of the National Academy of Sciences of the United States of America, Sep. 15, 2017, pp. E8372-E8381.

Wendler et al., "Sphingosine-1 phosphate inhibits cell migration and endothelial to mesenchymal cell transformation during cardiac development", Developmental Biology, Mar. 15, 2006, pp. 264-277, vol. 29, No. 2.

Zhao et al., "Sphingosine-1-phosphate promotes the differentiation of human umbilical cord mesenchymal stem cells into cardiomyocytes under the designated culturing conditions", Journal of Biomedical Science, Jun. 7, 2011, pp. 1-9, vol. 18, No. 37.

(Continued)

*Primary Examiner* — Kara D Johnson
*Assistant Examiner* — Constantina E Stavrou
(74) *Attorney, Agent, or Firm* — Greer, Burns & Crain, Ltd.

(57) ABSTRACT

Methods for expanding beating cardiomyocytes, comprising treating the beating cardiomyocytes with one or more Wnt agonists, one or more bioactive lipids or a combination of one or more Wnt agonists and one or more bioactive lipids. Methods for differentiating stem cells, including iPS cells, into beating cardiomyocytes, comprising treating the iPS cells with a combination of one or more Wnt agonists and one or more bioactive lipids. Compositions and kits for regenerative medicine, comprising beating cardiomyocytes, one or more Wnt agonists and one or more bioactive lipids.

9 Claims, 27 Drawing Sheets

(56) References Cited

OTHER PUBLICATIONS

Titmarsh, D., et al., "Induction of Human iPSC-Derived Cardiomyocyte Proliferation Revealed by Combinatorial Screening in High Density Microbioreactor Arrays", Scientific Reports, Apr. 1, 2016, pp. 1-15, vol. 6, No. 1.
Wang F., et al., "Lysophosphatidic Acid Signaling is Required for the Normal Proliferation of Postnatal But Not Embryonic Cardiomyocytes", Dec. 4, 2015, pp. 1-1.
Sharma, A., et al., "Stage-specific Effects of Bioactive Lipids on Human iPSC Cardiac Differentiation and Cardiomyocyte Proliferation", Apr. 26, 2018, pp. 1-10, vol. 8, No. 1.
Search Report dated Oct. 27, 2021 for European Application No. 19767843.8-1118.
Pramod, Hema, "Regulation of Stem Cell Differentiation Into Cardiomyocytes by Lysophosphatidic Acid", University of Hertfordshire PhD Theses Collection, Nov. 2015, pp. 1-243.
Chinese Office Action dated Mar. 24, 2023 for Chinese Application No. 201980019775.4.
Yang, K., et al., "Medical Cell Biology", People's Military Medical Press, Mar. 31, 2013, pp. 279-280.
Zhang, J., et al., "Stem Cells", China Union Medical College Press, Feb. 28, 2003, pp. 265-266.
Rejection Decision issued on Feb. 28, 2024 for Chinese Application No. 201980019775.4.

* cited by examiner

Table S1

| Protein (Residue) | Code |
|---|---|
| Secondary Antibody Control | A1/A2 |
| p38a (T180/Y182) | A3/A4 |
| *ERK1/2 (T202/Y204, T185/Y187) | A5/A6 |
| *JNK 1/2/3 (T183/Y185, T221/Y223) | A7/A8 |
| *GSK-3a/ß (S21/S9) | A9/A10 |
| Blank | B1/B2 |
| EGFR (Y1086) | B3/B4 |
| MSK1/2 (S376/S360) | B5/B6 |
| AMPKα1 (T183) | B7/B8 |
| Akt 1/2/3 (S473) | B9/B10 |
| TOR (S2448) | C1/C2 |
| CREB (S133) | C3/C4 |
| *HSP27 (S78/S82) | C5/C6 |
| AMPKα2 (T172) | C7/C8 |
| Total ß-Catenin | C9/C10 |
| Src (Y419) | D1/D2 |
| Lyn (Y397) | D3/D4 |
| Lck (Y394) | D5/D6 |
| STAT2 (Y689) | D7/D8 |
| STAT5a (Y694) | D9/D10 |
| Fyn (Y420) | E1/E2 |
| Yes (Y426) | E3/E4 |
| Fgr (Y412) | E5/E6 |
| STAT6 (Y641) | E7/E8 |
| STAT5b (Y699) | E9/E10 |
| Hck (Y411) | F1/F2 |
| Chk-2 (T68) | F3/F4 |
| FAK (Y397) | F5/F6 |
| PDGFRß (Y751) | F7/F8 |
| STAT5a/b (Y694/Y699) | F9/F10 |
| Secondary Antibody Control | G1/G2 |
| PRAS40 (T246) | G3/G4 |
| Blank | G5/G6 |
| Blank | G7/G8 |
| PBS (Negative Control) | G9/G10 |

Figure 27

REAGENTS AND METHODS WITH Wnt AGONISTS AND BIOACTIVE LIPIDS FOR GENERATING AND EXPANDING CARDIOMYOCYTES

CROSS-REFERENCE TO RELATED APPLICATIONS

This application is the U.S. National phase application corresponding to PCT/US2019/022469 which was assigned an international filing date of Mar. 15, 2019 and associated with publication WO 2019/178478 A1 and which claims priority to U.S. Provisional Application 62/644,091 filed Mar. 16, 2018, the entire disclosures of which are expressly incorporated herein by reference.

This invention was made with government support under NIH grants LM012179 and U01 HL099776 awarded by the National Institutes of Health. The US government has certain rights in the invention.

FIELD OF THE INVENTION

The invention relates to reagents, compositions and methods for expanding beating cardiomyocytes. The invention also relates to compositions and methods for producing cardiomyocytes from various stem cells, including iPS cells. The invention also relates to various applications in which these cardiomyocytes may be used, including treatment of heart diseases and high-throughput drug screenings, cardia disease modeling, precision medicine, and regenerative therapies.

BACKGROUND

After myocardial infarction (MI), the human heart can lose on the order of a billion cardiomyocytes (CMs) thereby resulting in acute cardiac dysfunction and placing the patient at risk for developing chronic heart failure. It has been demonstrated that the adult mammalian heart exhibit limited ability to regenerate itself and current therapeutic approaches including injection of hiPSC-CMs or the creation of cardiac patches using engineered cardiac tissue are hampered by cell death after transplantation and arrhythmia in the cell recipient (Beltrami et al., 2001; Chong et al., 2014; Senyo et al., 2013). Unlike adult CMs, fetal CMs are proliferative and undergo extensive mitosis, accounting for the exponential myocardial growth during embryonic development (de Boer et al., 2012; Risebro et al., 2015). While the neonatal heart possesses the ability to regenerate following various forms of injury, this ability is lost shortly after birth resulting in the significant and permanent loss of myocardial mass upon damage during adulthood (Foglia and Poss, 2016; Laflamme and Murry, 2011; Porrello et al., 2011; Uygur and Lee, 2016).

It is calculated that the annual CM turnover in the adult heart is less than 2% and therefore the human heart is generally considered as a post-mitotic organ (Bergmann et al., 2009; Goldstein et al., 1974; Senyo et al., 2013). The extensive self-replicative properties of fetal CMs gradually decreases concomitant with progressive maturation (Bruneau, 2013; Srivastava, 2006). Consistently, this biology is recapitulated in vitro with hiPSC-CMs. While cardiomyocyte progenitor cells can expand easily, they quickly lose their proliferative capacity and increase in sarcomeric organization once they have committed to the CM lineage (Birket et al., 2015; Burridge et al., 2012; Mauritz et al., 2008; Zhang et al., 2009; Zhang et al., 2016). Multiple embryonic pathways have been implicated in cardiac differentiation of pluripotent stem cells (Kattman et al., 2011; Lee et al., 2017; Paige et al., 2010; Protze et al., 2017; Yang et al., 2008). Wnt signaling, in particular, plays a crucial role during multiple distinct phases of cardiomyocyte development and is necessary for cardiac specification, growth and differentiation. Early on, inhibition of Wnt signaling is required for the specification of mesoderm into cardiac progenitors (Foley and Mercola, 2005; Schneider and Mercola, 2001). Following specification, multipotent second heart field progenitors self-replicate upon stimulation of Wnt signaling pathway, and later differentiate into the three cardiovascular linages of the heart upon cessation of Wnt signaling (Cohen et al., 2007; Kwon et al., 2009; Lin et al., 2007; Qyang et al., 2007). Finally, once the heart has formed, Wnt signaling remains predominantly active in the compact myocardium to promote myocardial growth (Buikema et al., 2013; Ye et al., 2015). The knowledge derived from these early developmental studies in vivo has been translated into reproducible methods for the efficient generation of CMs from pluripotent stem cell sources in vitro. Current directed differentiation protocols for hiPSCs have incorporated a simplified form of Wnt modulation with an early stage, small molecule-mediated activation of Wnt signaling followed by later stage Wnt inhibition in order to subsequently induce a high purity of CMs (Burridge et al., 2014; Lian et al., 2012; Lian et al., 2013; Paige et al., 2010). A major limitation in the field, however, remains the inability to effectively expand and passage committed CMs to generate the numbers required for tissue engineering or true regenerative approaches.

Adult mammalian cardiomyocytes possess limited capacity for cell division (Sharma et al. 2015). Radiocarbon dating studies suggest that there is, at baseline, less than 0.5% yearly cell turnover in the adult human heart (Bergmann et al. 2009). As such, mammalian adult heart regeneration is unable to compensate for the massive loss of cardiomyocytes following cardiac injury such as myocardial infarction, leading to adverse cardiac remodeling. This limited regenerative capability of the human heart has garnered significant interest in developing novel methodologies for both creating cardiomyocytes de novo and inducing proliferation in terminally differentiated cardiomyocytes.

A major goal in human pluripotent stem cell research is to provide large quantities of cardiomyocytes suitable for cellular therapy in regenerative medicine (Chuang et al. 2011, Laflamme et al. 2011; Serpooshan et al. 2017; Li et al. 2016). Protocols for human pluripotent stem cell cardiac differentiation are vastly improved compared to a decade ago. Current protocols can obtain upwards of 90% pure cardiomyocytes during differentiation followed by metabolic selection, which can be further augmented by using CRISPR/Cas9 gene editing to introduce selectable markers into hiPSCs (Lian et al. 2012; Sharma et al. 2018). The most up-to-date strategies use biphasic Wnt/β-catenin modulation for direct cardiac differentiation from human induced pluripotent stem cells (hiPSCs) (Burridge et al. 2014; Lian et al, 2013). To mimic developmental Wnt signals required for in vivo mesoderm induction, hiPSCs are initially treated with CHIR99021 (CHIR), a non-selective glycogen kinase 3 beta (GSK3β) inhibitor, followed by a Wnt/β-catenin inhibitor to promote cardiac cell differentiation.

In recent years, growing evidence support lysophospholipids, a collection of bioactive lipids harboring multiple functions, as important regulators of stem cell differentiation in vitro and cardiovascular development in vivo (Kleger et al. 2011). Among these bioactive lipids, sphingosine-1- phosphate (S1P) and lysophosphatidic acid (LPA) are cardinal members (Kleger et al. 2011).

In vivo studies have demonstrated a necessary role of S1P signaling via S1P receptor in cardiomyocytes in normal heart development in mice (Clay et al. 2016). In vitro studies have shown that these signaling molecules are capable of regulating pluripotency and cell cycle activity in human embryonic stem cells (Avery et al. 2008; Garcia-Gonzalo et al. 2008).

The bioactive lipids have also been reported to play a role in cell proliferation in epithelial cells, fibroblasts, and various cancer cell lines, via their ability to stimulate important cellular signaling pathways such as the MAPK/ERK pathway, the Hippo Pathway, and the Wnt/β-catenin signaling pathway (Harvey et al. 2013; Marinissen et al. 2001; Oskouian et al. 2007; Yang et al. 2005).

U.S. Pat. No. 9,074,188 and US patent publication 2013/0244262 disclose methods for producing cardiomyocytes in culture.

However, despite recent advances, there remains significant batch-to-batch variation in differentiation efficiency, as different hiPSCs lines, even those derived from the same individuals, can vary in their abilities to reproducibly generate cardiomyocytes. Thus, there remains the need for in vitro hiPSC-CM generation protocols with consistently high efficiency.

SUMMARY

In one aspect, the present disclosure provides methods for expanding beating cardiomyocytes, the methods comprising treating the beating cardiomyocytes with a WNT agonist, a bioactive lipid and/or a combination of the WNT agonist and bioactive lipid. The beating cardiomyocytes may be human cardiomyocytes. The treatment may be conducted in vitro. The methods may further comprise prior to the step of treating the beating cardiomyocytes, a step of differentiating pluripotent stem cells into the beating cardiomyocytes. The pluripotent stem cells include embryonic stem cells, mesenchymal stem cells, cardiomyocyte progenitor cells and/or induced pluripotent stem (iPS) cells. The WNT agonists include GSK3β inhibitors. One preferred GSK3β inhibitor is CHIR99021. Preferred bioactive lipids include sphingosine-1-phosphate (S1P) and/or lysophosphatidic acid (LPA). The present methods for expanding beating cardiomyocytes may comprise treatment of the beating cardiomyocytes with CHIR99021, BIO, Wnt3A, Wnt3A plus R-spondin, Wnt surrogate ScFv-DKK1c, ScFv-DKK1c plus R-spondin, and/or any combination thereof. The beating cardiomyocytes may be treated for a period of time from 1 day to 120 days.

In some embodiments, methods for expanding beating cardiomyocytes comprise treating the beating cardiomyocytes by adding the WNT agonist and/or the biolipid to tissue culture media at a final concentration from 1 to 50 µM for each of the bioactive lipid, 1 to 50 µM for CHIR99021 or BIO, and from 1 to 500 ng/mL of the recombinant WNT agonist Wnt3A, Wnt3A plus R-spondin, Wnt surrogate ScFv-DKK1c, ScFv-DKK1c plus R-spondin, and/or any combination thereof.

Further aspects of this disclosure include methods for producing beating cardiomyocytes from pluripotent stem cells. These methods comprise treating the pluripotent stem cells with at least one bioactive lipid and at least one WNT agonist. The pluripotent stem cells may be human cells. The pluripotent stem cells may be embryonic stem cells, mesenchymal stem cells, cardiomyocyte progenitor cells and/or induced pluripotent stem (iPS) cells. The WNT agonist may be a GSK3β inhibitor. Some of the preferred bioactive lipids are sphingosine-1-phosphate (S1P), lysophosphatidic acid (LPA) and their combination. Preferred WNT agonists include CHIR99021, BIO, Wnt3A, Wnt3A plus R-spondin, Wnt surrogate ScFv-DKK1c, ScFv-DKK1c plus R-spondin, and/or any combination thereof. The pluripotent stem cells may be treated during a period of time from 1 hour to 10 days.

In one preferred embodiment of the present method for producing beating cardiomyocytes from pluripotent stem cells, the pluripotent stem cells are treated by adding S1P and LPA to tissue culture media at a final concentration 1 to 50 µM each, at 1 to 50 µM for CHIR99021 or BIO, and from 1 to 500 ng/mL of the recombinant WNT agonist Wnt3A, Wnt3A plus R-spondin, Wnt surrogate ScFv-DKK1c, ScFv-DKK1c plus R-spondin, and/or any combination thereof.

The disclosure also provides a method for obtaining human cardiomyocytes, the method comprising:
  differentiating hiPS cells into beating cardiomyocytes via the biphasic Wnt signaling protocol, wherein the hiPS cells are treated with at least one Wnt agonist and at least one bioactive lipid during at any time during the first phase of the protocol and wherein the cells are further treated with at least on Wnt antagonist during the second phase of the protocol, and thereby obtaining the beating cardiomyocytes; and
  expanding the beating cardiomyocytes by treating the beating cardiomyocytes with at least one bioactive lipid, at least one Wnt agonist, and any combination thereof.

Other aspects include a human beating cardiomyocyte produced by any of the present methods and methods of drug screening in which the human cardiomyocytes are contacted with a drug and then monitored for the effect of the drug on the human cardiomyocytes.

Further aspects include methods of treating a patient from a heart disease. The methods comprise directly administering to the patient's heart the cardiomyocytes obtained by the present methods. The heart diseases include heart failure from congenital heart disease, from myocardial infarction, from cardiotoxic agents such as anthracyclines, tyrosine kinase inhibitors, and immune check-point inhibitors for cancer therapy, from environmental exposure such as alcohol, bacteria such as ones causing Chaga's or Lyme disease, myocarditis-causing viruses, or from hereditary/genetic cardiomyopathy. In the methods of treatment, the cardiomyocytes may be administered to the patient via a patch which is applied to the patient's heart.

Further methods of treating a patient from a heart disease include methods comprising administering to the patient at least one Wnt agonist, Wnt surrogate, bioactive lipid and/or a combination thereof.

Other aspects provide method of treating a patient from a heart or vascular disease, the methods comprising administering a tissue engineered blood pump comprising the cardiomyocytes obtained by the present methods.

BRIEF DESCRIPTION OF THE DRAWINGS

FIG. 27 is Table S1 showing panel of different phosphorylated kinases as screened in hiPSCs and hiPSC-CMs treated with bioactive lipids S1P and LPA. In table, proteins with an asterisk (*) indicate significant alterations (P<0.05) in phosphorylation following S1P/LPA treatment (see also FIGS. 19A-19H).

DETAILED DESCRIPTION

Figure 1:
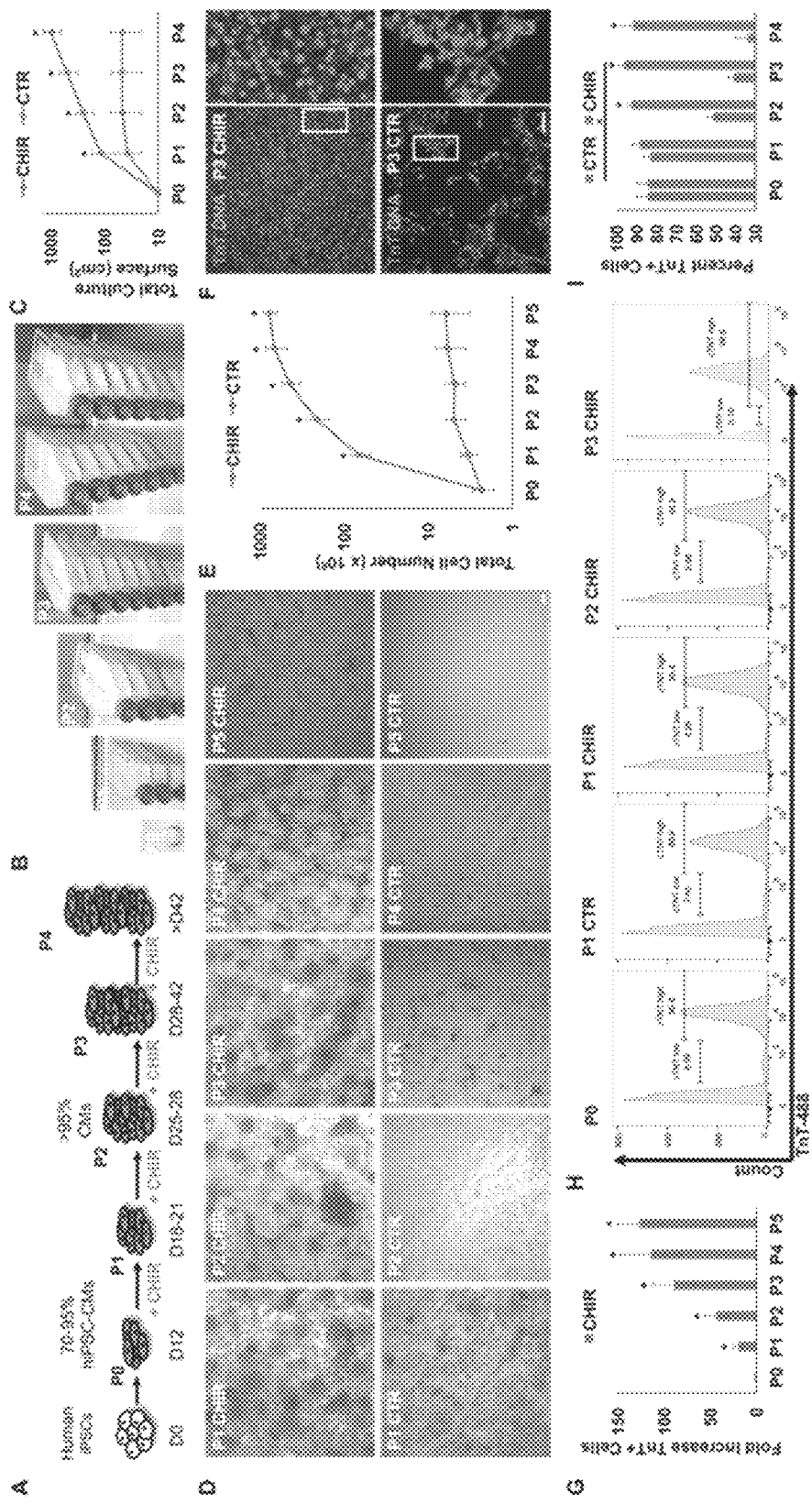
FIGS. 1A-1I show that Wnt Signaling Stimulates Massive Expansion of beating hiPSC-CMs and Long-term Passaging. (A) Schematic timeline of hiPSC-CM expansion and passaging. (B) Representative images of hiPSC-CM expansion from initial 10 cm$^2$ confluent dish at passage 0 (P0) to multiple confluent T-175 cm$^2$ cell culture flasks at subsequent passages. (C) Total surface area (cm$^2$) coverage by hiPSC-CMs at each passage. (D) Representative bright-field images of confluent hiPSC-CMs in the presence of CHIR or DMSO (CTR) at each passage. Same dilution factor was applied to both treatment conditions. (E) Quantification of total number of cell from P0 to P5. (F) Immunofluorescence analysis for TnT expression at P3 for hiPSC-CMs treated with DMSO (CTR) or CHIR. (G) Fold increase in TnT+ cells in CHIR-treated vs DMSO treated cells at each passage. (H) Representative flow cytometry plots of TnT expression in CHIR-treated cells. (I) Quantification of percentage of TnT+ cells from flow cytometric analysis in (H). Scale bars represent 100 µm, Data are in mean (n=3-5)±error bars indicate standard deviation, *p<0.05.

In one aspect, this disclosure provides a method for expanding beating cardiomyocytes, including human beating cardiomyocytes. The method comprises treating the beating cardiomyocytes with one or more WNT agonists, one or more bioactive lipids or a combination of one or more WNT agonists and one or more bioactive lipids.

In this disclosure, the term "beating cardiomyocytes" are used interchangeably with other terms such as cardiomyocytes, cardiac muscle cells, heart muscle cells, myocardiocytes and/or cardiac myocytes. Cardiomyocytes (CMs) are cells that make up the heart muscle. In this disclosure, "cardiomyocytes" refer to primary cardiomyocytes that have been isolated from the heart tissue and also to cardiomyocytes that have been obtained by recombinant technologies, such as for example, by differentiating stem cells.

In this disclosure, cardiomyocytes include those derived by differentiating pluripotent stem cells such as embryonic stem cells, mesenchymal stem cells, cardiomyocyte progenitor cells and/or induced pluripotent stem (iPS) cells, or any other cardiomyocyte progenitor cells. In this disclosure, iPS cells, including human iPS (hiPS) cells are particularly preferred for obtaining cardiomyocytes. Cardiomyocytes derived from iPS cells may be referred in this disclosure as iPS-derived cardiomyocytes or cardiomyocytes interchangeably.

Any of beating cardiomyocytes, primary or derived from pluripotent stem cells, may be expanded by the present methods in which the beating cardiomyocytes are treated with one or more WNT agonists, one or more bioactive lipids or a combination of one or more WNT agonists and one or more bioactive lipids. The present expansion method efficiently increases a number of beating cardiomyocytes by stimulating their proliferation. This result is highly unexpected because beating cardiomyocytes are typically non-dividing cells which do not proliferate efficiently even in tissue culture.

Beating cardiomyocytes retain their ability to undergo the contraction/relaxation cycle in vitro. The contractility of beating cardiomyocytes may be detected and recorded with a high-resolution movie. Additional immunohistochemistry tests can be conducted to quantify the sarcomere alignment. Other tests may include electrophysiological studies in which potentials of beating cardiomyocytes are recorded in a sharp current clamp mode.

The term "Wnt agonists" means any reagent which either alone or in combination with other reagents activates the canonical Wnt signaling pathway in a cell. Activation of the canonical Wnt signaling pathway means activation of β-catenin signaling by which β-catenin is translocated into the cell nucleus. For the purposes of this disclosure, any reagent either alone or in combination with other reagents that produces beating cardiomyocytes with nuclear β-catenin is referred to as a Wnt agonist.

Wnt agonists include small compounds, peptides, proteins, antibodies and their fragments, siRNA, and surrogate polypeptides. WNT agonists include GSK3β inhibitors. Compound CHIR99021 (aminopyrimidine derivative, available from Selleckchem) is one preferred GSK3β inhibitor. CHIR99021 may be referred in this disclosure interchangeably as CHIR. Another preferred GSK3β inhibitor is BIO (6-bromoindirubin-3'-oxime, available from Sigma-Eldridge).

Suitable Wnt agonists also include surrogate polypeptides which dimerize a Frizzled (Fzd) receptor with Lrp5/6, as disclosed in WO2016040895. These surrogate polypeptides comprise a binding domain having a specific affinity with a $K_D$ of at least $1\times10^{-7}M$ for one or more Fzd proteins and a binding domain having a specific affinity with a $K_D$ at least $1\times10^{-7}M$ of at least for one or both Lrp5 and Lrp6 protein.

The Fzd binding domain may be a norrin protein or binding fragment thereof. The Fzd binding domain may be scFv comprising the six CDR regions of an anti-Fzd antibody. A particularly preferred Fzd-binding domain includes the six CDR regions of pan-specific frizzled antibody OMP-18R5. The Fzd binding domain may be a de novo designed Fzd binding domain.

The Lrp5/6 binding domain may comprise a binding portion of a DKK protein. In particular, the Lrp5/6 binding domain may comprise the C-terminal domain of human DKK1.

A particularly preferred surrogate Wnt agonist is ScFv-DKK1c which is disclosed in WO2016040895 and comprises the scFv fragment of the OMP-18R5 antibody (available from Oncomed) linked via a linker to the C-terminal domain of human DKK-1.

Suitable Wnt agonists also include protein ligands of the RSPO family, including RSPO1, RSPO2, RSPO3 and RSPO4, also referred to as R-spondin 1, 2, 3 or 4. Suitable Wnt agonists further include Wnt3 (Wnt family member 3) protein and any derivatives thereof which can function as a Wnt-agonist. Suitable agonists further include Wnt3A and any of its derivatives that can function as a Wnt agonist.

Any one of the WNT agonists may be used in combination with any other Wnt agonists. Some of the preferred combinations may include Wnt3A and at least one of R-spondin proteins. Other combinations may include ScFv-DKK1c in combination with at least one of R-spondin protein.

Bioactive lipids are lipids which are either alone or as co-stimulators with Wnt agonists regulate cell signaling pathways. Bioactive lipids include poly- and monounsaturated fatty acids, phospholipid derivatives and lysophospholipids which are a subgroup of the glycophospholipid family with one of the hydroxyl groups on the three-carbon glycerol backbone remaining unesterified. Lysophospholipids contain only one fatty acid. Suitable bioactive lipids include sphingosine-1-phosphate (S1P), lysophosphatidic acid (LPA) and a combination of the two compounds. Any other suitable bioactive lipids include any of biolipids which stimulate or co-stimulate with one or more Wnt agonists differentiation and/or expansion of cardiomyocytes.

The term "treating" and/or "treatment" of beating cardiomyocytes is understood broadly and may include any of in vitro and/or in vivo procedures by which beating cardiomyocytes are exposed to at least some of the Wnt agonists and/or bioactive lipids. The treatment may include incubating beating cardiomyocytes with a formulation comprising at least one of the Wnt agonists and/or bioactive lipids. In some embodiments, at least one of the Wnt agonists and/or bioactive lipids may be dissolved in a solvent and added to a tissue culture media if beating cardiomyocytes are incubated in vitro. Suitable solvents may include water, a buffer, tissue culture media, an organic solvent, and any combination thereof.

In some embodiments, the treatment may comprise administering at least some of the Wnt agonists and/or bioactive lipids to an organ and/or tissue of a patient. The administration may include an injection, including an intravenous injection or direct injection into the heart tissue, a patch and/or oral administration.

In the present methods for expanding cardiomyocytes, beating cardiomyocytes may be treated in vitro with one or more Wnt agonists, one or more bioactive lipids, or a combination of one or more Wnt agonists and one or more bioactive lipids. The treatment may be administered for a period of time from one day to 120 days.

In one preferred embodiment, beating cardiomyocytes are treated by adding a combination of at least one Wnt agonist and at least one bioactive lipid to tissue culture media for a period from 1 to 120 days. Bioactive lipids may be added to a final concentration in the range from 1 to 50 μM. A GSK3β inhibitor may be added to a final concentration in the range from 1 to 50 μM. A recombinant Wnt agonist, such as a surrogate polypeptide comprising a Fzd ligand and Lrp5/6 ligand, may be added to the final concentration in the range from 1 to 500 ng/mL.

In one preferred embodiment, beating cardiomyocytes are treated by adding to a tissue culture media S1P and LPA at a final concentration from 1 to 50 μM each. In another preferred embodiment, beating cardiomyocytes are treated with S1P and LPA at a final concentration from 1 to 50 μM and at least one from CHIR99021 and BIO also at a final concentration 1 to 50 μM. In further embodiments, beating cardiomyocytes are treated with S1P and LPA at a final concentration from 1 to 50 μM and at least one from of the recombinant WNT agonist Wnt3A, Wnt3A plus R-spondin, Wnt surrogate ScFv-DKK1c, or ScFv-DKK1c plus R-spondin at a final concentration from 1 to 500 ng/mL. In further embodiments, beating cardiomyocytes are treated with S1P and LPA at a final concentration from 1 to 50 at least one from CHIR99021 and BIO also at a final concentration 1 to 50 and at least one from of the recombinant WNT agonist Wnt3A, Wnt3A plus R-spondin, Wnt surrogate ScFv-DKK1c, or ScFv-DKK1c plus R-spondin at a final concentration from 1 to 500 ng/mL. The beating cardiomyocytes may also be produced by treating cardiomyocytes with 1 to 50 µM and at least one from CHIR99021 and BIO and/or treating them with one or more from the recombinant WNT agonist Wnt3A, Wnt3A plus R-spondin, Wnt surrogate ScFv-DKK1c, or ScFv-DKK1c plus R-spondin at a final concentration from 1 to 500 ng/mL.

Further aspects provide cardiomyocytes that have being obtained by treating beating cardiomyocytes with one or more Wnt agonists, one or more bioactive lipids or a combination of one or more Wnt agonists and one or more bioactive lipids.

In further aspect, this disclosure provides methods for producing cardiomyocytes from pluripotent stem cells.

Pluripotent stem cells include embryonic stem cells, mesenchymal stem cells, cardiomyocyte progenitor cells, and induced pluripotent stem (iPS) cells. Other types of pluripotent cells may be used as well. In this disclosure, iPS cells, including human iPS (hiPS) cells are particularly preferred for obtaining cardiomyocytes. iPS cells, including human iPS cells, are pluripotent stem cells generated from adult cells by reprogramming. iPS may be obtained from keratinocytes or blood cells or some other suitable cells by reprogramming the cells to express OCT4, KLF4, SOX2, and MYC.

This disclosure provides methods for generating beating cardiomyocytes by treating pluripotent stem cells with a combination of one or more bioactive lipids and one or more WNT agonists and differentiating the stem cells into beating cardiomyocytes. Unexpectedly, there is a synergism between bioactive lipids and WNT agonists in the present methods for producing beating cardiomyocytes from pluripotent stem cells. iPS cells, including hiPS cells, are particularly preferred in these methods. Particularly preferred bioactive lipids in the methods are sphingosine-1-phosphate (S1P) and lysophosphatidic acid (LPA) which may be used individually or in combination. The preferred methods include a combination of S1P and LPA. Other bioactive lipids may be added as well.

In the present methods for differentiating pluripotent stem cells into beating cardiomyocytes, any of the WNT agonists may be used in combination with one or more bioactive lipids. Such WNT agonists include a GSK3β inhibitor. CHIR99021 and/or BIO may be used in the methods in combination with one or more bioactive lipids. Methods may also be performed with one or more bioactive lipids and one or more WNT agonists from CHIR99021, BIO, Wnt3A, Wnt3A plus R-spondin, Wnt surrogate ScFv-DKK1c, ScFv-DKK1c plus R-spondin, Wnt surrogate comprising Frd ligand and Lpr5/6 ligand.

In some of the present methods for differentiating pluripotent stem cells into beating cardiomyocytes, the pluripotent stem cells are treated in tissue culture with one or more bioactive lipid and one or more WNT agonists for a period of time from 1 hour to 10 days. Bioactive lipids are added to tissue culture media at a final concentration 1 to 50 µM each. CHIR99021 and/or BIO are added to tissue culture media at a final concentration 1 to 50 µM each. WNT agonist Wnt3A, Wnt3A plus R-spondin, Wnt surrogate ScFv-DKK1c, ScFv-DKK1c plus R-spondin or any combination thereof are added to tissue culture media at a final concentration 1 to 500 ng/mL each.

A person of skill will appreciate that a combination of one or more bioactive lipids with one or more Wnt agonists may be used in any protocol for differentiation of any pluripotent stem cells into beating cardiomyocytes. These differentiation protocols include the biphasic Wnt signaling protocol in which a Wnt agonist is added during the first phase of differentiation, and then a Wnt antagonist is added during the second phase of differentiation. In the biphasic Wnt signaling protocol, pluripotent stem cells, i.e. iPS cells, are treated with a combination of one or more bioactive lipids and one or more Wnt agonists during the first phase of the protocol.

Further aspects of this disclosure include methods for obtaining human cardiomyocytes comprising:
1) differentiating hiPS cells into beating cardiomyocytes via the biphasic Wnt signaling protocol, wherein the hiPS cells are treated with one or more Wnt agonists and one or more bioactive lipids at any time during the first phase of the protocol followed by a treatment with one or more Wnt antagonist during the second phase of the protocol; and
2) expanding the beating cardiomyocytes by treating the beating cardiomyocytes with one or more bioactive lipids, one or more Wnt agonists, or a combination of one or more bioactive lipids and one or more Wnt agonists.

Further aspects include human beating cardiomyocytes obtained by differentiating pluripotent stem cells, preferably hiPS cells, via the biphasic Wnt protocol in which a combination of one or more bioactive lipids with one or more Wnt agonists is used during the first phase of the protocol. The hiPS cell-differentiated beating cardiomyocytes (hiPSC-CMs) may be then further expanded by treating the hiPS cell-differentiated beating cardiomyocytes with one or more bioactive lipids, one or more Wnt agonists or a combination of one or more bioactive lipids and one or more Wnt agonists.

One of the technical advantages provided by the present methods is production of beating cardiomyocytes in large numbers, which was previously difficult to accomplish because beating cardiomyocytes are typically non-proliferating cells. The beating cardiomyocytes produced by the present methods may be used in a number of applications, including a high-throughput drug screening in which the beating cardiomyocytes are contacted with a drug and then monitored for an effect of the drug on the cardiomyocytes. Many drugs are cytotoxic for heart muscle. The high-throughput drug screening methods with the beating cardiomyocytes may allow for identification of a potentially cytotoxic drug expeditiously as the screening can be conducted in tissue culture.

Particularly preferred embodiments include methods in which bioactive lipids S1P and LPA are used to promote cardiomyocyte differentiation from hiPS cells. Together with CHIR99021, S1P and LPA treatment in undifferentiated hiPS cells synergistically increases nuclear β-catenin accumulation and mesodermal phenotype. At a later stage of hiPSC-CM differentiation, the S1P and LPA treatment stimulates cell cycle activity in hiPSC-CMs via ERK/MAPK signaling and enhances cell proliferation.

Further aspects include methods of treating a human patient in need of treatment for a heart disease. The patient may be treated by administering to the patient's heart the beating cardiomyocytes obtained by the present differentiation and/or expansion methods. The treatment methods may be beneficial for any heart disease associated with degeneration of cardiomyocytes, including, but not limited to, congenital heart disease, degeneration from myocardial infarction, degeneration from cardiotoxic agents such as anthracyclines, tyrosine kinase inhibitors, and/or immune check-point inhibitors for cancer therapy, degeneration from environmental exposure such as alcohol, bacteria such as ones causing Chaga's or Lyme disease, myocarditis-causing viruses, or from hereditary/genetic cardiomyopathy.

The treatment methods may include administering the beating cardiomyocytes to the patient via a patch which is applied to the patient's heart. The beating cardiomyocytes may be administered in combination with one or more bioactive lipids and one or more Wnt agonists which may be included in the patch as well or they may be administered to the patient separately, for example via an intravenous injection or orally.

Further aspects provide a method for treating a patient from a heart disease, the method comprising administering to the patient one or more Wnt agonists, Wnt surrogates, bioactive lipids and/or any combination thereof.

In further aspect, the present disclosure provides a kit for treating a heart disease. The kit comprises beating cardiomyocytes obtained by one of the present differentiation and/or expansion methods. The kit may further comprise one or more bioactive lipids and/or one or more Wnt agonists and may further include a media for delivery of cells such as for example matrix gel designed as a patch.

In further aspect, the present disclosure provides a tissue engineered blood pump produced from beating cardiomyocytes which were obtained by the present differentiation and/or expansion methods. The disclosure also provides methods for treating a patient from a heart or vascular disease. The methods comprise administering the tissue-engineered blood pump to the patient.

The present disclosure provides methods in which the canonical Wnt signaling stimulation allows for massive expansion and multiple passaging of beating cardiomyocytes (CMs). Withdrawal of the Wnt agonist results in rapid cell-cycle exit and restoration of normal contractile, electrophysiological and cellular characteristics of CMs.

In one aspect, this system may be used to create functional cardiac tissue from expanded CMs in vitro and stimulate in vivo myocardial growth within adult heart tissue, which may be used for regeneration of patient-specific cardiac muscle.

The 'holy-grail' of cardiac regenerative medicine remains the restoration of function cardiac tissue following myocardial infarct. A major hurdle to this goal, however, remained the inability to generate robust numbers of CMs in order to allow for the generation of patient-specific, engineered heart tissue or alternatively to boost cell-division of pre-existing CMs. To date, expansion and multiple passaging of CMs from hiPS cells has been an extremely challenging and largely unsuccessful task. This disclosure aims to address this need and provides a method by which immature hiPSC-CMs massively expand for multiple passages when continuously subjected to stage-specific small-molecular GSK3 inhibitor treatment. This results in increased CM purification (FIG. 1).

Figure 2:
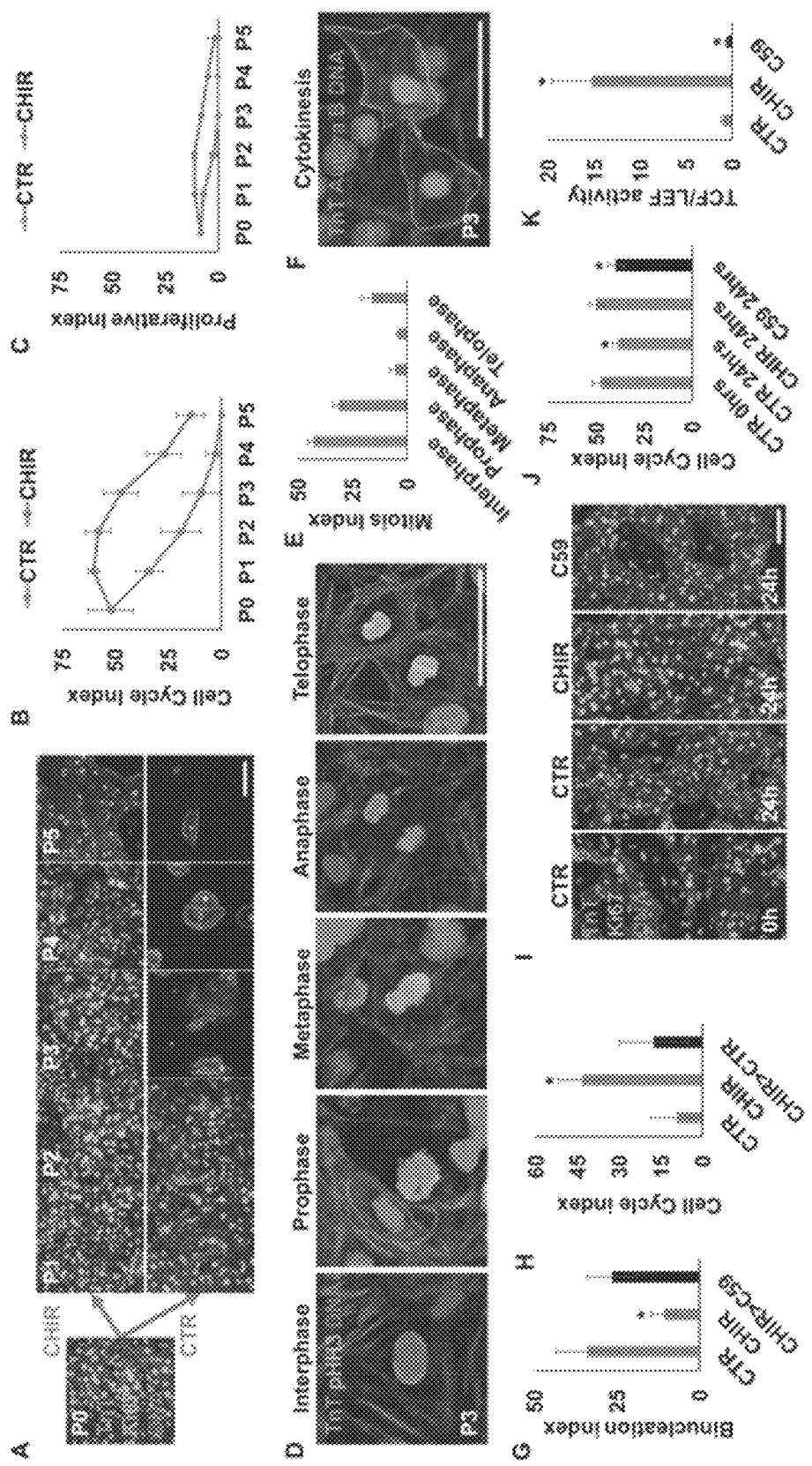
FIGS. 2A-2K report extension of hiPSC-CM proliferative window by Wnt signaling. (A) Immunofluorescence microscopy images of hiPSC-CMs at each passage starting at day 12 (P0) of differentiation. Cardiac troponin T (TnT). (B) Expression of ki67, a cell cycle index, in TnT+ cells after treatment with CHIR or DMSO (CTR). (C) Expression of pHH3, a proliferative index, in CHIR or CTR-treated TnT+ cells. (D) Representative confocal microscopy images of CHIR-treated hiPSC-CMs at different phases of mitoses. (E) Quantification of proliferating hiPSC-CMs at distinct mitotic phases from (D). (F) Immunofluorescence image of Aurora B kinase expression in TnT+ cells undergoing cytokinesis. (G) Quantification of the percentages of bi-nucleated hiPSC-CMs (as % total CMs) and (H) ki67 expression for CHIR-treated P3 cells that were subsequently treated with either CTR, CHIR, or C59 for 6 additional days. (I) Immunofluorescent images of P0 hiPSC-CMs treated with CTR, CHIR, or C59 for 24 hours (24h). (J) Quantification of ki67 expression (i.e. cell cycle index) as a percentage of total hiPSC-CM from experiment described in (I). (K) Assessment of canonical Wnt signaling via TCF/LEF using the TOPFlash luciferase reporter in hiPSC-CMs from experiment described in (I). Note the dramatic increase in TCF/LEF activity in the presence of CHIR. Scale bars represent 100 µm, Data are in mean (n=3-5)±error bars indicating standard deviation, *p<0.05.
Figure 6:
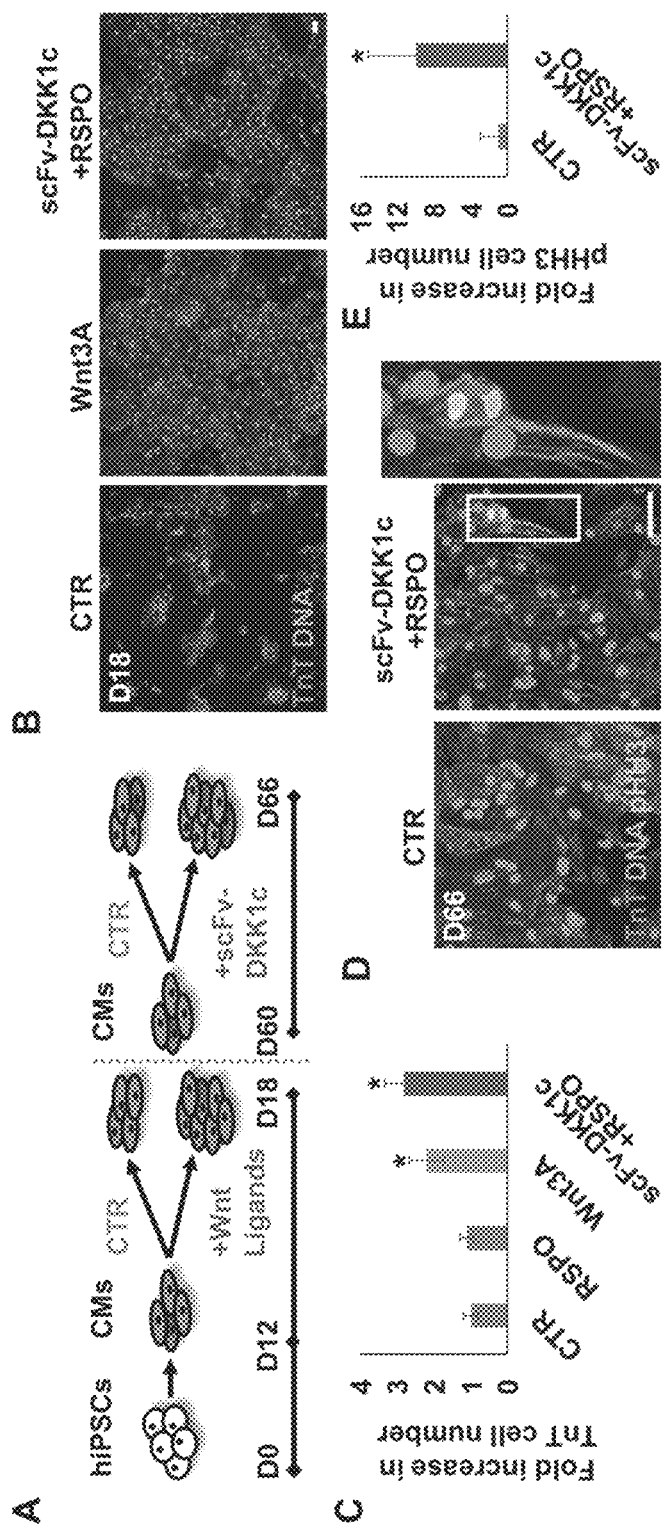
FIGS. 6A-6E report Wnt receptor-ligands induce CM cell-cycle reactivation. (A) Schematic representation of time points of hiPSC-CMs used for studying cell cycling (B) Representative images of day 12 CMs treated with Wnt3A, scFv-DKK1c+RSPO or H2O control (CTR). (C) Quantification of the TnT positive cell numbers displayed as fold increase over the CTR. (D) Immunfluorescence analysis in D66 CMs for the listed treatments. (E) Fold increase in mitotic CMs at day 66. Scale bars represent 100 µm, Data are in mean (n=3-5)±error bars indicating standard deviation, *p<0.05.
Figure 7:
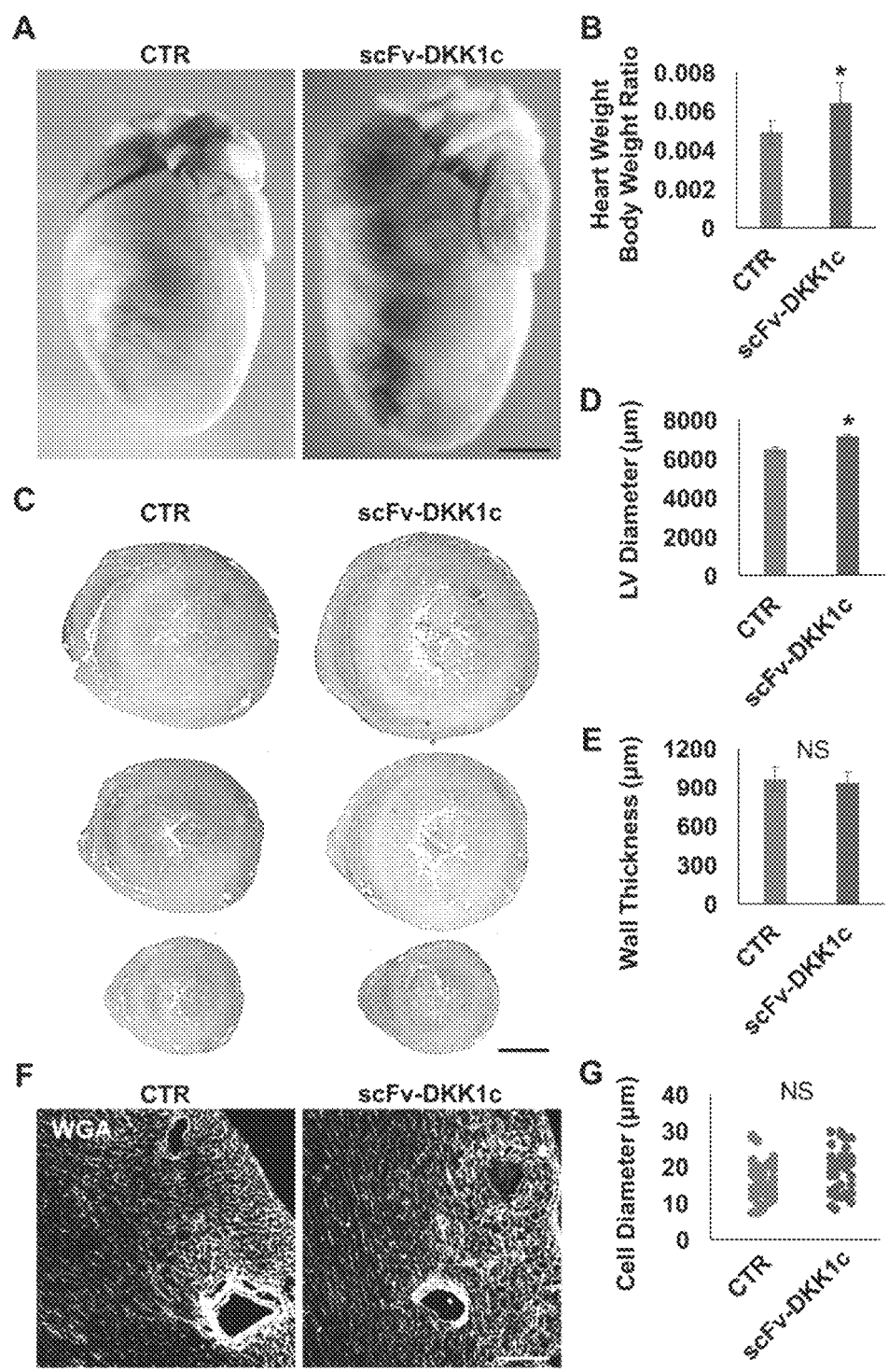
FIGS. 7A-7G report Wnt surrogate promotes myocardial growth. (A) Representative images of 12-weeks old mice for Wnt Surrogate treatment or CTR. (B) Graph displaying heart-weight body-weight ratios. (C) Hematoxylin and Eosin (H&E) staining at 3 levels of the ventricles. (D) graph displaying LV dimension and (E) wall thickness in µm. (F) Immunofluorescence analysis for wheat germ agglutinin (WGA) and dapi (DNA). (G) Graphs displaying relative cell number and cell size in µm. Scale bars represent 1000 µm in A and C and 100 µm in F, Data are in mean (n=3 in A, n=6 in C and D, n=4 in E-H)±error bars indicating standard deviation, *p<0.05.
Figure 12:
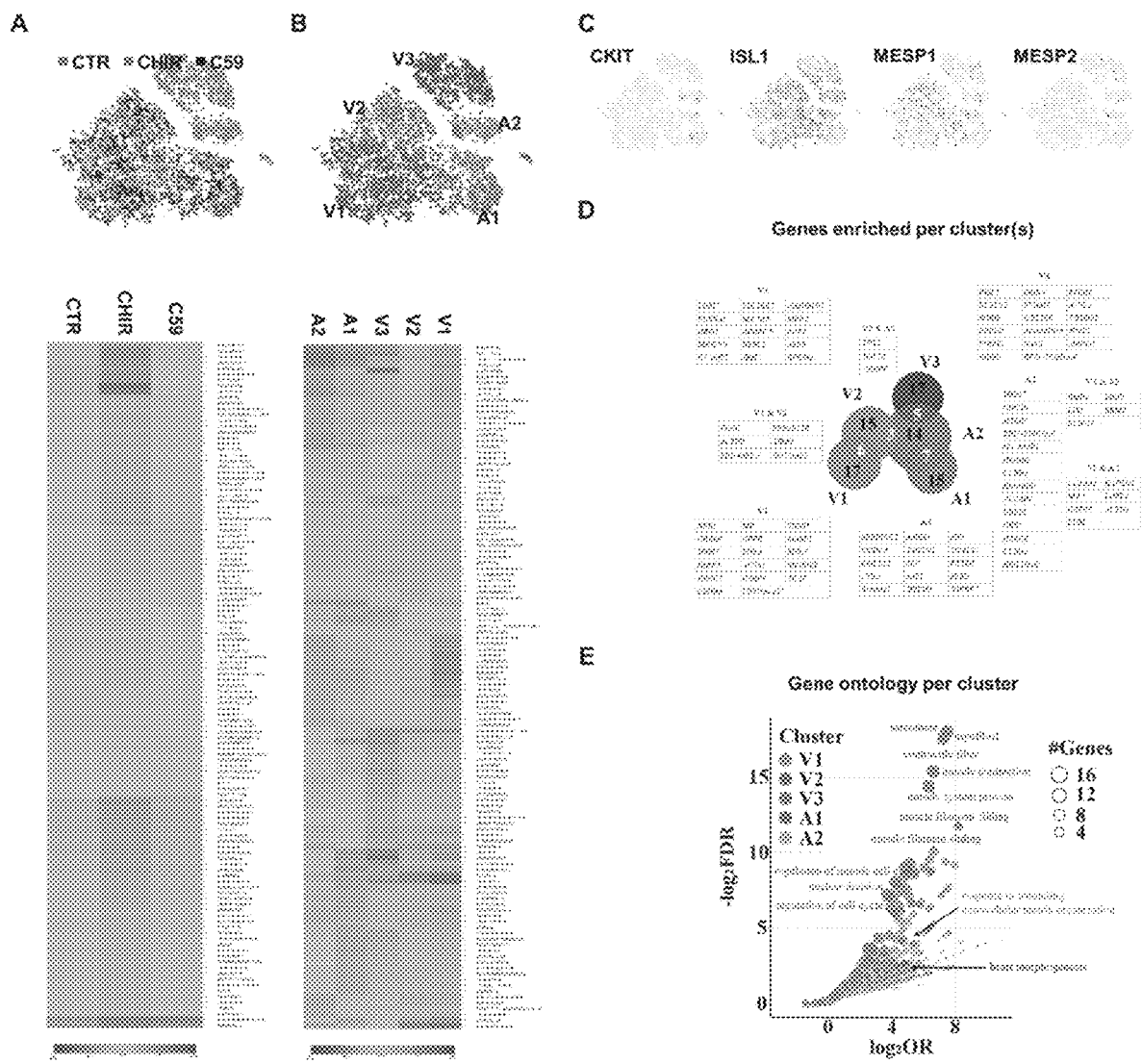
FIGS. 12A-12E report previously expanded CMs being utilized to create functional 3-dimensional cardiac tissue.

Following withdrawal of the GSK3 inhibitor, the CMs stop proliferating and retain the capacity for normal in vitro maturation spontaneously (FIG. 2). As a demonstration of a pre-clinical application, previously expanded CMs were utilized to create functional 3-dimensional cardiac tissue (FIG. 12). Furthermore, stimulation of the canonical Wnt signaling pathway with a Wnt surrogate receptor agonist in quiescent hiPSC-CMs and adult mouse heart, induces CM replication and promotes myocardial growth (FIGS. 6 and 7).

Several previous studies have shown the transient expansion of beating cardiomyocytes with various GSK3 inhibitors, however, without the ability for multiple passaging (Buikema et al., 2013; Titmarsh et al., 2016; Uosaki et al., 2013). Most likely, because these studies were using pluripotent stem cell-derived CMs from other species, initiating treatment at a later time point of differentiation, culture media containing fetal bovine serum and/or losing too many cells when dissociation and passaging. In contrast, the present disclosure provides that when day 12 hiPSC-CMs are kept in a chemically defined media and Matrigel coated monolayer culture, they could be passaged up to 3-5 times with an estimate of >90% survival after passaging and thereby acquire a massive increase in CM numbers (FIG. 1).

Figure 13:
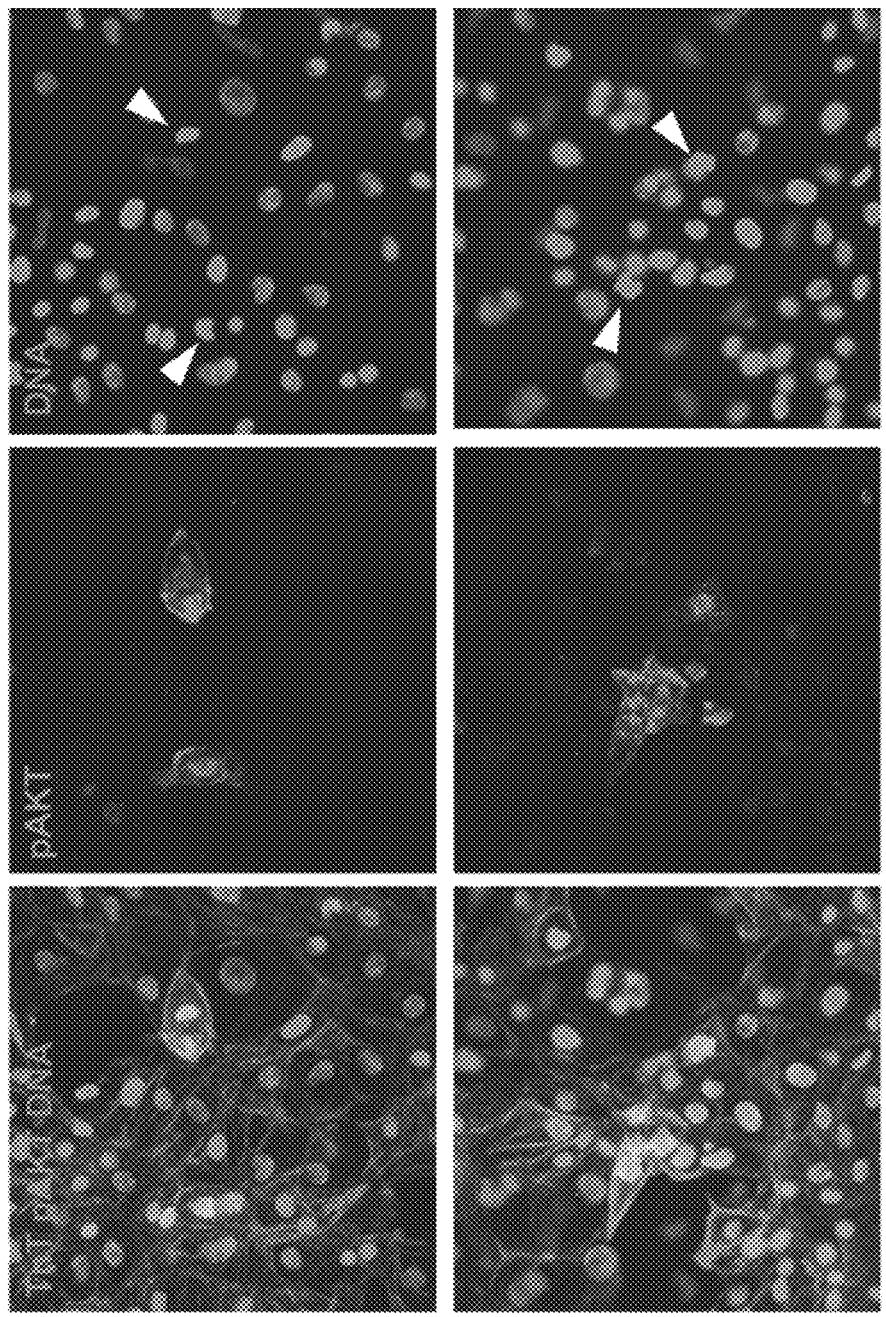
FIG. 13 reports immunohistochemistry for pAKT T308 and TnT in hiPSC-CMs passaged for 3 times with CHIR.
Figure 14:
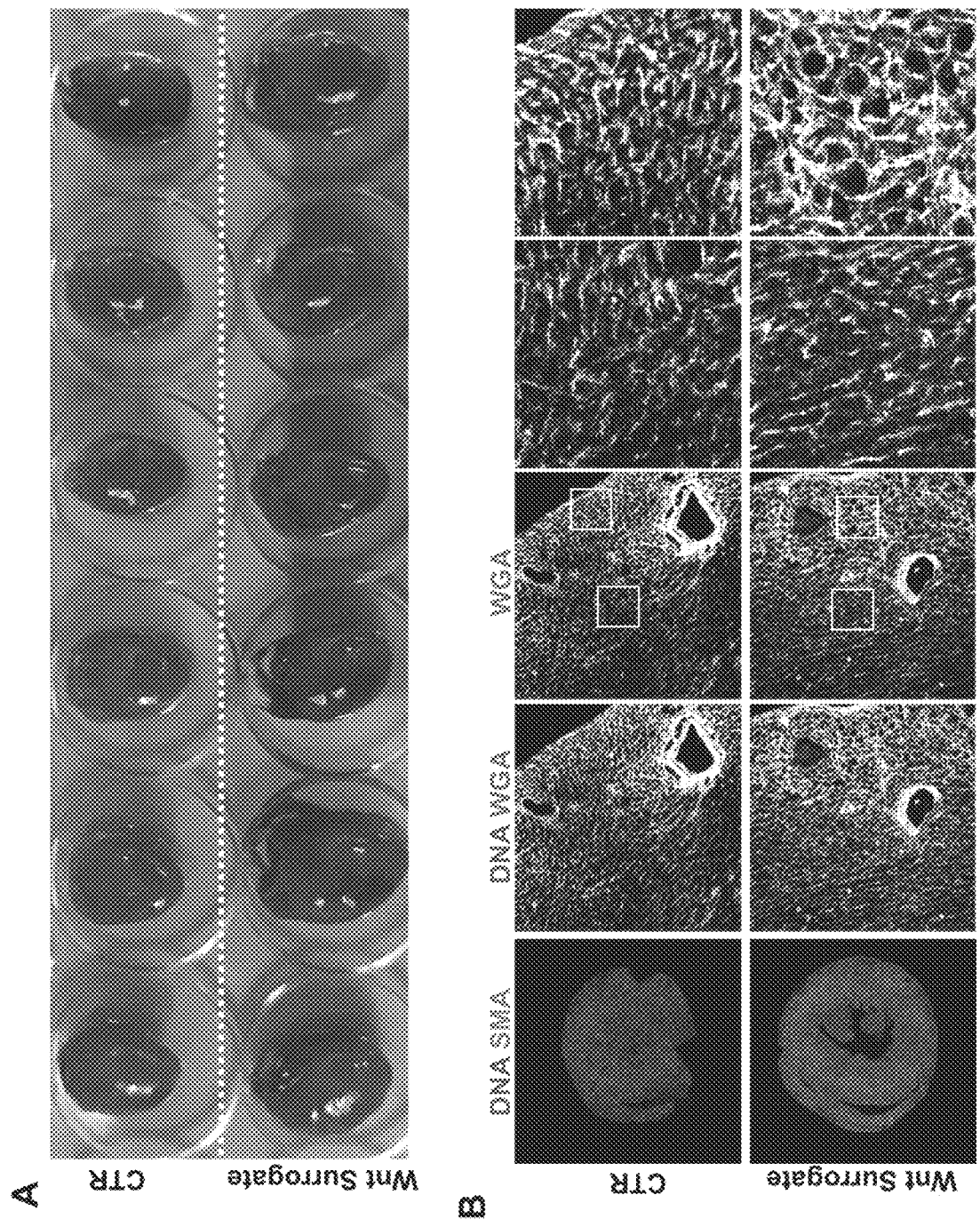
FIGS. 14A-14B report (A) Images of 8-weeks old mice hearts treated with the Wnt Surrogate, scFv-DKK1c or the vehicle control (CTR). (B) Confocal images of Smooth Muscle Actin, DNA and WGA membrane stain in 8-weeks old mouse hearts.

Two recent studies focused on the expansion of cardiovascular progenitors and showed a $10^7$ and $10^{10}$-fold expansion with a combination of purified proteins, small molecules and/or overexpression of oncogenes (Birket et al., 2015; Zhang et al., 2016). Albeit, the proliferative capacity of cardiovascular progenitors is higher when compared to hiPSC-CMs expansion, the differentiation of multipotent cardiovascular progenitors still remain an uncontrolled process resulting in mixed cell populations upon terminal differentiation. The present methods expand beating hiPSC-CMs and not progenitors (FIGS. 9A-B) and robustly yield >95% TnT purity during expansion, as will be beneficial for reproducible downstream applications (FIGS. 1H-I and FIG. 13). After withdrawal of CHIR these cardiomyocytes normally mature and display equal sarcomere organization, electrophysiology and force generation to the controls (FIG. 2).

A distinct feature of terminally differentiated CMs is their limited potential to proliferate coupled with a cytoskeleton containing highly organized sarcomere structures to propagate the billions of contractions over a life-time. A recent report showed that CM cell division mainly occurs within the fraction mononuclear diploid cells, but not in the tetraploid or multinucleated CMs and that the sarcomere regulator TNNI3k is correlated to this discrepancy between those CM populations of the heart (Patterson et al., 2017).

Figure 3:
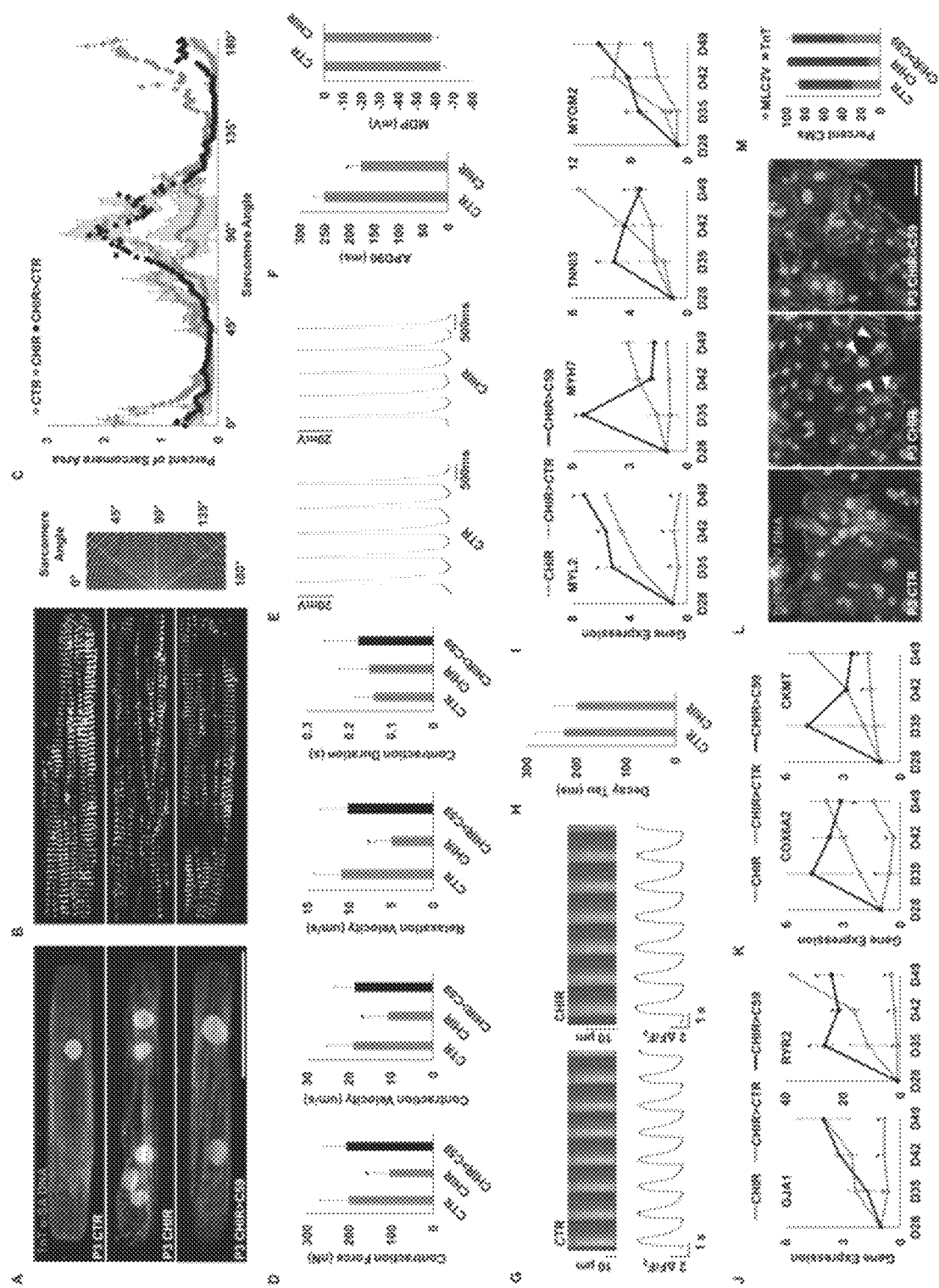
FIGS. 3A-3M report phenotypic assessment of hiPSC-CMs following Wnt stimulation. (A) Confocal microscopy images of P3 hiPSC-CMs on micropatterned surfaces either treated with DMSO (CTR), CHIR (2.0 □m) or CHIR followed by C59 (CHIR>C59) and immunostained for the expression of troponin T (TnT) and alpha-sarcomeric actin (α-SA). (B) Automated quantification of sarcomere fiber alignment. Vertical axis is defined as zero degree. (C) The percentages of the sarcomere area oriented at the indicated degree are quantified. (D) Contractility measurements in cells treated in (A). (E) Representative action potential tracings of hiPSC-CMs. Data represents changes in membrane potential [Em]) in day 28 (D28) hiPSC-CMs. (F) Graphs representing action potential duration (APD) in 90% repolarization ($ADP_{90}$) and maximal diastolic potential (MDP) for each group at day 28. (G) Ca2+ transients (Fluo-4AM) fluorescence expressed relative to baseline [F/F0]) in hiPSC-CMs at day 28. (H) Graph displaying the decay tau for each group. Fold increase in sarcomere gene (I), electrophysiological gene (J) and metabolic gene (K) expression for expanding CMs at D28, D35, D42 and D49. After D28 cells are either continues treated with CHIR, withdrawn or treated with C59. (L) Immunohistochemistry for MLC2V and TnT in P3 CMs treated with CHIR, CTR, and CHIR>C59. (M) Percent of MLC2V and TnT positive cells. Scale bars represent 100 µm. Data are in mean (n=3-5)±error bars indicating SEM in D, E, G and H and standard deviation in J and L, *p<0.05.

In FIG. 2, the present disclosure shows that the proliferating cells are mono-nucleated. In FIG. 3, the present disclosure shows that after withdrawal of CHIR, there was an increase in multinucleated cells and decrease in proliferating cells. Provided in this disclosure, single cell RNA sequencing data reveal that activation of the canonical Wnt signaling pathway predominantly maintains the relative immature state of CMs and thereby extends their proliferative window (FIG. 3). This data is in line with the previous in vivo findings that immature CM populations proliferate and regenerate the myocardium (Kikuchi et al., 2010; Patterson et al., 2017).

Various studies have linked Wnt signaling to heart growth and CM division, however, this disclosure provides a finding that Wnt/β-catenin signaling instead retains CM immaturity in order to extend the proliferative window for this subset of proliferative CMs (FIG. 3-4) (Buikema et al., 2013; Heallen et al., 2011; Kerkela et al., 2008; Titmarsh et al., 2016; Tseng et al., 2006; Uosaki et al., 2013). This is conceptually novel and forms a mechanistic explanation for the rare CM proliferative response to Wnt signaling in young but not adult mice (FIG. 6).

The biology of the mammalian heart appears to be quite distinct from the relatively immature zebrafish heart that possesses regenerative capacities, in which Wnt signaling is active upon the response to cardiac injury (Kikuchi et al., 2010; Stoick-Cooper et al., 2007). A recent mammalian study demonstrated that the rare population of preexisting CMs which drive regeneration are mononuclear diploid cells (Patterson et al., 2017).

Figure 5:
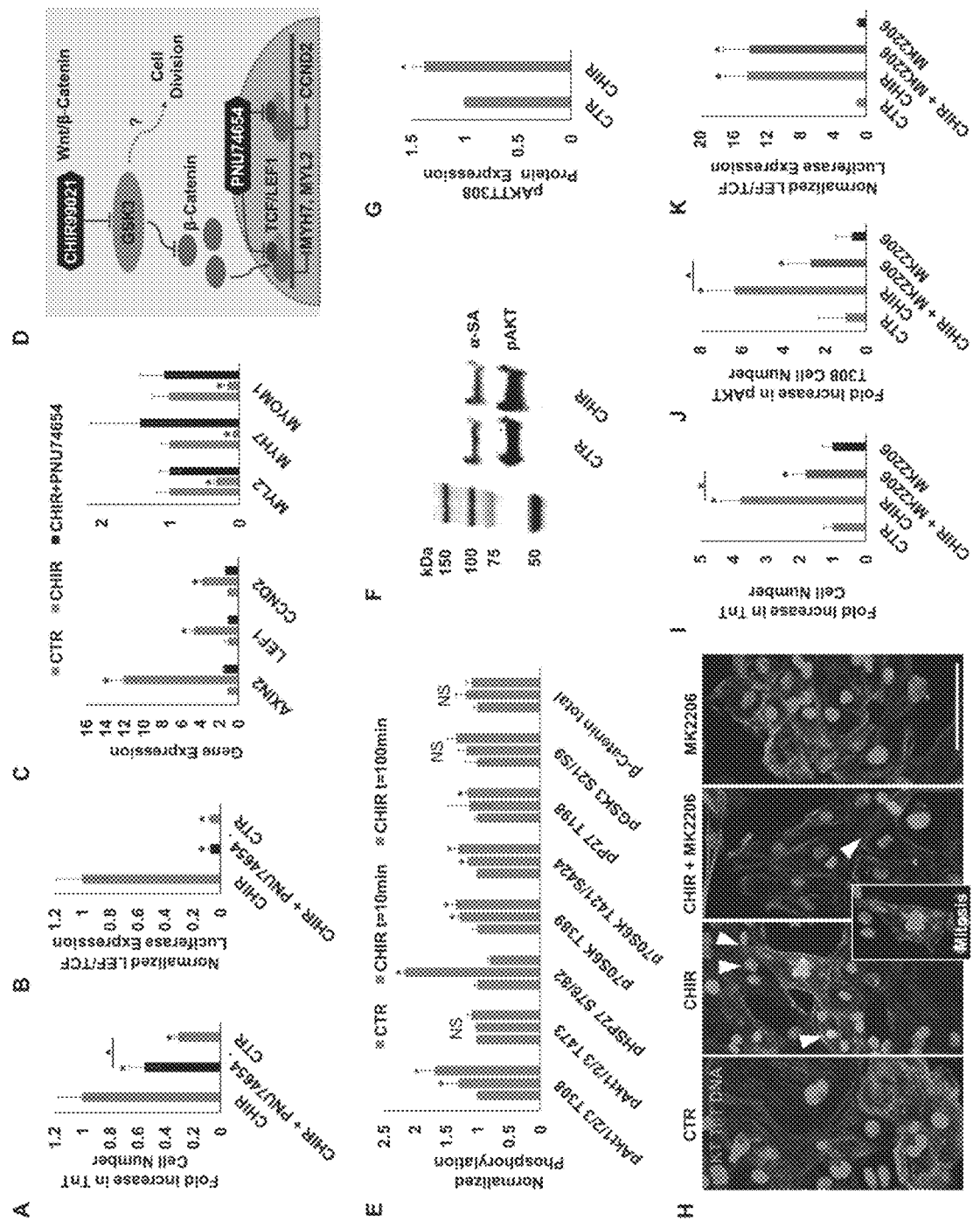
FIGS. 5A-5K report GSK3β inhibition regulates phosphorylation of AKT kinases required for mitosis. (A) Cell count of TnT positive cells represented as fold increase over CHIR treatment. (B) TOPFlash luciferase TCF/LEF analysis after 24 hrs of treatment with the indicated inhibitors. (C) Gene expression for the indicated inhibitors. (D) Schematic of GSK3 inhibition with CHIR (CHIR99021) and downstream canonical Wnt signaling inhibition with PNU74654. (E) Panel displaying kinases with significantly changed phosphorylation levels after treatment with CHIR of 43 screened phosphorylation targets. (F) Western blot analysis for pAKT T308 in cells cultured for 100 min in the presence or absence of CHIR. (G) Graph representing pAKT protein expression. (H) Immunofluorescence analysis for pAKT T308 in day 12 hiPSC-CMs cultured for 6 days with the indicated treatment. Quantification of the TnT (I) and pAKT T 308 (J) cell number for each treatment represented as fold over control. (K) TOPFlash luciferase TCF/LEF analysis after 24 hrs of treatment with the indicated treatment. Scale bars represent 100 µm, Data are in mean (n=3-5)±error bars indicating standard deviation, *p<0.05.

It is not clear whether the expanding CMs obtained by the present methods have made fate decisions yet towards the atrial of ventricular lineage, but the sequencing data provides evidence for an atrial-like populations characterized by SLN and HEY1 expression as well as ventricular-like populations enriched for MYL2 and the immature ventricular markers MYL3 and MYL4 (Josowitz et al., 2014; Kurabayashi et al., 1988; Protze et al., 2017). Interestingly, both atrial and ventricular-like populations responded to Wnt stimulation and all CHIR treated cells together formed a distinct cluster with again atrial-like and ventricular-like sub-clusters (FIG. 3). Independent from β-catenin signaling, this disclosure provides that CHIR/GSK3 regulates the turnover of AKT within the cytoplasm (FIG. 5). Importantly, this disclosure provides that this component accounted for some of the maturational changes and roughly 50% of the proliferative response observed by CHIR exposure seen in FIG. 1.

This disclosure provides a robust, long-term in vitro expansion of functionally immature CMs that ultimately retain their capacity for further maturation and thus utility in translational applications. It presents a conceptually novel principle that Wnt signaling plays a key role in maintaining CM immaturity and, by consequence, enhancing the stage-specific proliferation of hiPSC-CMs. Furthermore, it also provides an in vivo approach to regulate adult myocardial growth. These methods have important implications for scaling up patient-specific CM production for various individualized therapies as well as novel in vivo regenerative approaches for cardiac repair.

Unexpectedly, this disclosure also provides that S1P and LPA act synergistically with GSK3β inhibitor CHIR to regulate early hiPSC mesodermal differentiation through nuclear β-catenin accumulation. At later stages, the combined treatment of S1P and LPA results in cell-cycle activation in differentiated hiPSC-CMs, an effect mediated through ERK/MAPK signaling, and synergized with β-catenin signaling to increase cardiomyocyte proliferation. Bioactive lipids exhibit stage-specific effects on cardiac differentiation from hiPS cells.

This disclosure reports highly stage-specific roles for S1P/LPA during hiPSC-CM differentiation. When administered to undifferentiated hiPS cells, either alone or in combination with CHIR, S1P/LPA increases nuclear β-catenin level and enhances mesodermal induction. After the completion of cardiomyocyte differentiation, the addition of S1P/LPA initiates a cell cycle re-entry in hiPSC-CM by activating MAPK/MEK/ERK signaling and enhanced CHIR-induced cardiomyocyte proliferation. These findings illustrate the versatility of the hiPS cell differentiation platform for studying the effects of signaling pathways on human cardiomyocyte development. In addition, the ability to mass-produce differentiated human cardiomyocytes by bioactive lipid treatment can be used in development of high throughput assays for cardiac disease modeling and discovery of new molecules for future regenerative applications.

The ability of S1P and LPA to rapidly induce morphological and gene expression changes in undifferentiated hiPS cells is an unexpected finding. A rapid change is observed in hiPS cell morphology within 12-24 hours from the initiation of S1P/LPA treatment. These changes are also accompanied by an increase in the expression of the intermediate filament protein vimentin in hiPS cells, a finding that suggests the induction of epithelial-to-mesenchymal transition (EMT). However, the S1P/LPA treatment did not lead to a decreased expression of Nanog at 24 hrs after treatment, suggesting a more mesodermal specific, rather than global, effect of S1P/LPA on hiPSC cardiac differentiation (FIG. 22B). A hallmark of EMT is the loss of cell-cell contact normally mediated by adherens junction complexes (Lamouille et al. 2014).

Lysophospholipids are well-established for their ability to dissociate these adherens junctions, dramatically loosen cell-cell contact, and release adherens junction-bound β-catenin into the cytoplasm (Kam et al. 2009; Burkhalter et al. 40). Importantly, β-catenin also functions as a downstream nuclear transcriptional effector for activating Wnt signaling (Lian et al. 2012).

Treatment with S1P/LPA rapidly induces β-catenin cytoplasmic and nuclear accumulation in hiPSCs. Thus, S1P/LPA treatment synergizes with CHIR-mediated GSK3β inhibition to enhance the overall pool of cytoplasmic β-catenin and promotes its nuclear entry (FIG. 16D). Beyond promoting an increase in the cytoplasmic pool of β-catenin, S1P/LPA treatment appears to induce an increase in vimentin expression via a different mechanism, since the presence of Wnt inhibitor fails to abrogate the ability of S1P/LPA to simulate vimentin expression.

The increase in β-catenin nuclear localization could be due to stabilization of β-catenin (i.e. prevention of GSK3β-mediated degradation) or greater release of β-catenin from E-cadherin at the plasma membrane. However, the inability of S1P/LPA to directly induce early mesoderm markers such as Bry T (FIG. 17D-E) supports their independent effects on hiPS cell differentiation besides facilitating β-catenin nuclear translocation. This is further supported by the absence of a strong effect of S1P/LPA on LEF/TCF reporter expression (FIG. 16C, 19A) suggesting the involvement of Wnt/β-catenin independent mechanisms on hiPSCs cardiomyocyte differentiation. Identification of additional signaling pathways involved in mesodermal induction by S1P/LPA may help to further improve hiPSC cardiac differentiation.

Figure 19:
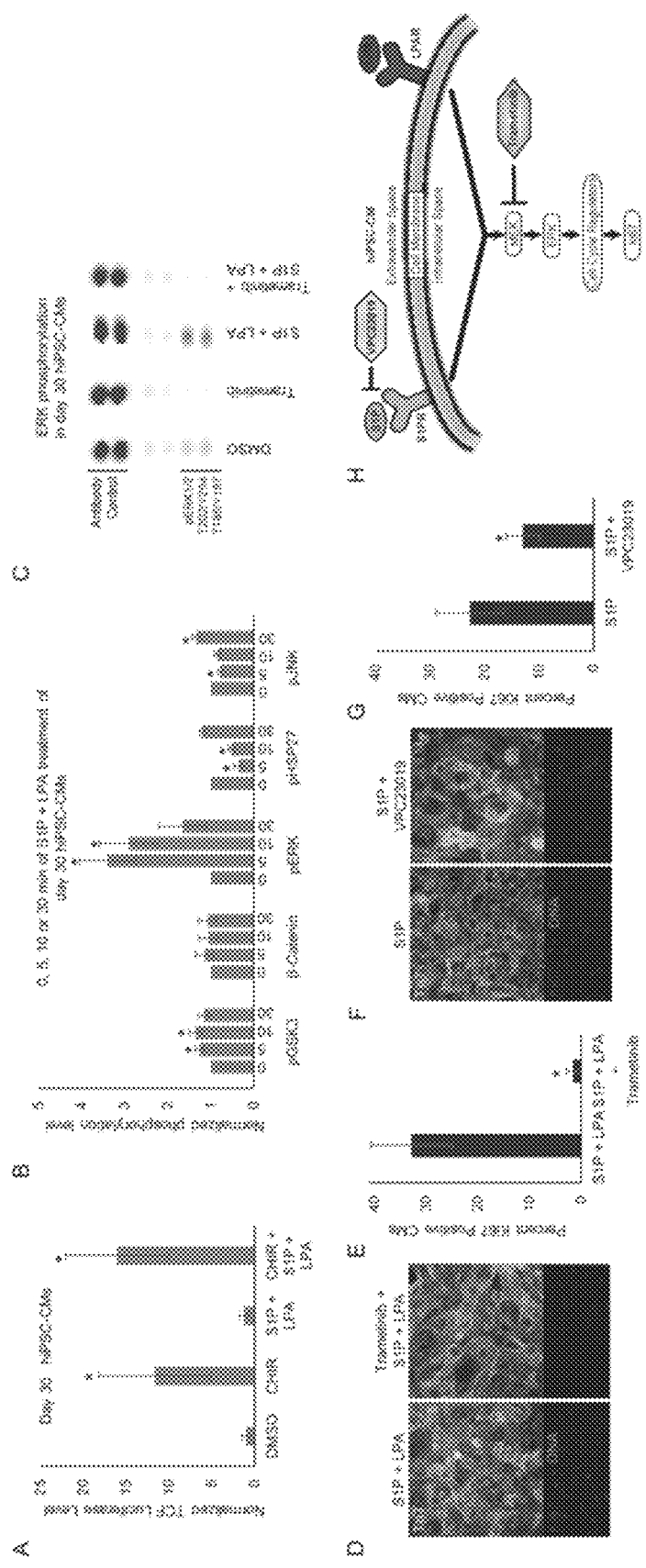
FIGS. 19A-19H report reactivation of cell cycle in hiPSC-CMs with S1P and LPA is dependent on ERK signaling. A) Luciferase luminescence intensity after transfection of day 30 hiPSC-CMs with TOPFlash Wnt signaling pathway activity reporter and 2-hour treatment with CHIR, S1P/LPA or both. The data shown represents fold increase over DMSO control. B) Quantification of kinase assays illustrating alterations in hiPSC-CM kinome phosphorylation in response to 0, 5, 10, and 30-minute S1P/LPA treatment. Data expressed as means±SEM. *indicates P<0.05. C) Representative kinase assay conducted in day 30 hiPSC-CMs treated with and without small molecule MEK inhibitor trametinib, with and without S1P/LPA (10 µM each). Spots corresponding to ERK phosphorylation and antibody control are labeled. D) Immunofluorescence for cardiac troponin T (TnT) (green), ki67 (red) and nuclear DNA (blue) in day 30 hiPSC-CMs treated with S1P and LPA in the presence or absence of MEK inhibitor trametinib. E) Quantification of the percentages of ki67 positive cardiomyocytes (CMs) in (D). *indicates P<0.001. F) Immunofluorescence for cardiac troponin T (TnT) (green), ki67 (red) and nuclear DNA (blue) in day 30 hiPSC-CMs treated with bioactive lipid S1P in the presence or absence of 5 µM S1P receptor antagonist VPC23019. G) Quantification of the percentages of ki67 positive CMs after S1P treatments with or without 5 µM VPC23019. H) Model illustrating the link between bioactive lipids and the canonical MAPK/MEK/ERK signaling pathway in differentiated hiPSC-CMs. N=4.

A finding that S1P/LPA treatment induced a strong and rapid up-regulation of MAPK/MEK/ERK signaling in well-differentiated hiPSC-CMs is unexpected. The ability of S1P/LPA to induce ERK signaling, a known regulator of cell proliferation, has been described in other cell types (Hannun et al. 2008). The MAPK/MEK/ERK pathway is required for S1P/LPA-induced ERK phosphorylation and cell cycle reentry by showing that treatment with trametinib, a MEK inhibitor, effectively abolished these effects (FIG. 19D-E). The involvement of MEK signaling is further supported by the S1P/LPA-induced down-regulation of HSP27 phosphorylation, a previously reported target of MEK that opposes ERK phosphorylation (McMullen et al. 2005).

Interestingly, the PI3-Akt pathway, a known pathway involved in cardiomyocyte proliferation (Lin et al. 2015), was not activated at baseline or by S1P/LPA treatment. This may be because these hiPSC-CMs are phenotypically immature or lack an optimal culture condition for stimulating PI3K-Akt signaling. These findings are also consistent with a recent study demonstrating involvement of ERK and YAP signaling in adult cardiomyocyte division (Bassat et al. 2017) and suggest that in vivo delivery of S1P/LPA may also enhance cardiomyocyte division.

The present methods with bioactive lipids and/or Wnt agonists may also apply to fetal or neonatal cardiomyocytes in vivo.

The stage specific effects of bioactive lipids on hiPSC differentiation and hiPSC-CM proliferation demonstrate a role for bioactive lipids in enhancing human iPSC differentiation into cardiomyocytes. While the efficiency of hiPS cell differentiation into CMs has increased remarkably in recent years, there remain significant variations among human iPSC lines and between different differentiation batches from the same line. This disclosure provides a greater understanding of the role of bioactive lipids in cardiovascular biology and a novel means of enhancing the production of hiPSC-CMs that can be used for downstream applications in cardiovascular disease modeling, drug screening, and regenerative medicine.

Materials and Methods for Examples 1-7

Cell Culture.

Four hiPS cell lines (LMNA, 273, 202 and HSPS) were maintained in DMEM/F12 (Thermo Fisher) supplemented with the essential eight (E8) (Thermo Fisher) growth factors in a Matrigel (Corning) coated (1:400 for 24h) polystyrene 2D culture system. Upon 80-90% confluency, cells were dissociated in PBS with 0.5% EDTA for 5-10 minutes at 37 degrees. Dissociation was performed with gentle pipetting to obtain little clumps of hiPS cells. Passaging was performed in 1:15-20 split ratios to reach total confluency within 4-5 days. For the first 24h 1004 of ROCK inhibitor Y-27632 (Selleckchem) was included in the hiPSC maintenance media.

CM production was done with the previously described canonical Wnt stimulation and inhibition in RPMI 1640 (Thermo Fisher) differentiation media with B27 minus insulin (Invitrogen). Between day 0-2 a gradient of CHIR99021 (Seleckchem) concentrations (3.0, 4.0, 5.0, 6.0, 7.0, 8.0 µM) was used. Between day 3-5 Wnt-059 (Selleckchem) was added to the differentiation media. At day 7 B27 with insulin was added to the differentiation media. At day 11, the wells containing by eyeballing more than 80% beating cells were incubated with TrypLE Select Enzyme 10X (Invitrogen) at 37 degrees for 20-40 minutes. Gentle rocking was performed every 10 minutes. Cells were dissociated very with gentle pipetting and transferred to a 15 mL conical tube containing a wash buffer (PBS with 20% FBS). Cells were spun down at 1000 RPM for 3 minutes and were replated in 1:10-15 split ratios in RPMI 1640+B27 with 10% Knock Out Serum Replacement (Gibco) and Thiazovivin 1.0 µM (Selleckchem). At day 12 hiPSC-CMs were further cultured for downstream assays in differentiation media supplemented with 2.0 to 4.0 µM CHIR99021 (Selleckchem). For the first 24h after passaging 10% Knock Out Replacement Serum and Thiozovivin 1.0 µM were added to the differentiation media.

Small Molecules/Growth Factors.

PNU74654, MK2206, CHIR99021 and Wnt-059 were obtained from Selleckchem. ScFV-DKK1c and RSPO were produced in recombinant cells lines in the Garcia lab (Stanford University). Purified Wnt3A protein was bought from (R&D systems).

Protein Expression Analysis.

Immunohistochemistry was performed with the incubation of primary antibodies overnight followed by 2 hours of incubation with various Alexa fluorescence conjugated secondary antibodies. Images were made with confocal (Zeiss LSM 710) or regular immunofluorescence microscopy (Leica DM IL LED). Primaries used in this study were cardiac troponin T (MS-295, Fisher), Ki67 (ab15580, Abcam), pHH3 (#9701, Cell Signaling), aurora B (ab2254, Abcam), alpha sarcomeric actinin (A7811, Sigma-Aldrich), MLC2V (ab48003, Abcam), phospo AKT T318 (#9275, Cell Signaling).

Kinase phosphorylation levels were screened with a Proteome Profiler Human Phospho-Kinase Array Kit (R&D Systems) containing 43 human kinases and total amounts of 2 proteins. Validation was performed with regular western blotting. Total protein expression was measured with a gel imager (Biorad) and processed with pixel intensity software (Biorad).

Luciferase Assays.

Day 12 hiPSC-CMs were transfected for 48h with a TCF reporter plasmid (TOPflash M50, Addgene) or the mutant reporter plasmid (TOPflash M51, Addgene) and the use of Lipofectamine 3000 (Invitrogen). 72h after transfection cells were treated with various small molecules for 24h. Cells were lysed and mixed with luciferase substrate (Promega) and the firefly luciferase expression was measured with a 96-well micro plate reader (Fisher).

Real-Time PCR Expression Analysis.

For quantitative analysis of gene expression, RNA was extracted with a lysis buffer (Qiagen) from hiPSC-CMs and stored at −80° C. Total RNA from each sample was purified from cell lysate using a RNA purification kit (Qiagen). cDNA was made using iScript cDNA synthesis kit (BioRad). Quantitative PCR was performed using a 96-well thermocycler system (Biorad) with SYBR Green substrate (Affymetrix) for 40 cycles. All primers sequences were obtained from the PrimerBank (Massachusetts General Hospital/Harvard Medical School) online database. Oligos were synthesized at Stanford University.

Single Cell Gene Expression Analysis.

For the single cell gene expression replated hiPSC-CMs were treated at day 12 with DMSO, CHIR99021 or C59 for 24 hours. At day 13 cells were digested with TrypLE Select Enzyme for about 5 minutes and dissociated with gentle pipetting. Samples were washed and suspended in ice cold RPMI 1640 with B27 supplement and submitted for 10× Genomics single cell capture platform. cDNA libraries were made and used for Illumina HiSeq sequencing resulting in a mean of 93.522 reads per cell. Single cell analysis was performed with the Loupe Cell Browser software.

Flow Cytometry.

Freshly isolated hiPSC-CMs were fixed in PFA 4% for 5 minutes and stained for TnT (MS-295, Fisher) for 1 hour at room temperature. After multiple washing an Alexa488-mouse secondary antibody was applied for 30 minutes. Samples were analyzed by flow cytometry using FACSCalibur® (BD Biosciences). Flow cytometry and cell cycle data were acquired on a FACSCalibur® (BD Biosciences) flow cytometer and processed by FlowJo software (Treestar).

Electrophysiological Studies of Expanding hiPSC-CMs.

Prior to electrophysiological studies, expanding HiPSC-CMs passaged for 3 times in RPMI 1640+B27 Supplement+CHIR99021 and controls kept for an equivalent number of days RPMI 1640+B27 Supplement were seeded sparsely on Matrigel coated 8 mm coverslips. Cells on coverslips were bathed in extracellular solution containing 140 mM NaCl, 2.8 mM KCl, 2 mM $CaCl_2$), 2 mM $MgCl_2$, 10 mM HEPES, and 10 mM glucose, at pH 7.4. Patch electrodes were filled with an intracellular solution containing 140 mM potassium gluconate, 10 mM NaCl, 2 mM $MgCl_2$, 10 mM HEPES, 1 mM EGTA, 4 mM Mg-ATP, and 0.3 mM Na-GTP, at pH 7.3, hence, giving resistances of ~2-5 M'Ω. Spontaneous CM action potentials were recorded at room temperature in a sharp current clamp mode.

Single Cell Patterning and Contractility.

Cells were plated on soft substrates with micropatterned proteins on top. After 3-6 days of culture high resolution movies (Sony Microscopy) were recorded for at least 10 individual cells per group and motion velocity analysis was processed digitally. After recordings, cells were fixed and used for immunohistochemistry and confocal imaging. Sarcomere alignment was quantified with Image J software.

In Vivo Studies in Mice.

C57/BL6 mice (Jackson Laboratory, Barharbor, ME) were injected twice a week with soluble scFv-DKK1c Wnt protein week 4 and 8 after birth. Euthanasia was performed by first sedating the mice via isoflurane (inhalant, 2% in 100% oxygen, neonate placed on a warm pad), followed by a secondary cervical dislocation. Death was verified after euthanasia and prior to disposal. All animal experiments were approved by the animal care and use committee (APLAC) at Stanford University. All experiments were performed in accordance with relevant guidelines and regulations of Stanford University. Body and heart weights were measured by a blinded observer. Freshly isolated adult hearts were dissected from mouse chest cavity and washed in PBS to remove excess blood. The postnatal hearts were incubated in 30% sucrose in phosphate buffered solution (PBS) overnight followed by step-wise incubation with a graded concentration of OCT in PBS for cryosectioning. Following cryopreservation, hearts were cut into 10 μm sections and lightly fixed in 4% paraformaldehyde in PBS prior to immunostaining. Hematoxylin and eosin staining of histological sections was performed according to manufacturer suggested protocol. All quantitative analyses of the histological sections were performed on numerically-coded animals in an observer-blinded fashion to prevent subjective bias in data analysis.

Data Analysis.

Numerical data are presented as mean±standard deviation or SEM. Statistical significance was performed using a two-tailed paired t-test with equal variance. Values of p<0.05 were considered statistically significant.

Example 1. Wnt Stimulation Results in Massive Expansion of Beating hiPSC-CMs Upon Serial Passaging During cardiac differentiation of hiPS cells, the capacity of beating hiPSC-CM to divide declines rapidly and is accompanied by increases in sarcomeric organization and contractile force generation, mimicking the maturation process of neonatal cardiomyocytes in vivo. While Wnt activation during late embryonic development appears to enhance CM proliferation in mice (Buikema et al., 2013; Titmarsh et al., 2016; Uosaki et al., 2013), it is unclear whether beating hiPSC-CM can respond similarly in vitro and the degree of expansion that can be achieved following serial passaging.

Figure 8:
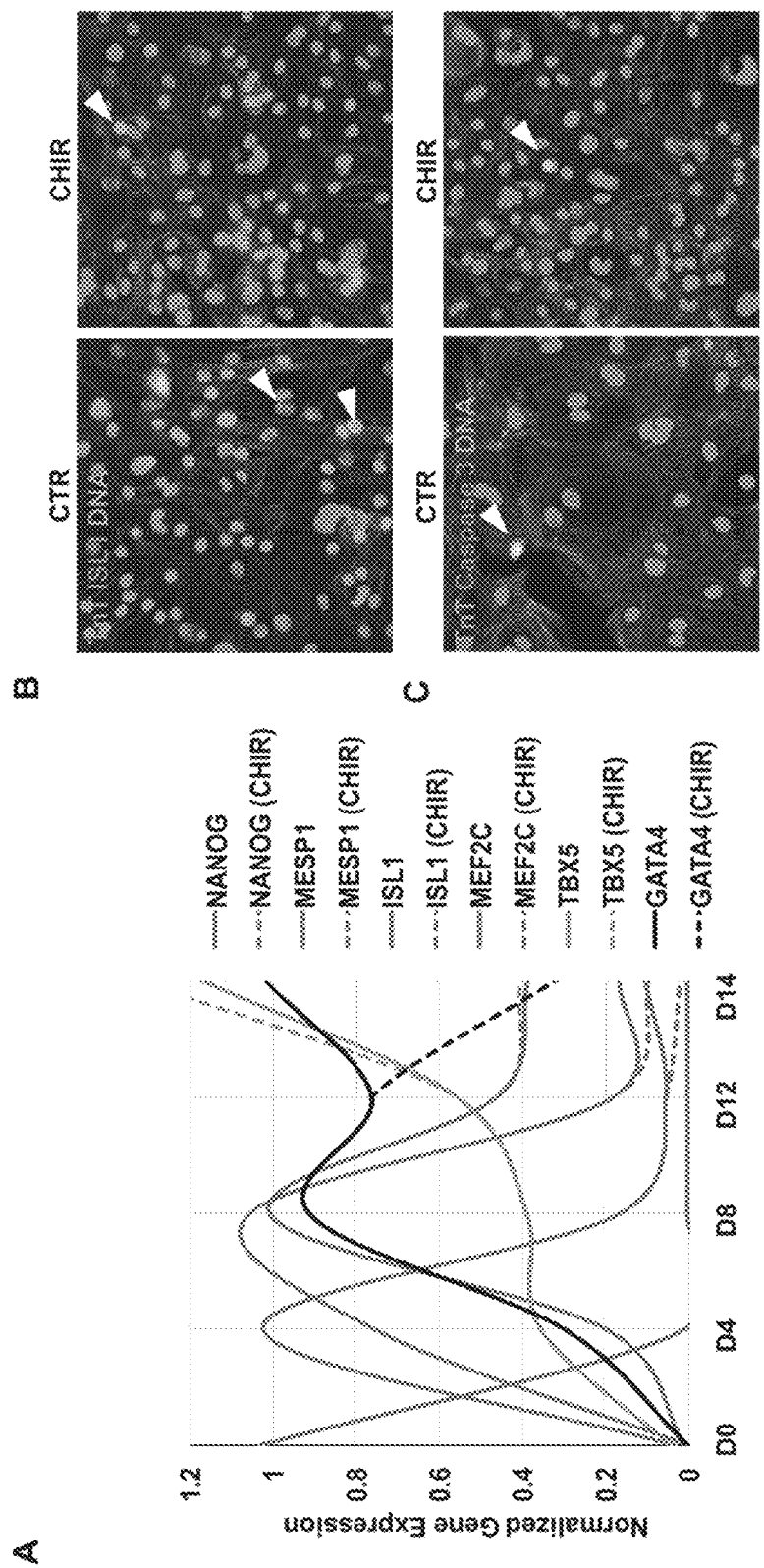
FIGS. 8A-8C report gene expression analysis of hiPSC cardiac differentiation. (A) Pluripotent, cardiac mesoderm, cardiac progenitor and cardiomyocyte transcription factor expression during hiPSC-CM differentiation. Dashed lines indicated gene expression in samples treated with 2.0 □M CHIR from day 12 to 14. Immunofluorescence images of ISL1 (B) and Caspase 3 (C) expression in day 14 hiPSC-CMs treated with CHIR or DMSO (CTR) are shown.

To address this, four previously validated wild type hiPS cell lines were differentiated using the established biphasic Wnt signaling protocol to generate a CM purity of ~85% by day 11 of differentiation (Burridge et al., 2014; Lian et al., 2013). These cells expressed stage-specific gene expression for pluripotent stem cells (NANOG), mesoderm (MESP1) and cardiac progenitor cells (Isl1) before committing to the cardiomyogenic lineage (FIG. 8A-B).

These hiPSC-CMs initiate beating on day 7 of differentiation and were treated on day 12 with or without 2.0 μM CHIR99021 (CHIR), a GSK3β inhibitor that activates the canonical Wnt signaling, and serially passaged. Remarkably, in the presence of CHIR, the hiPSC-CMs continue to divide without notable cell death (FIG. 8C) and can be passaged up to 5 times while control dimethyl-sulfoxide (DMSO)-treated cells cease to proliferate after the first passage (FIG. 1A-C). Interestingly, CHIR-treated early passage hiPSC-CMs continued to beat (Supplementary Movie 1) while actively dividing, reaching confluence within 5-7 days after passaging (FIG. 1D), resulting in greater than 100-fold increase in the total cell number (FIG. 1E) and CM number (FIG. 1F-G).

Typically, a preparation of 2 million day 12 hiPSC-CMs will generate 300-900 million hiPSC-CMs. Furthermore, CHIR-treatment appears to maintain, if not slightly enrich, for CM purity as opposed control DMSO-treated hiPSC-CMs which decreased CM purity with each passage (FIG. 1H-I), most likely due to over-growth of non-myocytes. Collectively, these data support the ability of Wnt signaling activation, via GSK3β inhibition, and serial passaging to achieve massive expansion of beating hiPSC-CM in vitro.

Example 2. Extension of hiPSC-CM Proliferative Window by Wnt Signaling

The massive expansion of beating hiPSC-CMs by CHIR-treatment raises intriguing questions regarding the mechanism responsible for the increased iPSC-CM division. To examine this, the percentage was determined of troponin T (TnT) positive hiPSC-CMs that express the cell cycle marker ki67 or the mitosis marker phospho-histone H3 (pHH3) at each passage after treatment with CHIR or DMSO (CTR) (FIG. 2A-C).

Figure 9:
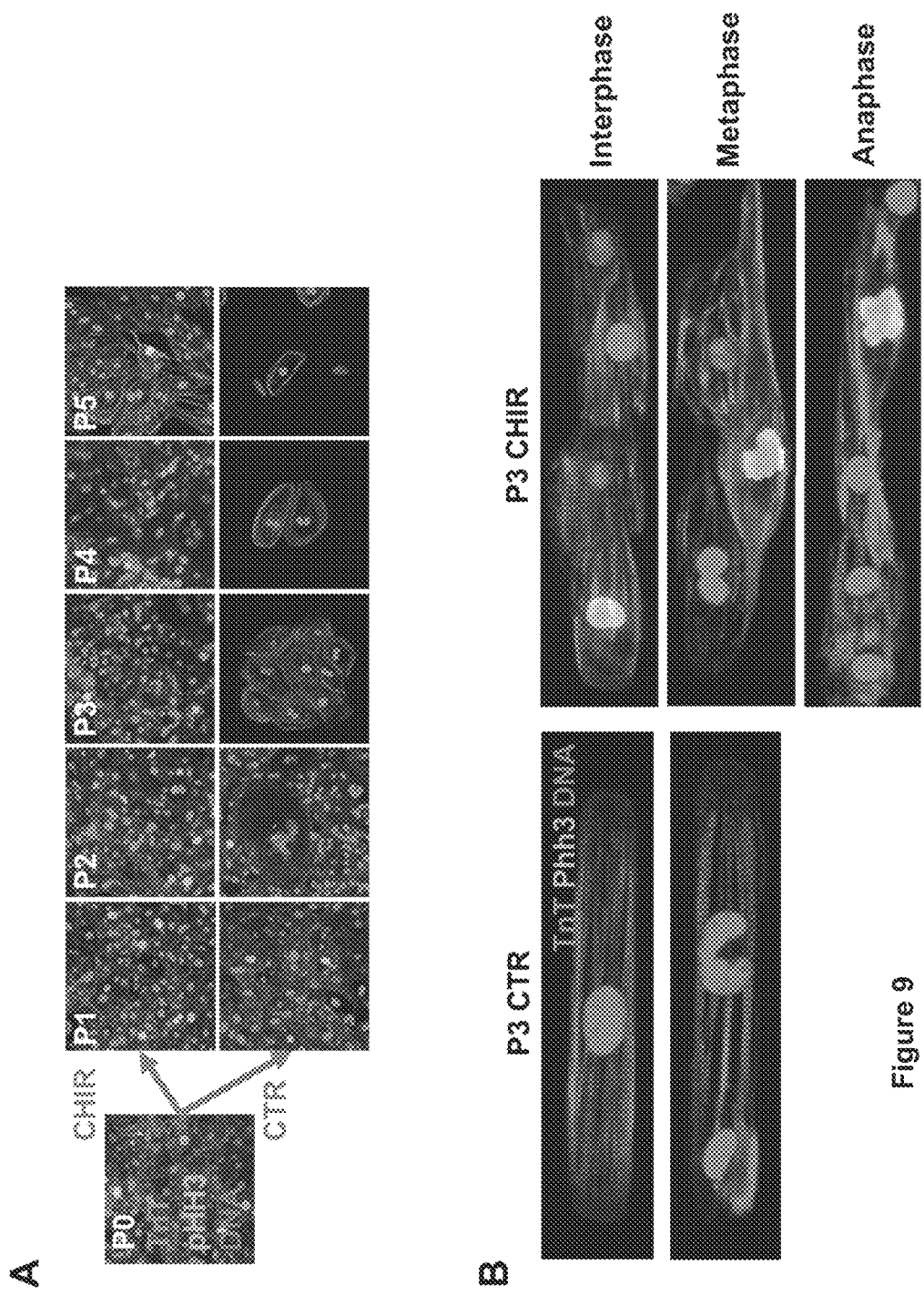
FIGS. 9A-9B report phenotypic analysis of hiPSC-CM proliferation upon Wnt stimulation. (A) Immunofluorescence images for TnT and pHH3 expression in hiPSC-CMs at various passages after treatment with CHIR or DMSO (CTR). (B) Immunofluorescence images of TnT pHH3 expression in CTR and CHIR-treated hiPSC-CM at passage 3 (P3) on micropatterned substrate demonstrating the presence of disorganized sarcomeric structure and multiple hiPSC-CMs at different phases of mitosis in CHIR-treated but not in CTR-treated cells.

Interestingly, while CTR hiPSC-CMs showed a rapid decline in their expression of ki67 and pHH3 with each passage where only a small number of mitotic cells can be observed after passage 2 (P2), CHIR-treatment resulted in significant extension (up to 5 passages) of the window of proliferation (FIG. 2C and FIG. 9A). To further elucidate the characteristics of proliferating CMs, confocal imaging was performed of mitotic CMs on single cell micropatterns (Ribeiro et al., 2015). In the presence of CHIR, mitotic CMs were abundant, especially in the anaphase and telophase where they are accompanied by disassembled sarcomeric structures (FIGS. 2D-E and FIG. 9B). Aurora B kinase staining of hiPSC-CMs treated with CHIR showed that hiPSC-CMs can undergo cytokinesis to complete cell division (FIG. 2F). Furthermore, CHIR-treated hiPSC-CMs exhibit less binucleation when compared with CTR or C59 treated cells. (FIG. 2G-H).

The ability of CHIR to increase hiPSC-CM proliferation when compared with control DMSO treatment may be accomplished by directly increasing the rate of CM proliferation/division, by prevention of CM maturation and cell cycle arrest, or both. The short-term (24 hrs) changes were assessed in proliferation rate of day 12 hiPSC-CMs (P0) after treatment with CHIR-, CTR-, or C59, a specific inhibitor of Wnt signaling (FIG. 2I-J).

A significant difference in ki67 expression in hiPSC-CMs between CHIR and CTR/C59 treatment was found. However, it was noted that the frequency of proliferating hiPSC-CMs was unchanged between CHIR-treated hiPSC-CMs from the starting hiPSC-CM population (CTR at 0 hr) (FIG. 2I-J). This relatively modest effect of CHIR on directly stimulating hiPSC-CM proliferation raises the possibility that CHIR-treatment may also prevent hiPSC-CM maturation and cell cycle arrest in order to achieve the massive expansion in cell number over time (FIG. 1). Furthermore, the negligible baseline level of Wnt signaling activity in these hiPSC-CMs (FIG. 2K) explains why treatment with C59 did not result in a decreased rate of hiPSC-CM proliferation when compared with CTR treatment (FIG. 2I-J).

These results demonstrate the ability of CHIR to significantly extend the proliferative window of hiPSC-CMs by maintaining cell cycle activity and preventing binucleation.

Furthermore, the present immunostaining data demonstrate that hiPSC-CMs disassemble their aligned sarcomeres during active mitosis, a finding that suggests the suppression of hiPSC-CM maturation by Wnt signaling.

Example 3. Phenotypic Assessment of hiPSC-CMs Following Wnt Stimulation

CM maturation is accompanied by the formation of highly structured sarcomere, bi- or multinucleation, and cell cycle exit (Bassat et al., 2017; Bersell et al., 2009; Senyo et al., 2014; Uygur and Lee, 2016). The observed massive expansion of beating hiPSC-CMs following Wnt stimulation raises the possibility that maturation arrest may accompany their retained capacity to proliferate. To address this, age-matched hiPSC-CMs exposed to media containing DMSO (CTR) were compared to ones that have undergone 3 passages in media containing 2.0 μM CHIR using various phenotypic assays of CM function. To assess sarcomere alignment, CHIR and CTR hiPSC-CMs on 7:1 aspect ratio micropatterns (Ribeiro et al., 2015) were cultured and immunostained with TnT and sarcomeric actinin antibodies.

The CTR-treated hiPSC-CMs demonstrated highly organized and aligned sarcomeres while CHIR-treated hiPSC-CMs divided actively while on the micropatterns and exhibit markedly reduced alignment and organization of sarcomeres (FIG. 3A). This difference in sarcomeric fiber alignment was quantified by automated imaging assessment of the angle of deviation of the sarcomeric fibers from vertical (defined as 0 degrees) (FIG. 3B-C), confirming the observed sarcomere disorganization in CHIR-treated hiPSC-CMs.

Interestingly, when C59 was added to cells that have previously been treated with CHIR (CHIR>C59), these cells divided first followed by reorganization of their sarcomeres to a state similar to the age-matched control hiPSC-CMs that have not undergone CHIR-treatment (FIG. 3A-C).

Assessment of the contractile properties of CTR and CHIR-treated cells demonstrate the decreased force generation in CHIR-treated cells (FIG. 3D and Supplementary Movie 2-4). Single cell electrophysiological studies of age-matched CHIR- and CTR treated hiPSC-CMs showed similar spontaneous action potentials (FIG. 3E-F) and calcium imaging (FIG. 3G-H). Overall, these data strongly support the inhibition of CM maturation by Wnt signaling activation, a phenomenon that has also been observed in second heart field-derived cardiac progenitor cells and other cell types upon Wnt stimulation (Qyang et al., 2009; Sato et al., 2004; Yin et al., 2014).

To confirm the maturation arrest phenotype at the transcriptional level, iPSC-CMs treated with CHIR-containing media from differentiation day 12 to 28 were cultured for 3 additional weeks in the presence of either CHIR (2.0 μM), DMSO (CTR), or C59 and harvested for RNA purification and real-time quantitative PCR analysis. When compared with hiPSC-CMs treated with CHIR, hiPSC-CMs treated with DMSO or C59 showed an upregulation of markers associated with cardiomyocyte maturation (MYL2, TNNI3, MYOM2), excitation (GJA1), contractility (RYR2) and metabolism (COX6A2, CKMT) (FIG. 3I-K). These findings were supported at the protein level by the increase in immunofluorescence staining for MYL2 in DMSO- and C59-treated hiPSC-CMs compared with CHIR-treated cells (FIG. 3L-M).

Given the diverse role for Wnt signaling to regulate cell lineage commitment and differentiation, a prolonged exposure to CHIR may lead to hiPSC-CM phenotype conversion or oncogenic transformation that prevent them from appropriate maturation, a finding that would significantly hamper their use in cell therapy or drug discovery applications. Day 12 hiPSC-CMs were cultured in CHIR continuously for 2 months with serial passaging followed by CHIR withdrawal for an additional month.

Figure 10:
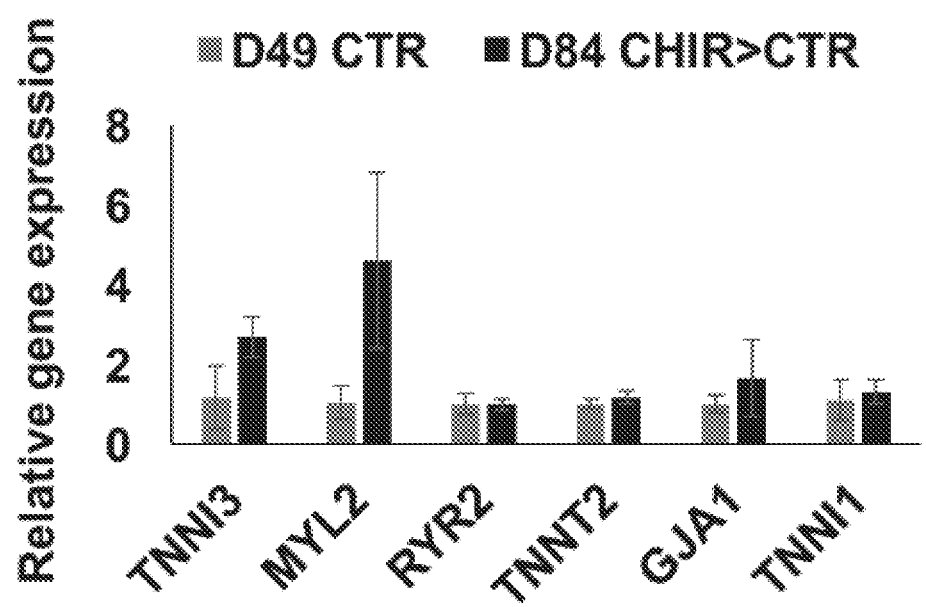
FIG. 10 reports real-time quantitative PCR analysis of cardiac gene expression. Three-months old hiPSC-CMs that were treated with or without CHIR for the first two months were harvested for qPCR analysis of cardiac genes expression.
Figure 11:
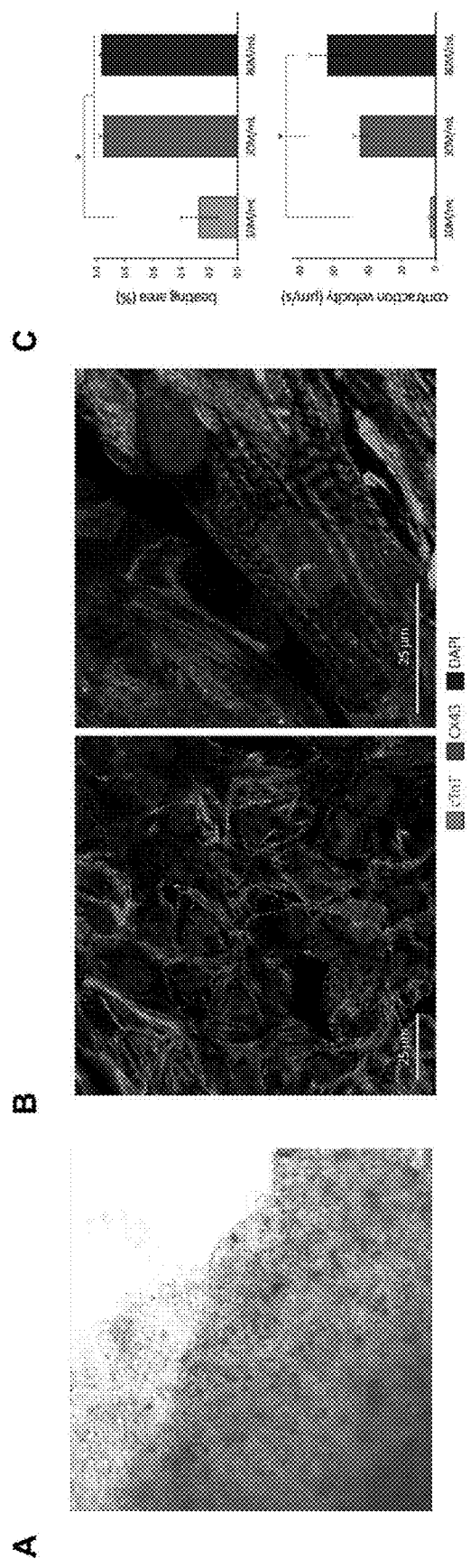
FIGS. 11A-11C report generation of 3D cardiac tissue using CHIR-treated hiPSC-CMs. (A) Bright field image of CHIR-treated hiPSC-CMs encapsulated in collagen-based hydrogels and cultured in vitro for 7 days. (B) Immunofluorescence images showing organized sarcomeres and expression of Cx43 gap junction protein in engineered cardiac tissue in (A). (C) Quantification of the amount of beating area and contraction velocity in 3D cardiac constructs generated with the indicated starting number of CHIR-treated hiPSC-CMs.

At the end of 3 months, CM gene expression was measured and compared with their age-matched control hiPSC-CMs not exposed to CHIR at day 12 and after (FIG. 10). It was found that the expression of maturation markers (e.g. MYL2, TNNI3) was similar if not slightly increased in cells treated for two months with CHIR, supporting the absence of aberrant phenotype conversion in hiPSC-CMs following prolonged Wnt stimulation. This finding was also confirmed from a functional perspective, where CHIR-treated hiPSC-CMs was able to generate beating 3D cardiac tissue (FIG. 11). Altogether, these data demonstrate that Wnt stimulation, by GSK3β inhibition, prevents maturation of hiPSC-CMs but upon withdrawal of Wnt stimulation, these cells remain capable of undergoing maturation.

Figure 4:
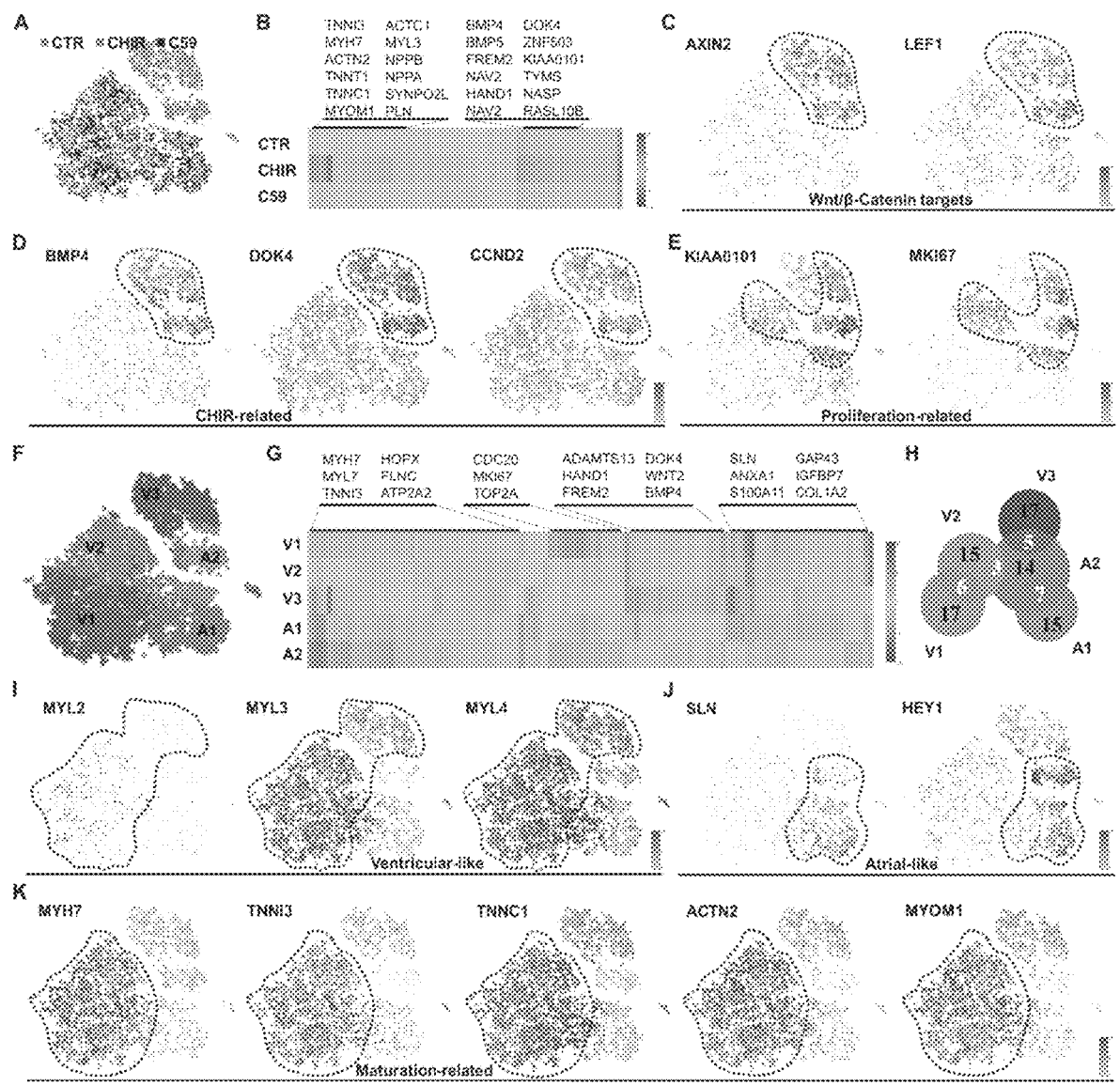
FIGS. 4A-4K report single cell RNA sequencing analysis of hiPSC-CM following gain and loss of Wnt signaling. (A) t-SNE plot of day 12 hiPSC-CM that have been treated with DMSO CTR (gray), CHIR (yellow), or C59 (black) for 24 hrs. (B) Heat map of significantly differentially expressed genes from the three groups in (A). (C) Expression of Wnt target genes. (D and E) Expression of proliferation genes. Note the increase in their expression in CHIR-treated cells. (F) t-SNE plot displaying unsupervised clustering of single hiPSC-CMs from (A). (G) Heat map of differentially expressed genes in unsupervised clusters. (H) Genes per cluster used for pathway enrichment analysis. (I) Expression of ventricular markers in single hiPSC-CMs. (J) Expression of atrial markers cells. (K) Expression of ventricular maturation markers. For all panels shown, genes represent p<0.01.

Example 4. Single-Cell RNA Sequencing Analysis of hiPSC-CMs Following Gain and Loss of Wnt Signaling To investigate the global transcriptional changes of hiPSC-CMs in response to gain and loss of Wnt signaling, single cell RNA sequencing was performed in day 12 hiPSC-CMs treated for 24 hours with either DMSO (CTR), CHIR or C59. A total of 8,381 cells were captured and 93,552 mean reads per cell were performed resulting in a median of 1,297 genes read per cell (FIG. 4).

The single-cell gene expression data was first analyzed by using T-Distributed Stochastic Neighbor Embedding (tSNE) algorithm to perform dimensionality reduction in our 3 treatment samples (FIG. 4A). It was found that mature cardiac genes were dramatically downregulated while Wnt signaling targets genes and cardiogenic transcription factors were highly upregulated in hiPSC-CMs treated with CHIR versus hiPSC-CM treated with CTR or C59 (FIG. 4B). Specifically, the Wnt target genes AXIN2, LEF1, BMP4, DOK4 were elevated in almost all cells treated with CHIR (FIGS. 4C and D), whereas the genes associated with the cell cycle activation such as CCND2, MKI67, and KIAA0101 were upregulated only in a subset of hiPSC-CMs after CHIR treatment (FIG. 4D-E). Importantly, stimulating Wnt signaling did not result in increased expression of the cardiac progenitor markers Isl1 and MESP1/2, suggesting that expansion of hiP SC-CM with CHIR does not lead to expansion of a rare population of residual cardiac mesoderm or second heart field progenitor cells (FIG. 12C) (Wu et al., 2008).

To further investigate the distinct sub-populations of hiPSC-CMs in the presence or absence of Wnt signaling, an unsupervised clustering of all cells was performed, resulting in a total of 5 clusters (FIG. 4F). Based on their gene expression signature for atrial vs ventricular CMs (FIG. 4G-H), these clusters were re-assigned as V1-3 for ventricular CM 1-3 and A1-2 for atrial CM 1-2. These assignments were confirmed by the V1-3 cluster-specific expression of ventricular genes such as MYL2 and early fetal ventricular markers MYL3 and MYL4 (FIG. 4I) and A1-2 cluster-specific expression of atrial markers such as HEY1 and SLN (FIG. 4J).

The expression of mature ventricular genes such as MYH7, TNNI3, TNNC1, ACTN2 and MYOM1 between ventricular clusters V3 (i.e. CHIR-treated ventricular iPSC-CMs) and V1-2 (CTR and C59-treated ventricular iPSC- CMs) was compared, and a dramatic reduction in the expression of maturation markers in V3 cluster cells was detected as compared with V1-2 cluster cells (FIG. 4K). These data further demonstrate the suppression of iPSC-CM maturation by Wnt signaling resulting in an extended window of proliferation and massive hiPSC-CM expansion.

Example 5. Requirement of AKT Kinases Phosphorylation in Wnt/β-Catenin Signaling-Independent hiPSC-CM Proliferation While CHIR-mediated Wnt/β-catenin signaling occurs via GSK3β inhibition, GSK3β is known to be involved in multiple cellular process beyond its inhibition of canonical Wnt signaling. To examine whether a non-β-catenin-mediated event is involved in hiPSC-CM proliferation, we treated cells with CHIR in the presence of PNU74654, a specific TCF/LEF β-catenin signaling blocker (Trosset et al., 2006) and assess the changes in hiPSC-CM proliferation when compared with cells treated with CHIR alone.

Interestingly, it was found that while CHIR-mediated hiPSC-CM proliferation decreased by ~50% (FIG. 5A), the CHIR-induced activation of the TCF/LEF luciferase reporter was abolished (FIG. 5B). This suggests that non-β-catenin mediated signaling contributes to half of the proliferative activity observed with CHIR treatment.

It was confirmed, by real time quantitative PCR, the induction of Wnt signaling target gene expression (e.g. Axin2, LEF, and CCND2) following CHIR treatment in hiPSC-CMs (FIG. 5C) and the ability of PNU74654 treatment to abolish this increase. The expression of markers of hiPSC-CM maturation (MYL2, MYH7, MYOM1) were down-regulated by CHIR treatment and the recovered fully upon the co-treatment with PNU746554 (FIG. 5C). These results demonstrate that β-catenin-dependent signaling potently regulates hiPSC-CM maturation while GSK3β-mediated but β-catenin-independent signaling drives cell cycling by hiPSC-CM.

To identify the downstream kinase(s) involved in CHIR-mediated hiPSC-CM proliferation, a library of 43 kinases was screened with known functions (FIG. 5E and FIG. 12) and a significant upregulation of AKT1/2/3 phosphorylation at the residues T308 was discovered (FIG. 5E) which is a residue required for AKT activation and cell division (Liu et al., 2014).

Furthermore, increased phosphorylation of an AKT binding protein HSP27 was also discovered, a downstream AKT target p70S6K, as well as a subtle increase in the phosphorylation of growth suppressor P27 (FIG. 5E) (Conejo et al., 2002; Song et al., 2005). Using an antibody directed against the T308 residues of phosphorylated AKT (pAKT), it was confirmed that the active form of AKT was rapidly increased following the addition of CHIR to the cell culture vs DMSO-treated controls (FIG. 5F-G).

To investigate the localization of pAKT within CMs, day 12 hiPSC-CMs were cultured for 6 days in DMSO (CTR) or with CHIR and found that T308 pAKT was abundantly expressed in the cytoplasm of mitotic CMs (FIG. 5H, left two panels and FIG. 12A). Consistently, actively proliferating CMs within the fetal murine heart similarly demonstrated increased cytoplasmic pAKT (FIG. 13).

The role of T308 pAKT in mitotic CMs was determined by using a previously described highly selective AKT phosphorylation inhibitor MK2206 (Lindsley et al., 2007). When cells were treated with CHIR and MK2206, CM replication decreased when compared to CHIR-treatment alone and far fewer mitotic cells were observed expressing pAKT (FIG. 5H-J) Investigating the TCF/LEF luciferase activity for all treatment conditions demonstrated that the observed decrease in hiPSC-CM proliferation with MK2206 was not due to the downregulation of downstream β-catenin signaling but rather, it was due to the inhibition of pAkt that led to decreased proliferation (FIG. 5K). These data support the role of CHIR in the activation of the AKT pathway and confirms the role of Wnt signaling in regulating maturational and proliferative changes.

Example 6. Wnt Receptor-Ligands Induce CM Cell-Cycle Reactivation

Reactivating Wnt signaling may promote proliferation in aged, non-proliferative CMs rather than simply maintain pre-existing proliferation (FIG. 6A). Firstly, it was tested the efficacy of established Wnt receptor ligands in day 12 proliferative hiPSC-CMs and found indeed that Wnt3A and the Wnt surrogate ScFv-DKK1c promoted CM expansion (FIG. 6B-C). Next, hiPSC-CMs were differentiated for 60 days and treated with the Wnt surrogate ScFv-DKK1c. It was observed that a small but significantly increased fraction of CMs became mitotic (FIG. 6D-E). These results demonstrate that Wnt-activation is sufficient to reactivate the cell cycle in a small subset of CMs resulting in cell proliferation.

Example 7. Wnt Surrogate Promotes Adult Myocardial Growth

The Wnt signaling may be sufficient to promote CM proliferation in the adult myocardium in vivo. Multiple Wnts are known to be present in the murine fetal heart (Mazzotta et al., 2016), including Wnt3A, however, due to its solubility it is less suitable for in vivo applications. A recently developed Wnt surrogate ScFv-DKK1c is fully water soluble and was therefore used in these in vivo studies (Janda et al., 2017). Eight-week-old adult mice were treated with the Wnt surrogate or carrier control ($H_2O$) for 4 consecutive weeks. After 4 weeks of treatment we observed that the hearts from Wnt surrogate treated mice appeared bigger than the mice treated with the carrier control (FIG. 7A and FIG. 13A). This observation was supported by increased heart-weight body-weight ratios (FIG. 7B) and LV diameter (FIG. 7D). H&E staining showed globally normal hearts with increased dimensions (FIG. 7C-E). Cellular analysis revealed that the relative CM size were comparable in mice treated with or without the Wnt surrogate (FIG. 7F-G), indicating that Wnt surrogate treatment promoted adult myocardial growth.

Experimental Procedures for Examples 8-12

Chemically-Defined Differentiation of hiPSC-CMs.
To produce human cardiomyocytes from pluripotent stem cells, hiPSCs were differentiated into hiPSC-CMs with a chemically-defined cardiomyocyte differentiation protocol. These hiPSC-CMs were maintained in RPMI 1640 media supplemented with recombinant human albumin and ascorbic acid (CDM3) 10. Briefly, hiPSCs were first treated with a small molecule inhibitor of GSK3β signaling, CHIR99021, to activate the Wnt signaling pathway. Two days later, cells were treated with a Wnt signaling inhibitor, Wnt-059, until day 4. Afterwards, CDM3 media without any small molecules was changed every two days. To purify cardiomyocytes, the cell population was glucose-starved and supplemented with 5 mM sodium DL-lactate for 2 to 4 days to metabolically select hiPSC-CMs 44. When replating hiPSC-CMs, cells were dissociated with TrypLE Express (Life Technologies) and reseeded on Matrigel-coated plates.

96-Well Differentiation, Imaging, and Quantitative Viability Assays

For 96-well, hiPSC-CM differentiation assays, hiPSCs were plated in Matrigel-coated 96-well plates at 1000 cells per well and allowed to adhere for 4 days. The hiPSCs were subsequently treated with bioactive lipids at the indicated concentrations and durations and assessed following day 8 of the chemically-defined hiPSC-CM differentiation protocol. Immunostaining using previously-published protocols was conducted to qualitatively assess cell viability and cardiomyocyte differentiation efficiency (Sharma et al. 2014). Fluorescence intensity and cell number was quantified using ImageJ software. For quantitative viability measurements, cells were treated with CellTiter-Glo 2.0 Viability Assay (Promega) or PrestoBlue reagent (Life Technologies) per manufacturer-recommended procedures. 96-well imaging and viability assays were conducted using a Cytation 5 plate reader/imager (BioTek Instruments). Prism (GraphPad) was utilized for graph generation and statistical analysis. Confocal imaging was performed using a Zeiss LSM 510Meta microscope (Carl Zeiss) using Zen software.

Small Molecules.

S1P and LPA were obtained from Sigma Aldrich and dissolved in water at 1 mM and 10 mM stock solutions. S1P and LPA were applied in 10 µM final concentrations unless otherwise specified. C59 and CHIR99021 were obtained from Tocris Bioscience and dissolved in DMSO at 10 mM stock concentrations. S1P antagonist VPC 23019 was obtained from Tocris Bioscience and dissolved in acidified DMSO.

Kinase phosphorylation profiling. Phosphorylation of human kinases and other phosphoproteins (Table S1) was determined using a Human Phospho-Receptor Tyrosine Kinase (RTK) Array or Human Phospho-Kinase Antibody Array (R&D Systems). Cells were treated with bioactive lipids at indicated concentrations and durations. An RTK or phospho-kinase panel was incubated overnight with 10 mg cell protein lysate and subsequently with an anti-phosphotyrosine-horseradish peroxidase antibody to assess phosphorylation. Blots were developed using a Gel Doc XR (Bio-Rad). Phosphorylation intensity was determined using Image? software.

Luciferase Luminescence Measurements.

HiPSCs and day 30 hiPSC-CMs were replated in 96-well plates and cultured for 2-3 days before transfection with Lipofectamine (Invitrogen) and TOPFlash (TCF/LEF) luciferase Wnt signaling reporter plasmid (M50, Addgene) at 100 ng/well. After 48 hours, media was changed, and cells were subjected to different treatments for 2 hours before lysis and luciferase (Promega) luminescence was measured with a standard luminescence plate reader.

Gene Expression.

Quantitative real-time PCR was used to assess the gene expression level of specific gene of interest following bioactive lipids treatment. RNA was isolated using an RNeasy Plus kit (QIAGEN), and cDNA was produced using the High-Capacity RNA-to-cDNA kit (Applied Biosystems). Real-time PCR was performed with CFX™ Connect Real-Time System (BIO-RAD) using the USB® HotStart-IT® SYBR® Green qPCR Master Mix (2X) (Affymetrix). qPCR reactions were performed in duplicate, normalized to the reference gene GAPDH, and assessed using the comparative Ct method (Schmittgen et al. 2008). For more comprehensive transcriptome analysis of hiPSCs following bioactive lipids treatment, a GeneChip® Human Gene 1.0 ST DNA Microarray was used (Affymetrix).

Statistical Methods.

Data presented as mean±standard deviation unless otherwise specified. Comparisons were conducted via Student's t-test with significant differences (*) defined by $P<0.05$, unless otherwise specified. For microarray, multiple P-value comparisons were made using a one-way between-subject ANOVA ($P<0.05$) using Affymetrix Transcriptome Analysis Console 2.0 software.

Movie S1:

hiPSC-CMs after purification via glucose deprivation. Following differentiation, hiPSC-CMs begin to spontaneously contract at approximately day 8-10 after cardiac differentiation is initiated. Following glucose deprivation, cell sheets contained a purer population of hiPSC-CMs. Movie at 10× magnification.

Derivation of Human Induced Pluripotent Stem Cells (hiPSCs).

All the protocols for this study were approved by the Stanford University Institutional Review Board. Reprogramming was conducted according to a previously-published protocol (Churko et al 2013). In summary, peripheral blood mononuclear cells (PBMCs) were obtained by conducting a standard blood draw from consenting individuals and isolated using a Ficoll gradient separation. PBMCs were reprogrammed using a Sendai virus vector expressing OCT4, KLF4, SOX2, and MYC (OKSM) (Life Technologies) following the protocol supplied by the manufacturer. Approximately one month after reprogramming, hiPSC clones were isolated and cultivated on growth factor-reduced Matrigel (Corning)-coated 6-well tissue culture dishes (Greiner) in E8 pluripotent stem cell culture medium (Life Technologies).

Gene Expression.

Expression of bioactive lipid receptors in hiPSC-CMs was determined using Ion AmpliSeq (Life Technologies). RNA was extracted with the RNeasy Micro kit (Qiagen). cDNA libraries were synthesized using the Ion Ampli Seq Transcriptome Human Gene Expression kit. Libraries were added to Ion PI chips and added to the Ion Chef instrument for template preparation. Transcriptome sequencing was conducted on an Ion Proton sequencing system (Life Technologies). For expression analysis of hiPSC-CMs following lipid treatment, a GeneChip® Human Gene 1.0 ST DNA Microarray was used (Affymetrix), or qPCR expression analysis was conducted (BioRad).

Example 8. Bioactive Lipids Augment Cardiac Differentiation from hiPSCs in a Stage-Specific Manner Five hiPSC lines were generated through reprogramming somatic tissues from five individuals by introducing viral vectors expressing the Yamanaka factors (OCT4, SOX2, KLF4, and c-MYC). Subsequently, all hiPS cell lines were differentiated using chemically-defined protocols to generate cardiomyocytes (Burridge et al. 2014; Churko et al. 2013). Since hiPSC lines 3, 4, and 5 differentiated well into beating cardiomyocytes without the addition of bioactive lipids, we investigated the effects of S1P/LPA on hiPS cell lines 1 and 2 that exhibited impaired capacity to differentiate into cardiomyocytes.

Figure 15:
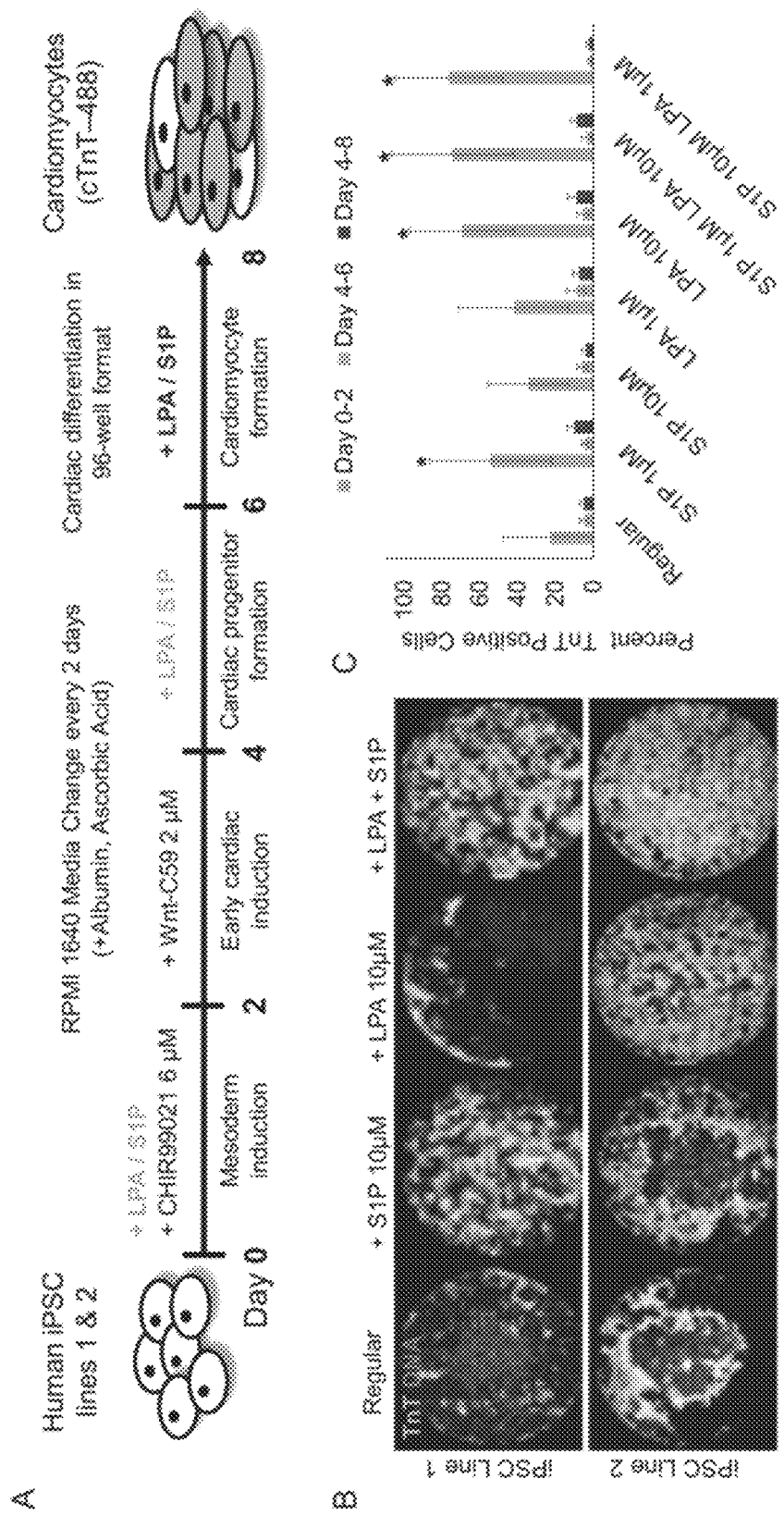
FIGS. 15A-15C report 96-well differentiation which illustrates S1P/LPA-mediated enhancement of hiPSC-cardiomyocyte differentiation when added concurrently with Wnt activator CHIR99021. A) Illustration of the 'regular' chemically-defined cardiac differentiation protocol utilized in this study. S1P/LPA was added at different time points during hiPSC-CM differentiation. B) Representative 96-well immunofluorescence images for cardiac troponin T (TnT) in green and nuclear DNA in blue of 2D monolayer-based, chemically-defined differentiation of two poorly differentiating hiPSC lines into cardiomyocytes. Staining was performed in a 96-well plate format on day 8-post differentiation hiPSC-CMs. S1P, LPA, or both were added for days 0-2, 4-6 or 6-8 during the hiPSC-CM differentiation process. C) Quantification of TnT positive cell numbers of total represented as percentages TnT positive cells for each time point when S1P, LPA or both were added. Error bars represent standard deviation. * indicates p<0.05 versus control. Experiments were performed in 2 different hiPSC lines in 3-6 replicates.

It was examined whether S1P and LPA treatment could improve cardiomyocyte differentiation in these two hard-todifferentiate hiPS cell lines. It was established a 96-well differentiation platform to assess the efficiency of CM differentiation upon treatment with bioactive lipids (FIG. 15A). Using this platform, it was determined that the addition of S1P and/or LPA concurrently with CHIR between days 0-2 in the chemically-defined differentiation protocol enhanced hiPSC-CM generation by 2-3 fold in comparison to control, as assessed by cardiac troponin T (TnT) expression at day 8 (Burridge et al. 2014; Churko et al. 2013) (FIG. 15B-C). No significant enhancement of hiPSC-CM differentiation was detected when S1P/LPA were added between days 4-6 or 6-8 of differentiation (FIG. 15C). These results indicate that bioactive lipids have an early role in augmenting cardiac differentiation and cardiomyocyte generation in these otherwise poorly differentiating hiPS cell lines.

Figure 20:
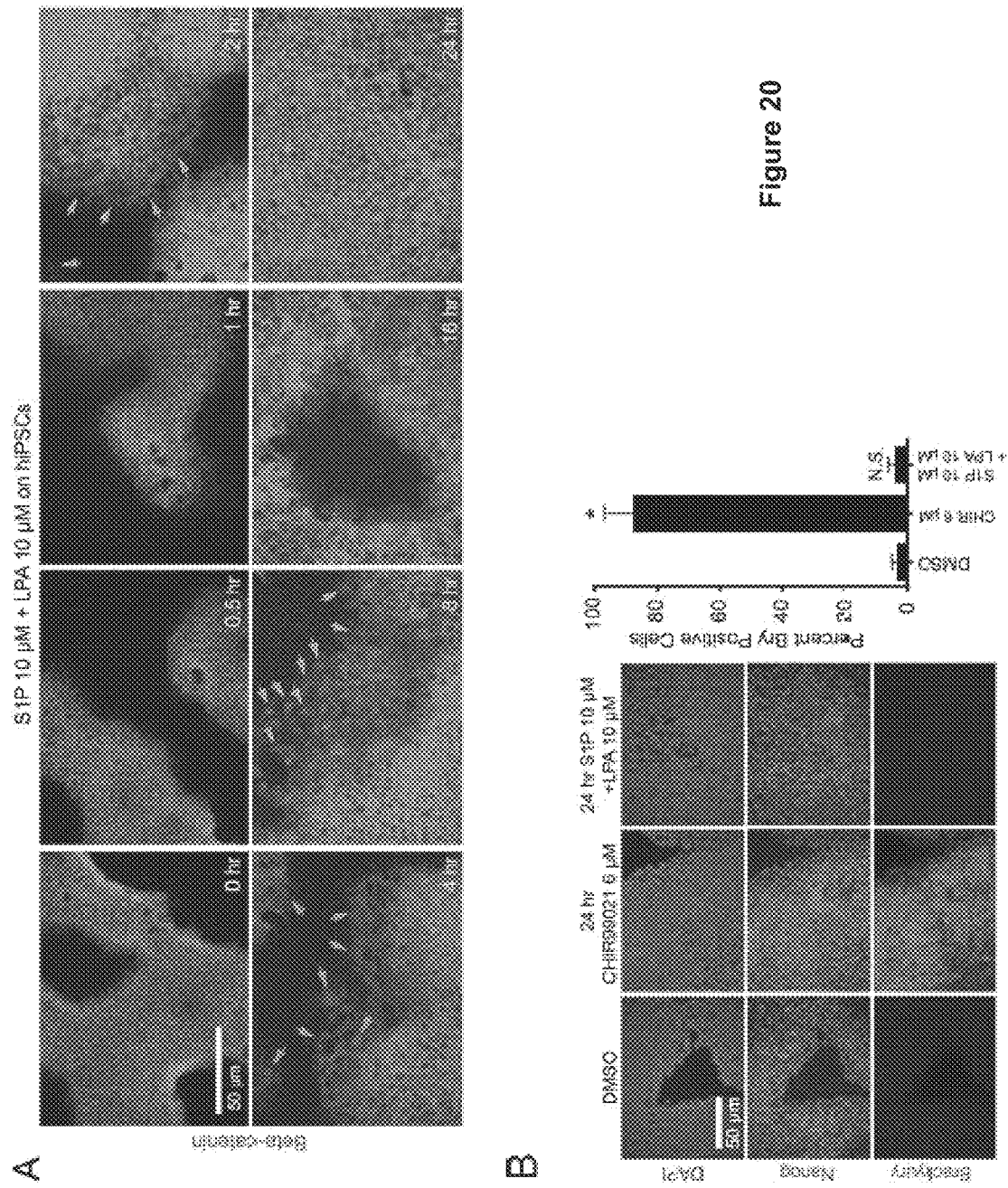
FIGS. 20A-20B report bioactive lipids S1P and LPA increase nuclear beta-catenin but do not induce early mesodermal differentiation. A) Time course study on nuclear beta-catenin accumulation after 0, 0.5, 1, 2, 4, 8, 16 and 24 hour (hr). Arrows indicate cells expressing profound nuclear beta-catenin. B) Immunofluorescence for pluripotency marker Nanog (green), early mesoderm marker Brachyury (red) and DAPI (blue) in hiPSCs cultured for 24 hr with GSK3 inhibitor CHIR99021, bioactive lipids S1P and LPA or DMSO control. Graph represents quantification of percentages Brachyury (Bry) positive cells for the listed treatments. Error bars represent SEM. *indicates P<0.05. N.S.=not significant. N=3.

Example 9. Bioactive Lipids Synergize with Wnt/β-Catenin in hiPS Cells to Induce Mesodermal Differentiation The remainder of these studies was conducted on three independent hiPS cell lines that exhibited normal capacity of cardiac differentiation. The treatment of undifferentiated hiPSCs with inducers of Wnt/β-catenin signaling has previously been shown to effectively enhance mesodermal differentiation (Burridge et al. 2014). Since it was found that hiPSC-CM differentiation is enhanced when bioactive lipids were administered early, it was hypothesized that the observed augmentation of hiPSC-CM formation could be attributed to an increase in the level of nuclear β-catenin by S1P/LPA. Previous work in other cell lines showed that bioactive lipids enhance β-catenin dissociation from E-cadherin at adherens junctions, increasing the cytoplasmic β-catenin available for downstream signaling in the nucleus (Kam et al. 2009). It was studied whether S1P/LPA treatment of undifferentiated hiPS cells, either alone or in combination with CHIR, could increase the level of nuclear β-catenin. First, it was noted that S1P/LPA treatment alone induced significant nuclear accumulation of β-catenin in hiPS cells (FIG. 16A-B). Additionally, serial immunostaining for β-catenin at different time points revealed that this effect could be observed as early as within 2 hours after treatment (FIG. 20A). When combined with CHIR, S1P and LPA further promoted β-catenin nuclear accumulation, suggesting a synergy between these compounds (FIG. 16A-B). To examine whether the increase in nuclear β-catenin level results in an activation of Wnt signaling at the transcriptional level, hiPSCs were transfected with the previously described TOPFlash luciferase reporter plasmid[23] (Veeman et al. 2003). This system provides a proportionate visualization of Wnt transcriptional activity using bioluminescence. Subsequently, the cells were treated with dimethyl sulfoxide (DMSO), CHIR, S1P/LPA, or a combination of S1P/LPA and CHIR. Interestingly, when compared to the DMSO control group, treatment with S1P/LPA alone minimally increased TCF/LEF-luciferase activity (~1.25-fold) (FIG. 16C) whereas treatment with CHIR alone led to a highly significant ~40-fold increase in TCF/LEF-luciferase activity. When S1P/LPA was combined with CHIR, the TCF/LEF-luciferase activity was further increased to more than 60-fold compared with DMSO control (FIG. 16C). Hence, while S1P/LPA treatment alone minimally activated the LEF/TCF reporter, the bioactive lipids synergized with CHIR to further increase β-catenin signaling (FIG. 16D).

To uncover the key changes in gene expression after S1P/LPA treatment, a genome-wide microarray expression analysis was performed on hiPS cells at day 2 of differentiation. Interestingly, it was found a significant downregulation of DKK4 and DKK1 (FIG. 16E), Wnt inhibitors that are well known to regulate stem cell development and differentiation (Paige et al. 2010). In addition, our microarray data also uncovered an increase in the expression of cytoskeletal and extracellular matrix genes such as COL12A1 and Vimentin (VIM), the latter of which is associated with an epithelial-to-mesenchymal transition during development.

Taken together, these results suggest that bioactive lipids S1P and LPA act synergistically with GSK3β inhibitor CHIR to increase Wnt signaling/β-catenin nuclear accumulation during hiPSC differentiation, potentially through enhancing β-catenin release from membrane-associated E-cadherin (FIG. 16D). S1P and LPA treatment also suppresses the expression of Wnt inhibitors such as DKK1/4 and increases the expression of cytoskeletal/extracellular matrix genes.

Example 10. Bioactive Lipids Induce Changes in Cell Morphology and Gene Expression During hiPSC Differentiation This microarray data showed an upregulation of the cytoskeletal and extracellular matrix genes (e.g. COL12A1 and VIM) induced by S1P/LPA treatment, suggesting a change in their biological phenotype (FIG. 16E). Furthermore, a dramatic change was noticed in cell morphology and a two-fold increase in cell size within 24 hours of S1P/LPA treatment (FIG. 17A-B). Interestingly, this was accompanied by little to no increase in cell number (FIG. 17C).

Figure 17:
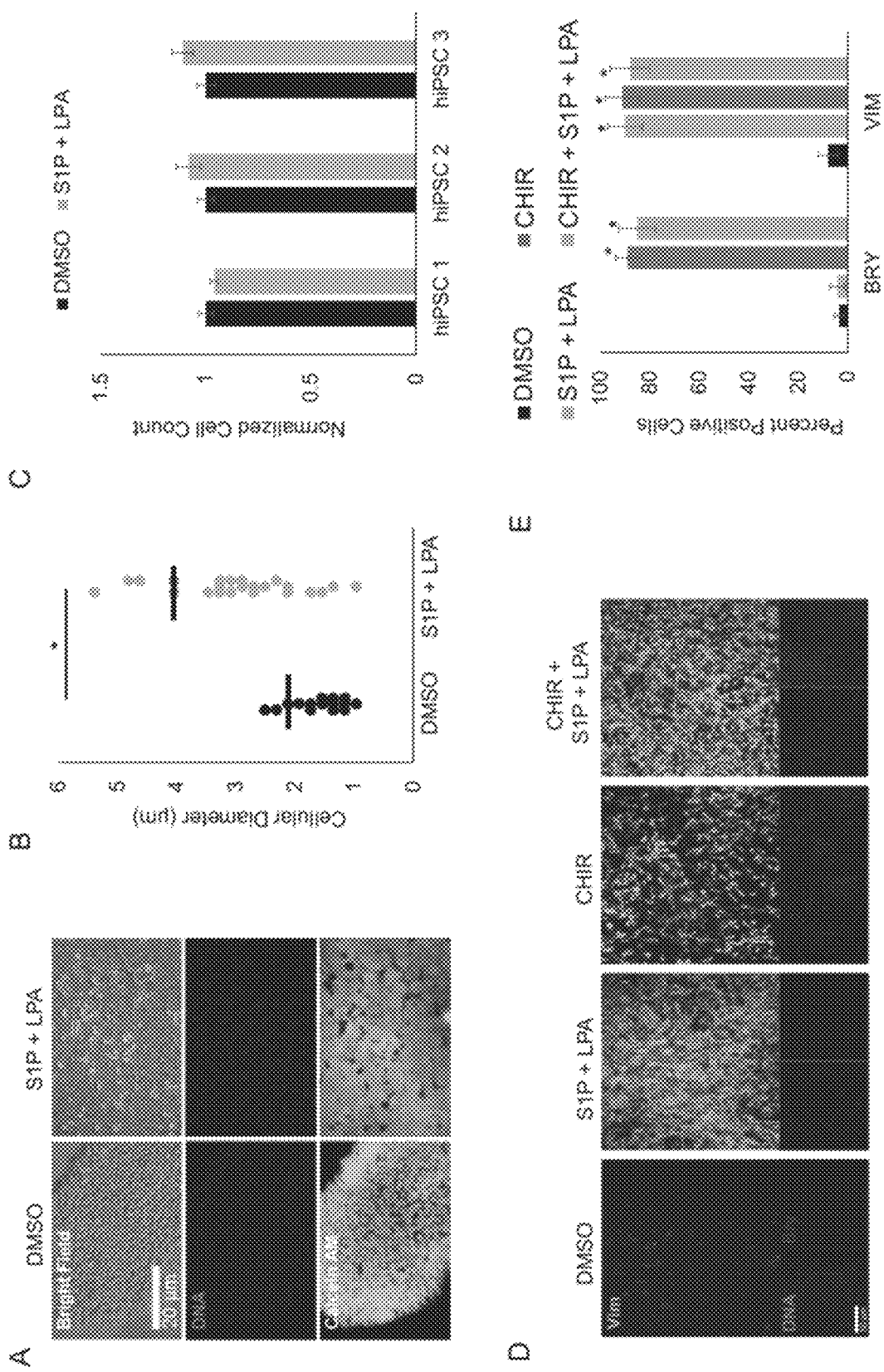
FIGS. 17A-17E report bioactive lipids S1P/LPA rapidly alter hiPSC morphology and enhance vimentin expression during early cardiac differentiation. A) Immunofluorescence and phase contrast images of hiPSCs treated with S1P and LPA for 24 hours. Calcein AM dye staining membranes the entirety of cell bodies. B) Quantification of cell diameter displayed in μm for hiPSCs treated with DMSO or the combination of S1P and LPA. C) Normalized cell count of 3 separate hiPSC lines following treatment with DMSO or S1P/LPA for 24 hours. N=3 biological replicate experiments. Error bars represent SEM. D) Immunofluorescence staining following 48-hour treatment of hiPSCs with DMSO, GSK3β inhibitor CHIR99021 (CHIR), bioactive lipids S1P+LPA or combination. Intermediate filament protein vimentin (green) marks epithelial-to-mesenchymal transition and brachyury (red) marks early mesoderm. E) Quantification of vimentin (VIM) and brachyury T (BRY) positive cells represented as percentages of total cells for control, CHIR, S1P/LPA and combined treatments. Error bars represent standard deviations. Error bars represent standard deviation. Experiment performed in 3 biological replicates. * indicates P<0.05. Cells quantified in N=9 images per condition.

The changes in gene expression was validated after treatment with bioactive lipids or CHIR from the microarray studies with immunostaining and quantitative PCR analysis (FIG. 17D-E). Interestingly, it was found that only CHIR treatment can increase both VIM and Brachyury T (Bry T) expression (Menez et al. 2010) while S1P/LPA treatment increased only the expression of VIM without affecting the expression of Bry T (FIG. 17D-E). In conclusion, these results demonstrate a synergistic but mechanistically independent effect of bioactive lipids on Wnt signaling-mediated mesodermal differentiation of hiPSCs to enhance cardiac differentiation.

Example 11. Synergistic Effects of Bioactive Lipids and Wnt/β-Catenin Activation to Induce Cell Cycle Activity in Terminally-Differentiated hiPSC-CMs Previous studies showed that β-catenin activation is required for ventricular cardiomyocyte proliferation in the mouse fetal heart and in human embryonic stem cell-derived cardiomyocytes, and that metabolic regulation of hiPSC-CM cell cycle arrest can be reversed with activation of β-catenin signaling (Buikema et al. 2013; Mills et al. 2017). Given the synergy between bioactive lipids and Wnt/β-catenin signaling to enhance mesodermal differentiation (FIG. 16, 17), it was examined whether bioactive lipids could also synergize with Wnt/β-catenin signaling to induce proliferation of hiPSC-CMs.

Figure 18:
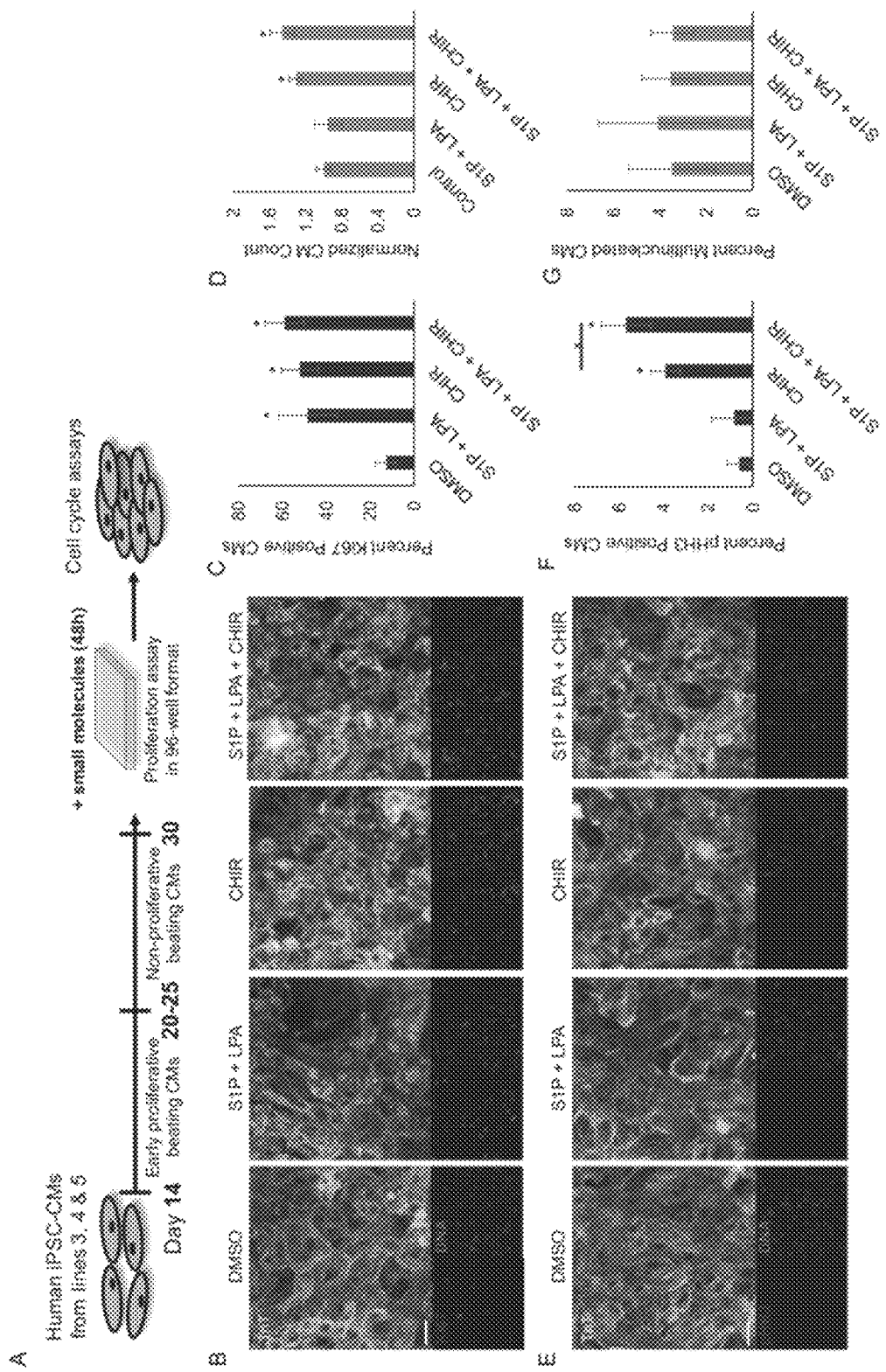
FIGS. 18A-18G report LPA and S1P exhibit cell cycle-inducing effects on hiPSC-CMs. A) Schematic overview of replating hiPSC-CMs at different time-points of differentiation into 96-well format for downstream assays. B) Representative images showing cardiac troponin T (TnT) in green, cell cycle activity marker ki67 in red and nuclear dye (DNA) in blue after 48-hour culture of day 30 hiPSC-CMs with DMSO, S1P/LPA alone, CHIR alone, or CHIR with S1P/LPA. C) Percentage of ki67 positive cardiomyocytes after 48 hours of each treatment. D) Normalized cell count for total number of CMs after 48 hours of treatment for each group. E) Immunofluorescence staining for cardiac troponin T (TnT) in green, mitosis marker phospho Histone H3 (pHH3) in red and nuclear dye (DNA) in blue after 48-hour culture of day 30 hiPSC-CMs with DMSO, S1P/LPA alone, CHIR alone, or CHIR plus S1P/LPA. F) Percentages of mitotic (pHH3) CMs between various treatment groups. G) Percentages of bi- and multinucleated CMs within the indicated treatment groups. *indicates P<0.05 in comparison to control. N=3 biological replicates. Error bars represent standard deviation.
Figure 21:
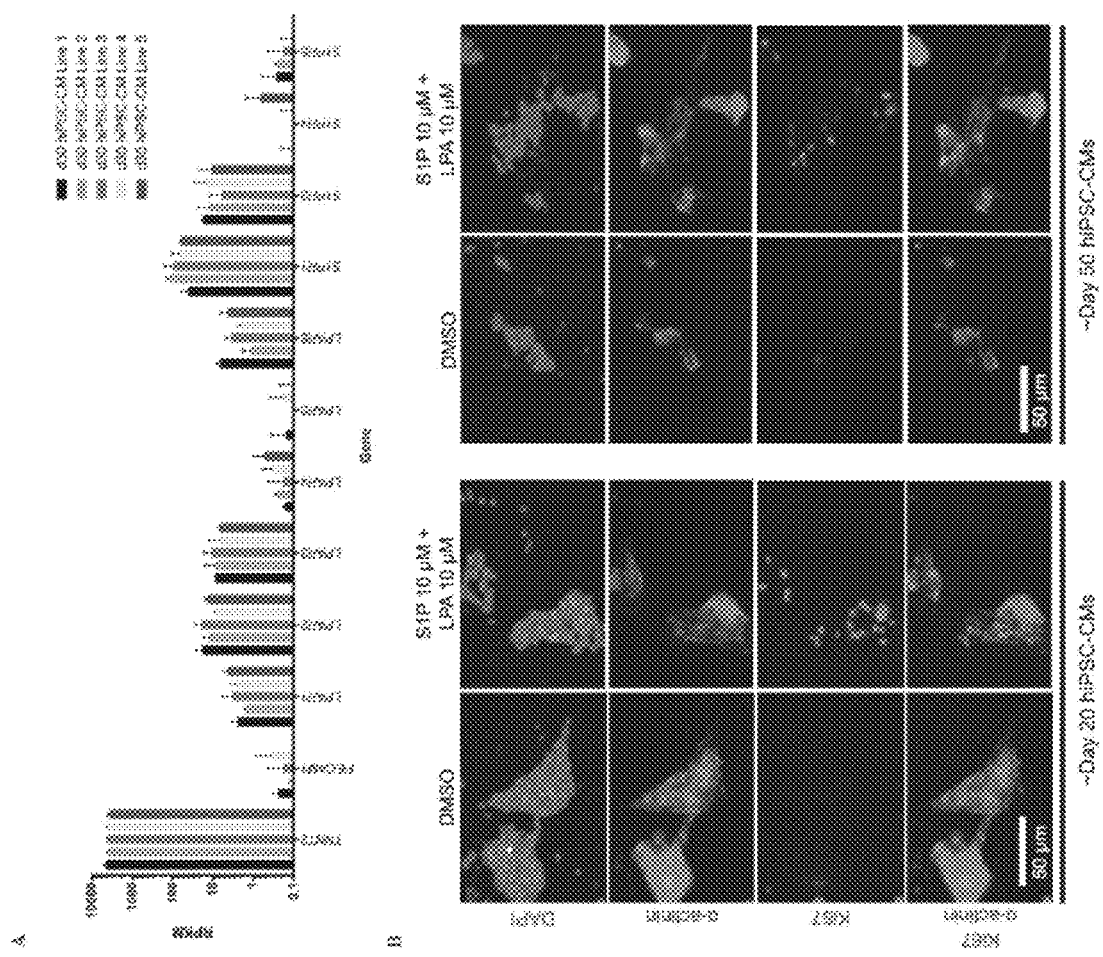
FIGS. 21A-21B report hiPSC-CMs express relevant S1P and LPA receptors upon terminal differentiation and respond to S1P/PA treatment. A) Transcriptome profiling of day 30 hiPSC-CMs from 5 different hiPSC-CM lines. High TNNT2 and low PECAM1 indicates high cardiomyocyte purity and low endothelial cell contamination, respectively. Expression profiling conducted using IonTorrent Ampliseq transcriptome profile. Error bars represent SEM. B) Bioactive lipids LPA and S1P induce ki67 expression at different time points of terminal differentiation. Immunofluorescence for alpha-actinin (green), ki67 (red) and dapi (blue) after 48 hour treatment with S1P and LPA, IGF or DMSO in day ~20 and ~50 hiPSC-CMs.

To address this, well-differentiated hiPSC-CMs were generated (e.g. day 30 or later) using chemically-defined protocols (Burridge et al. 2014; Churko et al. 2013; Sharma et al. 2015) (Movie S1) and treated them with S1P/LPA or CHIR or both (FIG. 18A). The presence of S1P/LPA receptors in these cells was first validated (FIG. 21). Immunofluorescence staining was then performed for ki67, a marker of cell cycle activity, and phospho Histone H3 (pHH3), a mitosis marker, in cardiac troponin T (TnT) positive cells. It was found that treatment with S1P/LPA alone could induce ki67 expression in immature (~day 20-30) as well as well-differentiated (~day 50) hiPSC-CMs to a similar level as treatment with CHIR alone (FIGS. 18B-C, 21), a well-known mitogen (Titmarsh et al. 2016). However, despite the increase in ki67 expression, S1P/LPA treatment did not lead to an increase in the number of hiPSC-CMs, suggesting that cell (FIG. 18D) and nuclear (FIG. 18E-F) division was incomplete. Nonetheless, treatment with CHIR alone resulted in an increase in cell number and the addition of S1P/LPA to CHIR further enhanced the proliferation of hiPSC-CMs mediated by CHIR, as demonstrated by both the increase in cell number and pHH3 expression (FIG. 18D-F). Two-day treatment with S1P/LPA or CHIR or both did not increase the number of bi- or multinucleated cardiomyocytes (FIG. 18G).

Figure 22:
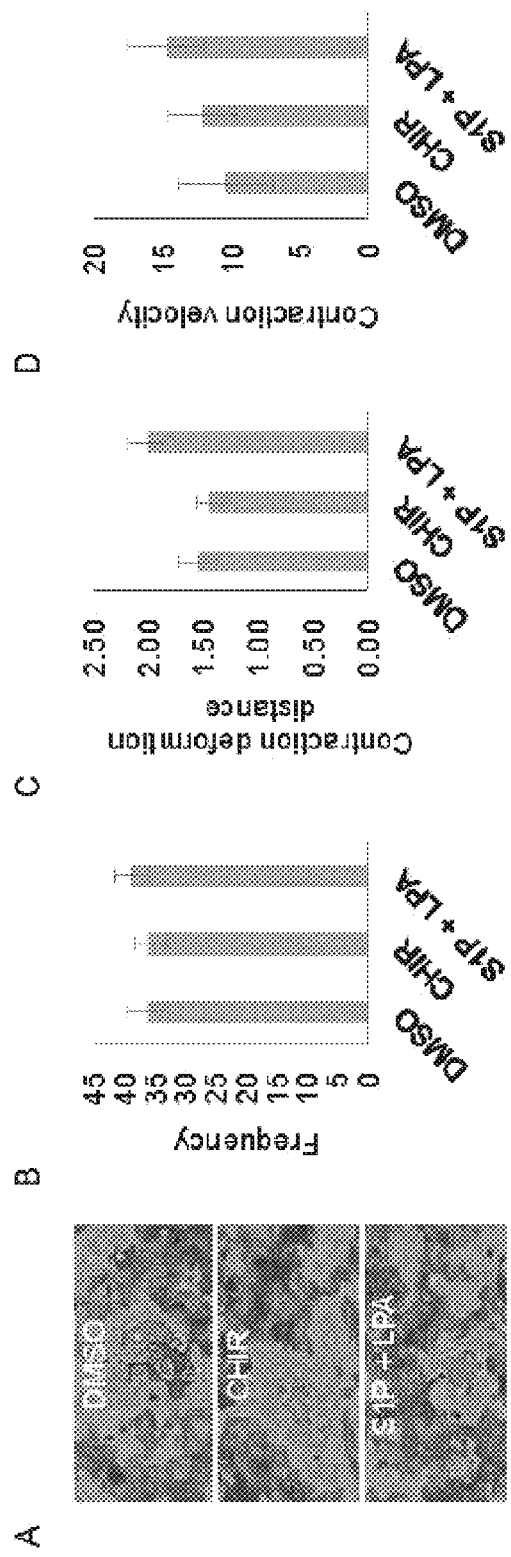
FIGS. 22A-22D report motion-derived contractility parameters in day 30 hiPSC-CMs. A) Representative heatmaps of day 30 hiPSC-CMs treated with DMSO, CHIR99021 or S1P/LPA generated from high resolution and frequency movies, red=high motion, blue=low motion. Graphs displaying contraction frequency (beats/minute) B), contraction deformation distance C), and contraction velocity D). Data represented as means. Error bars indicate SEM.

Additional functional analyses of day 30 hiPSC-CMs treated with S1P/LPA or CHIR show no significant difference in their beating frequency or contractile force generation when compared with control well-differentiated hiPSC-CMs (FIG. 22). These studies illustrate an additional role for S1P/LPA to regulate cell cycle activity in well-differentiated hiPSC-CMs and synergize with β-catenin signaling to increase hiPSC-CM proliferation.

Example 12. Bioactive Lipids Activate ERK Signaling in hiPSC-CMs

To determine the mechanism through which S1P/LPA regulate cell cycle activity in hiPSC-CMs, it was evaluated whether S1P and LPA treatment can directly stimulate Wnt/β-catenin signaling in day 30 cardiomyocytes using the TOPFlash (TCF/LEF-luciferase) reporter. This disclosure reports that while the canonical Wnt signaling, as measured by the TOPFlash reporter, was activated in the presence of CHIR alone, the treatment with S1P/LPA was unable to increase TCF/LEF-luciferase activity (FIG. 19A), suggesting the effect of bioactive lipids is not mediated directly by Wnt signaling in hiPSC-CMs.

Figure 23:
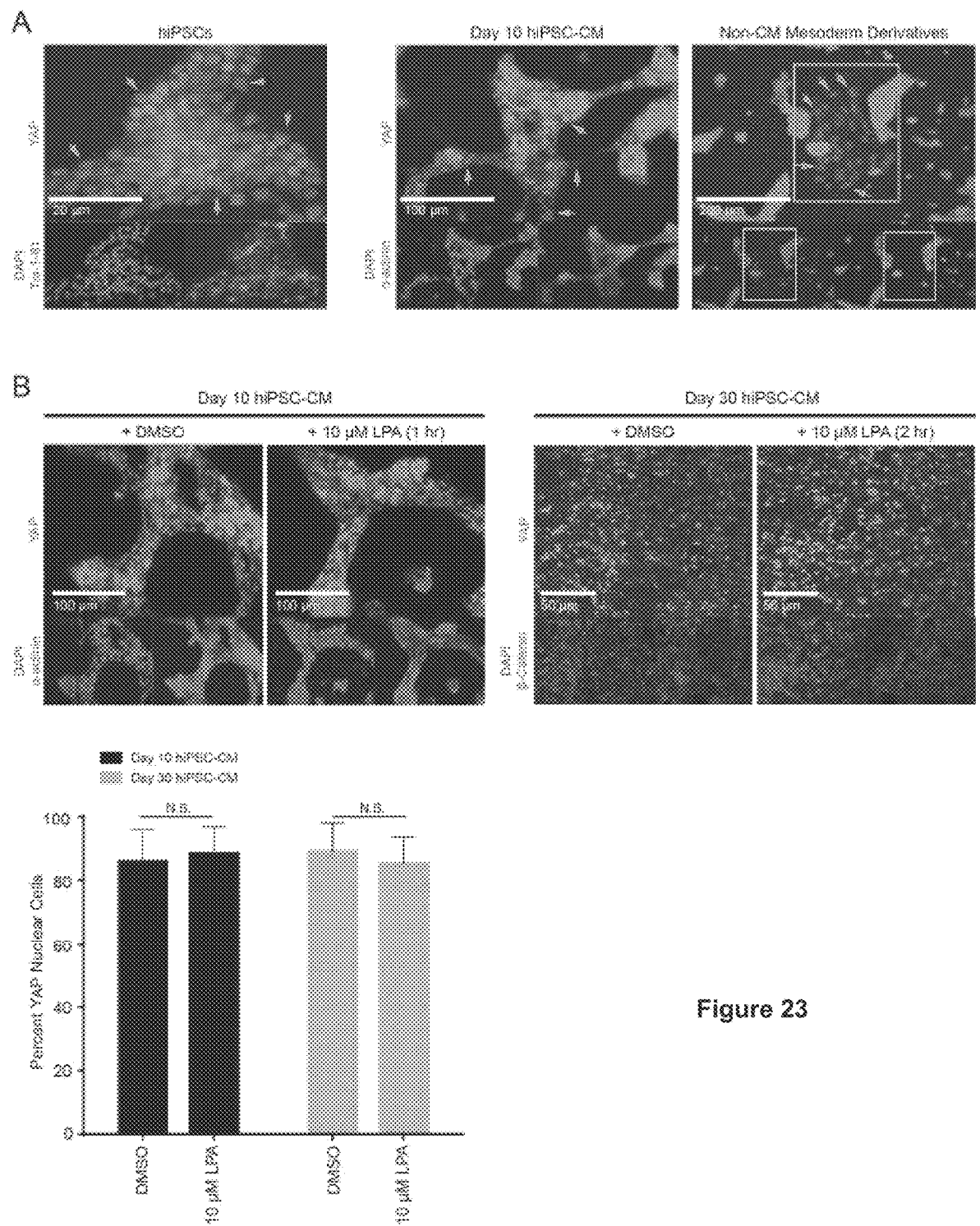
FIGS. 23A-23B report LPA is unable to enhance YAP nuclear accumulation in hiPSC-CMs. A) Immunofluorescence staining in untreated hiPSCs, hiPSC-CMs, and non-CM mesodermal derivatives (indicated by yellow boxes) for DAPI (blue), total YAP (green), and cell-type specific markers (red): Tra-1-81 for hiPSCs and alpha-actinin for hiPSC-CMs. YAP is localized to the nuclei in all three cell types at baseline, as indicated by representative cells marked by yellow arrows. B) YAP immunofluorescence for purified day 10 or day 30 hiPSC-CMs with and without treatment with LPA, stained for downstream Hippo pathway transcriptional effector YAP (green). No significant (N.S.) increase in YAP nuclear accumulation or β-catenin translocation seen after LPA treatment on day 10 or day 30 hiPSC-CMs. Cells quantified in N=9 images per condition. Data are expressed as means±STD.

Given the well-known role of Hippo/Yap signaling in regulating cardiomyocyte and non-myocyte proliferation and regeneration (Yusuf et al. 2012; Heallen et al. 2011; Morikawa et al. 2017; Leach et al. 2017; von Gise et al. 2012), the ability of bioactive lipids was assessed to promote nuclear accumulation of Yap (FIG. 23). Surprisingly, it was found a strong nuclear YAP localization (>85-90% of all nuclei counted) at baseline in hiPSC-CMs and many other cell types including undifferentiated hiPSCs and hiPSC-derived non-myocytes (FIG. 23A). Consequently, no increase in nuclear YAP accumulation was observed following bioactive lipid treatment (FIG. 23B).

To further elucidate the mechanism through which S1P/LPA regulate cell cycle activity in hiPSC-CMs, a broad kinase phosphorylation panel screening was performed in day 30 hiPSC-CMs after treatment with S1P/LPA (Table S1).

Figure 16:
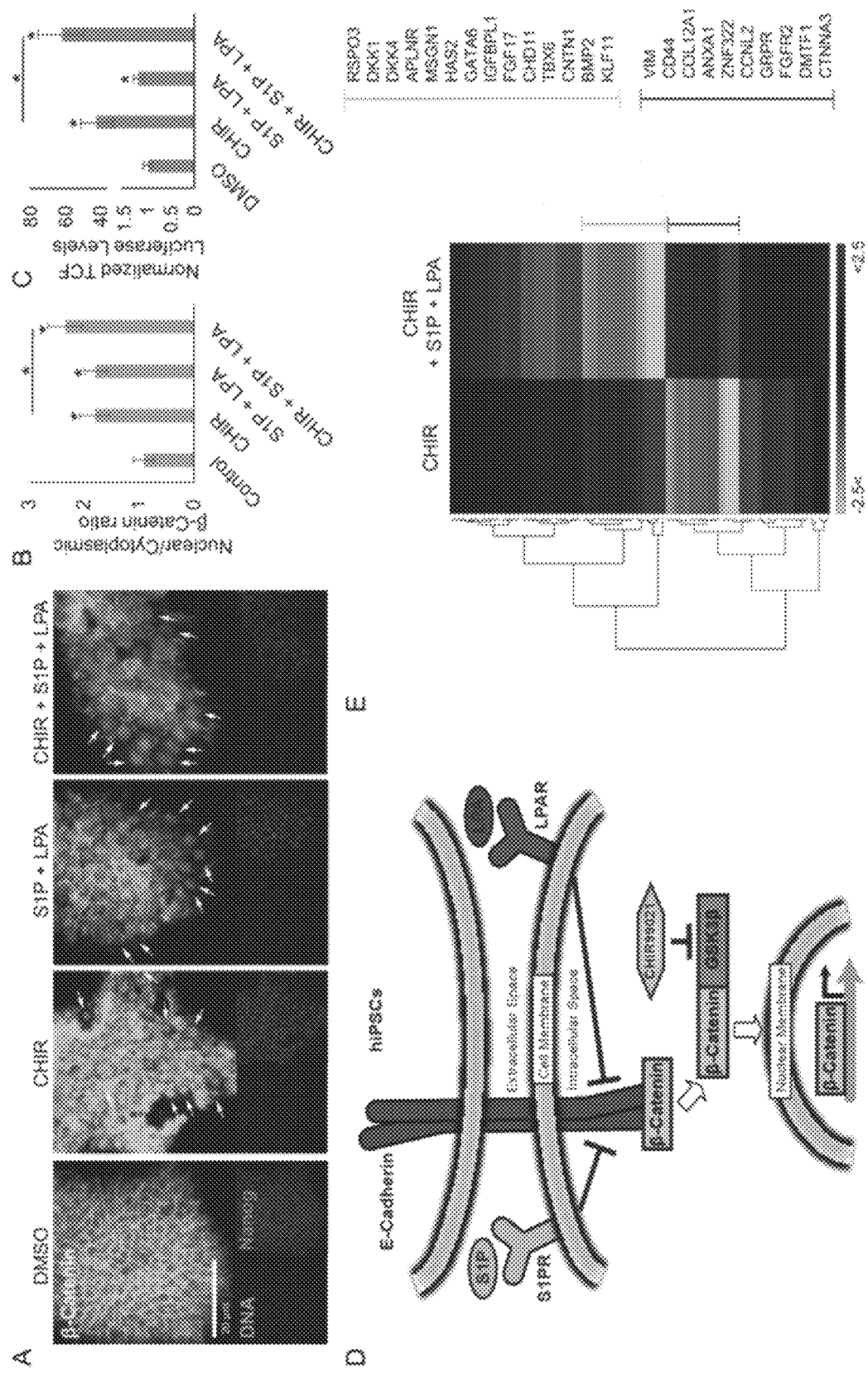
FIGS. 16A-16E report bioactive lipids S1P and LPA enhance β-catenin nuclear accumulation and activate Wnt signaling during early cardiac differentiation from hiPSCs. A) Immunofluorescence for β-catenin (green), pluripotency marker Nanog (red), and DAPI (DNA) (blue) following 2-hour treatment of hiPSCs with DMSO, small molecule GSK3β inhibitor/Wnt activator CHIR99021 (CHIR), bioactive lipids S1P+LPA, or CHIR+bioactive lipids. Arrows indicate cells exhibiting characteristic β-catenin nuclear accumulation. B) Quantification of β-catenin staining represented as nuclear intensity over cytoplasmic intensity for the treatment groups normalized to DMSO control. C) Luciferase luminescence intensity after transfection of hiPSCs with TOPFlash Wnt pathway activity reporter and 2-hour treatment with CHIR, S1P/LPA, or both, represented as fold increase over DMSO control. D) Model illustrating the signaling cascade linking bioactive lipids and the Wnt/β-catenin signaling pathway in the context of hiPSCs. Treatment with S1P/LPA on hiPSCs dissociates β-catenin from adherens junctions and E-cadherin, thus increasing the overall β-catenin pool that can be utilized for downstream signaling and gene transcription. Treatment with GSK3β inhibitor CHIR frees β-catenin and increases the overall intracellular β-catenin pool for downstream signaling and gene transcription. E) Microarray analysis illustrating key alterations in gene expression following 48-hour treatment of hiPSCs with small molecule GSK3β inhibitor/Wnt activator CHIR with or without bioactive lipids S1P/LPA. A list of up-(red) and down-(blue) regulated genes after treatment with bioactive lipid is shown. Experiments were performed in 3-4 biological replicates.
Figure 24:
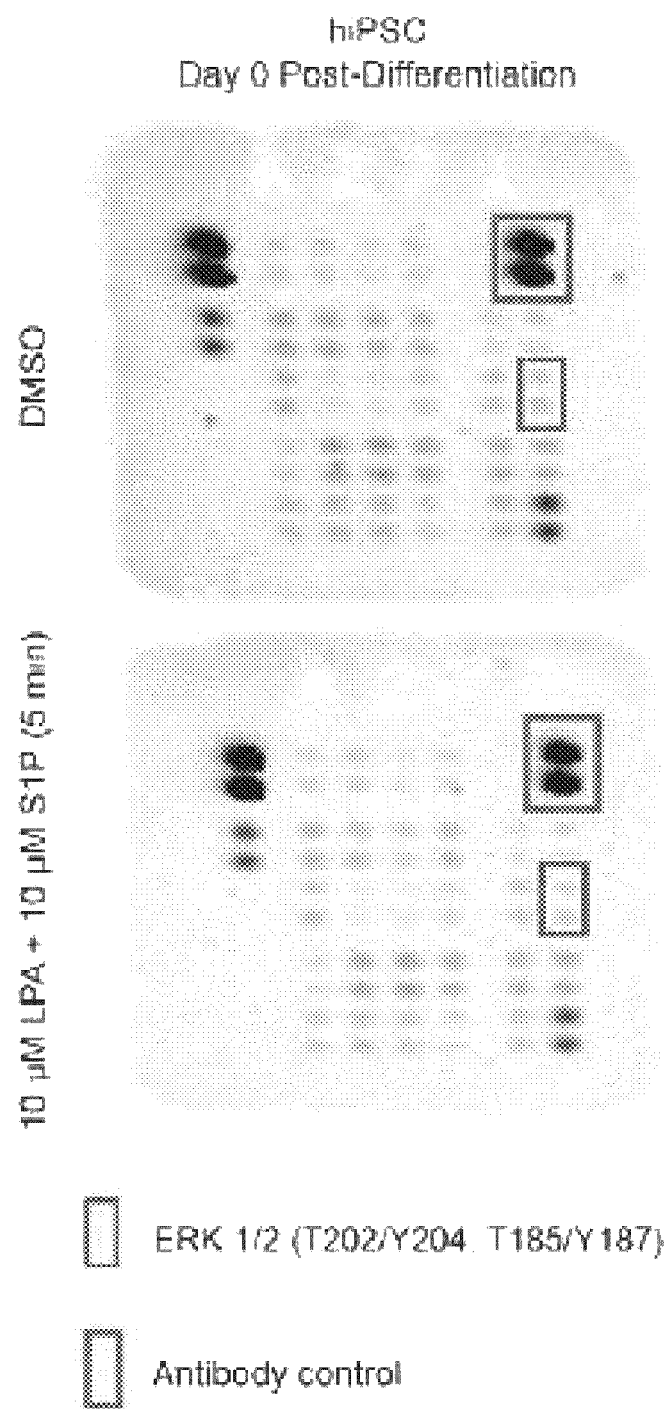
FIG. 24 reports bioactive lipids do not change ERK phosphorylation in undifferentiated hiPSC. ERK1/2 phosphorylation conducted in undifferentiated hiPSCs with and without 5 minute S1P and LPA (S+L) treatment. Spots corresponding to ERK1/2 phosphorylation and antibody control are labeled.

Notably, a rapid upregulation was observed in phosphorylation of ERK1/2, a known regulator of cell cycle activity, after S1P/LPA treatment (FIG. 19B) (Zang et al. 2002). A down-regulation in phosphorylation of HSP27 was also observed within 5 minutes of treatment with S1P/LPA and subtle alterations in GSK3β and JNK phosphorylation (FIG. 19B). Consistent with the lack of a direct effect of S1P/LPA on canonical Wnt/β-catenin signaling, the level of β-catenin remained unchanged following treatment with S1P/LPA. Analysis of S1P/LPA treatment in hiPSCs undergoing cardiac differentiation revealed that ERK1/2 phosphorylation was not active in day 0 undifferentiated hiPSCs (FIG. 24) despite the effect of S1P/LPA on CHIR-induced mesodermal induction (FIG. 16).

Figure 25:
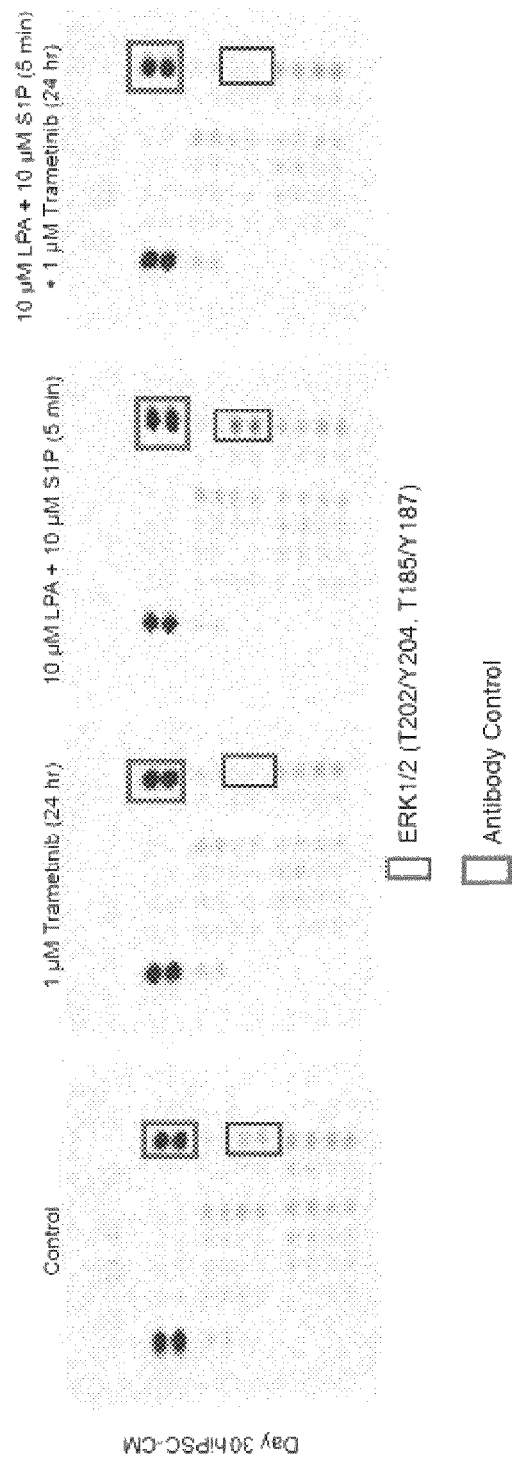
FIG. 25 reports S1P and LPA activate MAPK/MEK/ERK signaling in hiPSC-CMs. Full version of FIG. 19. Kinase assay conducted in day 30 hiPSC-CMs treated with and without small molecule MEK inhibitor trametinib, with and without S1P/LPA (10 µM each). Spots corresponding to ERK phosphorylation and antibody control are labeled.

To address whether S1P/LPA promotes ERK1/2 phosphorylation in hiPSC-CMs through stimulation of the MAPK/MEK/ERK signaling cascade, hiPSC-CMs were treated with S1P/LPA in the presence or absence of trametinib, a small molecule inhibitor of MEK signaling upstream of ERK (Kim et al. 2013). This disclosure reports that the ability of S1P/LPA to activate ERK phosphorylation in hiPSC-CMs was abolished in the presence of trametinib, confirming that S1P/LPA-induced ERK phosphorylation is mediated by MAPK/MEK/ERK signaling (FIG. 19C, FIG. 25).

The requirement of MAPK/MEK/ERK signaling on S1P/LPA-induced cell cycle activity was examined by treating hiPSC-CMs with S1P/LPA in the presence and absence of trametinib and assessed the expression of ki67 in hiPSC-CMs (FIG. 19D-E). This disclosure reports that trametinib treatment abolished the S1P/LPA-induced upregulation of ki67. This confirms the role of MAP/MEK/ERK signaling in S1P/LPA-mediated cell cycle activation in hiPSC-CMs.

Figure 26:
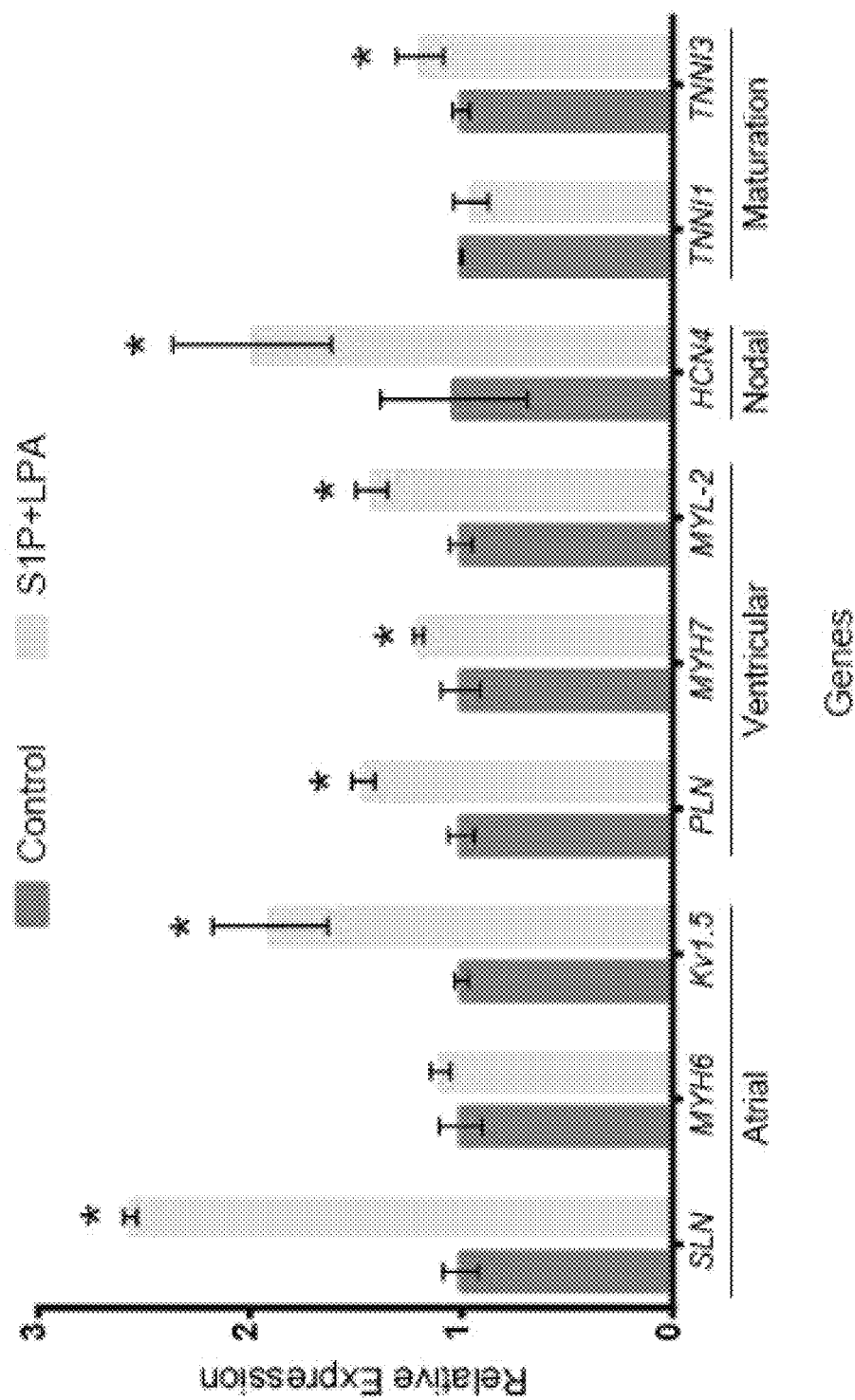
FIG. 26 reports S1P and LPA do not alter maturation or subtype specification in hiPSC-CMs. QPCR gene expression analysis conducted in day 30 hiPSC-CMs treated with and without S1P/LPA (10 µM each). Genes corresponding to atrial, ventricular, and nodal subtypes, as well as maturation markers, are labeled. * indicates p<0.05.

To assess whether S1P receptor signaling is involved S1P-mediated hiPSC-CM cell cycle activation, hiPSC-CMs were cultured with S1P alone or together with its receptor antagonist, VPC23019 (Davis et al. 2005). It was found that the expression of ki67 in S1P-treated hiPSC-CMs was reduced in the presence of VPC23019 (FIG. 19F-G). This supports a role for the S1P receptor to mediate bioactive lipid-induced hiPSC-CM cell cycle activation (FIG. 19H). Finally, although an increase in cell cycle activity was observed in hiPSC-CMs in response to S1P/LPA treatment, a shift in maturation status or subtype identity of hiPSC-CMs after S1P/LPA treatment was not observed (FIG. 26).

REFERENCES

Bassat, E., Mutlak, Y. E., Genzelinakh, A., Shadrin, I. Y., Baruch Umansky, K., Yifa, O., Kain, D., Rajchman, D., Leach, J., Riabov Bassat, D., et al. (2017). The extracellular matrix protein agrin promotes heart regeneration in mice. Nature 547, 179-184.

Beltrami, A. P., Urbanek, K., Kajstura, J., Yan, S. M., Finato, N., Bussani, R., Nadal-Ginard, B., Silvestri, F., Leri, A., Beltrami, C. A., et al. (2001). Evidence that human cardiac myocytes divide after myocardial infarction. N Engl J Med 344, 1750-1757.

Bergmann, O., Bhardwaj, R. D., Bernard, S., Zdunek, S., Barnabe-Heider, F., Walsh, S., Zupicich, J., Alkass, K., Buchholz, B. A., Druid, H., et al. (2009). Evidence for cardiomyocyte renewal in humans. Science 324, 98-102.

Bersell, K., Arab, S., Haring, B., and Kuhn, B. (2009). Neuregulin1/ErbB4 signaling induces cardiomyocyte proliferation and repair of heart injury. Cell 138, 257-270.

Birket, M. J., Ribeiro, M. C., Verkerk, A. O., Ward, D., Leitoguinho, A. R., den Hartogh, S. C., Orlova, V. V., Devalla, H. D., Schwach, V., Bellin, M., et al. (2015). Expansion and patterning of cardiovascular progenitors derived from human pluripotent stem cells. Nat Biotechnol 33, 970-979.

Bruneau, B. G. (2013). Signaling and transcriptional networks in heart development and regeneration. Cold Spring Harb Perspect Biol 5, a008292.

Buikema, J. W., Mady, A. S., Mittal, N. V., Atmanli, A., Caron, L., Doevendans, P. A., Sluijter, J. P., and Domian, I. J. (2013). Wnt/beta-catenin signaling directs the regional expansion of first and second heart field-derived ventricular cardiomyocytes. Development 140, 4165-4176.

Burridge, P. W., Keller, G., Gold, J. D., and Wu, J. C. (2012). Production of de novo cardiomyocytes: human pluripotent stem cell differentiation and direct reprogramming. Cell stem cell 10, 16-28.

Burridge, P. W., Matsa, E., Shukla, P., Lin, Z. C., Churko, J. M., Ebert, A. D., Lan, F., Diecke, S., Huber, B., Mordwinkin, N. M., et al. (2014). Chemically defined generation of human cardiomyocytes. Nat Methods 11, 855-860.

Chong, J. J., Yang, X., Don, C. W., Minami, E., Liu, Y. W., Weyers, J. J., Mahoney, W. M., Van Biber, B., Cook, S. M., Palpant, N. J., et al. (2014). Human embryonic-stem-cell-derived cardiomyocytes regenerate non-human primate hearts. Nature 510, 273-277.

Cohen, E. D., Wang, Z., Lepore, J. J., Lu, M. M., Taketo, M. M., Epstein, D. J., and Morrisey, E. E. (2007). Wnt/beta-catenin signaling promotes expansion of Isl-1-positive cardiac progenitor cells through regulation of FGF signaling. J Clin Invest 117, 1794-1804.

Conejo, R., de Alvaro, C., Benito, M., Cuadrado, A., and Lorenzo, M. (2002). Insulin restores differentiation of Ras-transformed C2C12 myoblasts by inducing NF-kappaB through an AKT/P70S6K/p38-MAPK pathway. Oncogene 21, 3739-3753.

de Boer, B. A., van den Berg, G., de Boer, P. A., Moorman, A. F., and Ruijter, J. M. (2012). Growth of the developing mouse heart: an interactive qualitative and quantitative 3D atlas. Dev Biol 368, 203-213.

Foglia, M. J., and Poss, K. D. (2016). Building and re-building the heart by cardiomyocyte proliferation. Development 143, 729-740.

Foley, A. C., and Mercola, M. (2005). Heart induction by Wnt antagonists depends on the homeodomain transcription factor Hex. Genes & development 19, 387-396.

Goldstein, M. A., Claycomb, W. C., and Schwartz, A. (1974). DNA synthesis and mitosis in well-differentiated mammalian cardiocytes. Science 183, 212-213.

Heallen, T., Zhang, M., Wang, J., Bonilla-Claudio, M., Klysik, E., Johnson, R. L., and Martin, J. F. (2011). Hippo pathway inhibits Wnt signaling to restrain cardiomyocyte proliferation and heart size. Science 332, 458-461.

Janda, C. Y., Dang, L. T., You, C., Chang, J., de Lau, W., Zhong, Z. A., Yan, K. S., Marecic, O., Siepe, D., Li, X., et al. (2017). Surrogate Wnt agonists that phenocopy canonical Wnt and beta-catenin signalling. Nature 545, 234-237.

Josowitz, R., Lu, J., Falce, C., D'Souza, S. L., Wu, M., Cohen, N., Dubois, N. C., Zhao, Y., Sobie, E. A., Fishman, G. I., et al. (2014). Identification and purification of human induced pluripotent stem cell-derived atrial-like cardiomyocytes based on sarcolipin expression. PloS one 9, e101316.

Kattman, S. J., Witty, A. D., Gagliardi, M., Dubois, N. C., Niapour, M., Hotta, A., Ellis, J., and Keller, G. (2011). Stage-specific optimization of activin/nodal and BMP signaling promotes cardiac differentiation of mouse and human pluripotent stem cell lines. Cell stem cell 8, 228-240.

Kerkela, R., Kockeritz, L., Macaulay, K., Zhou, J., Doble, B. W., Beahm, C., Greytak, S., Woulfe, K., Trivedi, C. M., Woodgett, J. R., et al. (2008). Deletion of GSK-3beta in mice leads to hypertrophic cardiomyopathy secondary to cardiomyoblast hyperproliferation. J Clin Invest 118, 3609-3618.

Kikuchi, K., Holdway, J. E., Werdich, A. A., Anderson, R. M., Fang, Y., Egnaczyk, G. F., Evans, T., Macrae, C. A., Stainier, D. Y., and Poss, K. D. (2010). Primary contribution to zebrafish heart regeneration by gata4(+) cardiomyocytes. Nature 464, 601-605.

Kurabayashi, M., Komuro, I., Tsuchimochi, H., Takaku, F., and Yazaki, Y. (1988). Molecular cloning and characterization of human atrial and ventricular myosin alkali light chain cDNA clones. The Journal of biological chemistry 263, 13930-13936.

Kwon, C., Qian, L., Cheng, P., Nigam, V., Arnold, J., and Srivastava, D. (2009). A regulatory pathway involving Notch1/beta-catenin/Isl1 determines cardiac progenitor cell fate. Nat Cell Biol 11, 951-957.

Laflamme, M. A., and Murry, C. E. (2011). Heart regeneration. Nature 473, 326-335.

Lee, J. H., Protze, S. I., Laksman, Z., Backx, P. H., and Keller, G. M. (2017). Human Pluripotent Stem Cell-Derived Atrial and Ventricular Cardiomyocytes Develop from Distinct Mesoderm Populations. Cell stem cell 21, 179-194 e174.

Lian, X., Hsiao, C., Wilson, G., Zhu, K., Hazeltine, L. B., Azarin, S. M., Raval, K. K., Zhang, J., Kamp, T. J., and Palecek, S. P. (2012). Robust cardiomyocyte differentiation from human pluripotent stem cells via temporal modulation of canonical Wnt signaling. Proceedings of the National Academy of Sciences of the United States of America 109, E1848-1857.

Lian, X., Zhang, J., Azarin, S. M., Zhu, K., Hazeltine, L. B., Bao, X., Hsiao, C., Kamp, T. J., and Palecek, S. P. (2013). Directed cardiomyocyte differentiation from human pluripotent stem cells by modulating Wnt/beta-catenin signaling under fully defined conditions. Nat Protoc 8, 162-175.

Lin, L., Cui, L., Zhou, W., Dufort, D., Zhang, X., Cai, C. L., Bu, L., Yang, L., Martin, J., Kemler, R., et al. (2007). Beta-catenin directly regulates Islet1 expression in cardiovascular progenitors and is required for multiple aspects of cardiogenesis. Proceedings of the National Academy of Sciences of the United States of America 104, 9313-9318.

Lindsley, C. W., Barnett, S. F., Yaroschak, M., Bilodeau, M. T., and Layton, M. E. (2007). Recent progress in the development of ATP-competitive and allosteric Akt kinase inhibitors. Curr Top Med Chem 7, 1349-1363.

Liu, P., Begley, M., Michowski, W., Inuzuka, H., Ginzberg, M., Gao, D., Tsou, P., Gan, W., Papa, A., Kim, B. M., et al. (2014). Cell-cycle-regulated activation of Akt kinase by phosphorylation at its carboxyl terminus. Nature 508, 541-545.

Mauritz, C., Schwanke, K., Reppel, M., Neef, S., Katsirntaki, K., Maier, L. S., Nguemo, F., Menke, S., Haustein, M., Hescheler, J., et al. (2008). Generation of functional murine cardiac myocytes from induced pluripotent stem cells. Circulation 118, 507-517.

Mazzotta, S., Neves, C., Bonner, R. J., Bernardo, A. S., Docherty, K., and Hoppler, S. (2016). Distinctive Roles of Canonical and Noncanonical Wnt Signaling in Human Embryonic Cardiomyocyte Development. Stem Cell Reports 7, 764-776.

Paige, S. L., Osugi, T., Afanasiev, O. K., Pabon, L., Reinecke, H., and Murry, C. E. (2010). Endogenous Wnt/beta-catenin signaling is required for cardiac differentiation in human embryonic stem cells. PloS one 5, e11134.

Patterson, M., Barske, L., Van Handel, B., Rau, C. D., Gan, P., Sharma, A., Parikh, S., Denholtz, M., Huang, Y., Yamaguchi, Y., et al. (2017). Frequency of mononuclear diploid cardiomyocytes underlies natural variation in heart regeneration. Nat Genet 49, 1346-1353.

Porrello, E. R., Mahmoud, A. I., Simpson, E., Hill, J. A., Richardson, J. A., Olson, E. N., and Sadek, H. A. (2011). Transient regenerative potential of the neonatal mouse heart. Science 331, 1078-1080.

Protze, S. I., Liu, J., Nussinovitch, U., Ohana, L., Backx, P. H., Gepstein, L., and Keller, G. M. (2017). Sinoatrial node cardiomyocytes derived from human pluripotent cells function as a biological pacemaker. Nat Biotechnol 35, 56-68.

Qyang, Y., Martin-Puig, S., Chiravuri, M., Chen, S., Xu, H., Bu, L., Jiang, X., Lin, L., Granger, A., Moretti, A., et al. (2007). The renewal and differentiation of Isl1+ cardiovascular progenitors are controlled by a Wnt/beta-catenin pathway. Cell stem cell 1, 165-179.

Ribeiro, A. J., Ang, Y. S., Fu, J. D., Rivas, R. N., Mohamed, T. M., Higgs, G. C., Srivastava, D., and Pruitt, B. L. (2015). Contractility of single cardiomyocytes differentiated from pluripotent stem cells depends on physiological shape and substrate stiffness. Proceedings of the National Academy of Sciences of the United States of America 112, 12705-12710.

Risebro, C. A., Vieira, J. M., Klotz, L., and Riley, P. R. (2015). Characterisation of the human embryonic and foetal epicardium during heart development. Development 142, 3630-3636.

Sato, N., Meijer, L., Skaltsounis, L., Greengard, P., and Brivanlou, A. H. (2004). Maintenance of pluripotency in human and mouse embryonic stem cells through activation of Wnt signaling by a pharmacological GSK-3-specific inhibitor. Nat Med 10, 55-63.

Schneider, V. A., and Mercola, M. (2001). Wnt antagonism initiates cardiogenesis in *Xenopus laevis*. Genes & development 15, 304-315.

Senyo, S. E., Lee, R. T., and Kuhn, B. (2014). Cardiac regeneration based on mechanisms of cardiomyocyte proliferation and differentiation. Stem Cell Res 13, 532-541.

Senyo, S. E., Steinhauser, M. L., Pizzimenti, C. L., Yang, V. K., Cai, L., Wang, M., Wu, T. D., Guerquin-Kern, J. L., Lechene, C. P., and Lee, R. T. (2013). Mammalian heart renewal by pre-existing cardiomyocytes. Nature 493, 433-436.

Song, G., Ouyang, G., and Bao, S. (2005). The activation of Akt/PKB signaling pathway and cell survival. J Cell Mol Med 9, 59-71.

Srivastava, D. (2006). Making or breaking the heart: from lineage determination to morphogenesis. Cell 126, 1037-1048.

Stoick-Cooper, C. L., Weidinger, G., Riehle, K. J., Hubbert, C., Major, M. B., Fausto, N., and Moon, R. T. (2007). Distinct Wnt signaling pathways have opposing roles in appendage regeneration. Development 134, 479-489.

Titmarsh, D. M., Glass, N. R., Mills, R. J., Hidalgo, A., Wolvetang, E. J., Porrello, E. R., Hudson, J. E., and Cooper-White, J. J. (2016). Induction of Human iPSC-Derived Cardiomyocyte Proliferation Revealed by Combinatorial Screening in High Density Microbioreactor Arrays. Sci Rep 6, 24637.

Trosset, J. Y., Dalvit, C., Knapp, S., Fasolini, M., Veronesi, M., Mantegani, S., Gianellini, L. M., Catana, C., Sundstrom, M., Stouten, P. F., et al. (2006). Inhibition of protein-protein interactions: the discovery of druglike beta-catenin inhibitors by combining virtual and biophysical screening. Proteins 64, 60-67.

Tseng, A. S., Engel, F. B., and Keating, M. T. (2006). The GSK-3 inhibitor BIO promotes proliferation in mammalian cardiomyocytes. Chemistry & biology 13, 957-963.

Uosaki, H., Magadum, A., Seo, K., Fukushima, H., Takeuchi, A., Nakagawa, Y., Moyes, K. W., Narazaki, G., Kuwahara, K., Laflamme, M., et al. (2013). Identification of chemicals inducing cardiomyocyte proliferation in developmental stage-specific manner with pluripotent stem cells. Circ Cardiovasc Genet 6, 624-633.

Uygur, A., and Lee, R. T. (2016). Mechanisms of Cardiac Regeneration. Dev Cell 36, 362-374. Wu, S. M., Chien, K. R., and Mummery, C. (2008). Origins and fates of cardiovascular progenitor cells. Cell 132, 537-543.

Yang, L., Soonpaa, M. H., Adler, E. D., Roepke, T. K., Kaltman, S. J., Kennedy, M., Henckaerts, E., Bonham, K., Abbott, G. W., Linden, R. M., et al. (2008). Human cardiovascular progenitor cells develop from a KDR+ embryonic-stem-cell-derived population. Nature 453, 524-528.

Ye, B., Hou, N., Xiao, L., Xu, Y., Boyer, J., Xu, H., and Li, F. (2015). APC controls asymmetric Wnt/beta-catenin signaling and cardiomyocyte proliferation gradient in the heart. Journal of molecular and cellular cardiology 89, 287-296.

Yin, X., Farin, H. F., van Es, J. H., Clevers, H., Langer, R., and Karp, J. M. (2014). Niche-independent high-purity cultures of Lgr5+ intestinal stem cells and their progeny. Nat Methods 11, 106-112.

Zhang, J., Wilson, G. F., Soerens, A. G., Koonce, C. H., Yu, J., Palecek, S. P., Thomson, J. A., and Kamp, T. J. (2009). Functional cardiomyocytes derived from human induced pluripotent stem cells. Circulation research 104, e30-41.

Zhang, Y., Cao, N., Huang, Y., Spencer, C. I., Fu, J. D., Yu, C., Liu, K., Nie, B., Xu, T., Li, K., et al. (2016). Expandable Cardiovascular Progenitor Cells Reprogrammed from Fibroblasts. Cell stem cell 18, 368-381.

Sharma, A., Zhang, Y. & Wu, S. M. Harnessing the Induction of Cardiomyocyte Proliferation for Cardiac Regenerative Medicine. Current treatment options in cardiovascular medicine 17, 404, doi:10.1007/s11936-015-0404-z (2015).

Bergmann, O. et al. Evidence for cardiomyocyte renewal in humans. Science 324, 98-102, doi:10.1126/science.1164680 (2009).

Chuang, W. et al. Partial Reprogramming of Pluripotent Stem Cell-Derived Cardiomyocytes into Neurons. Scientific reports 7, 44840, doi:10.1038/srep44840 (2017).

Laflamme, M. A. & Murry, C. E. Heart regeneration. Nature 473, 326-335, doi:10.1038/nature10147 (2011).

Serpooshan, V. et al. Nkx2.5+ Cardiomyoblasts Contribute to Cardiomyogenesis in the Neonatal Heart. Sci Rep 7, 12590, doi:10.1038/s41598-017-12869-4 (2017).

Li, G. et al. Transcriptomic Profiling Maps Anatomically Patterned Subpopulations among Single Embryonic Cardiac Cells. *Dev Cell* 39, 491-507, doi:10.1016/j.devcel.2016.10.014 (2016).

Lian, X. et al. Robust cardiomyocyte differentiation from human pluripotent stem cells via temporal modulation of canonical Wnt signaling. *Proc Natl Acad Sci USA* 109, E1848-1857, doi:10.1073/pnas.1200250109 (2012).

Sharma, A. et al. CRISPR/Cas9-Mediated Fluorescent Tagging of Endogenous Proteins in Human Pluripotent Stem Cells. *Current protocols in human genetics* 96, 21 11 21-21 11 20, doi:10.1002/cphg.52 (2018).

Sharma, A., Toepfer, C. N., Schmid, M., Garfinkel, A. C. & Seidman, C. E. Differentiation and Contractile Analysis of GFP-Sarcomere Reporter hiPSC-Cardiomyocytes. *Cur-* rent protocols in human genetics 96, 21 12 21-21 12 12, doi:10.1002/cphg.53 (2018).

Burridge, P. W. et al. Chemically defined generation of human cardiomyocytes. *Nature methods* 11, 855-860, doi:10.1038/nmeth.2999 (2014).

Lian, X. et al. Directed cardiomyocyte differentiation from human pluripotent stem cells by modulating Wnt/beta-catenin signaling under fully defined conditions. *Nat Protoc* 8, 162-175, doi:10.1038/nprot.2012.150 (2013).

Kleger, A., Liebau, S., Lin, Q., von Wichert, G. & Seufferlein, T. The impact of bioactive lipids on cardiovascular development. *Stem cells international* 2011, 916180, doi:10.4061/2011/916180 (2011).

Clay, H. et al. Sphingosine 1-phosphate receptor-1 in cardiomyocytes is required for normal cardiac development. *Dev Biol* 418, 157-165, doi:10.1016/j.ydbio.2016.06.024 (2016).

Avery, K., Avery, S., Shepherd, J., Heath, P. R. & Moore, H. Sphingosine-1-phosphate mediates transcriptional regulation of key targets associated with survival, proliferation, and pluripotency in human embryonic stem cells. *Stem cells and development* 17, 1195-1205, doi:10.1089/scd.2008.0063 (2008).

Garcia-Gonzalo, F. R. & Izpisua Belmonte, J. C. Albumin-associated lipids regulate human embryonic stem cell self-renewal. *PloS one* 3, e1384, doi:10.1371/journal.pone.0001384 (2008).

Pebay, A., Bonder, C. S. & Pitson, S. M. Stem cell regulation by lysophospholipids. *Prostaglandins Other Lipid Mediat* 84, 83-97, doi:10.1016/j.prostaglandins.2007.08.004 (2007).

Harvey, K. F., Zhang, X. & Thomas, D. M. The Hippo pathway and human cancer. *Nat Rev Cancer* 13, 246-257, doi:10.1038/nrc3458 (2013).

Marinissen, M. J. & Gutkind, J. S. G-protein-coupled receptors and signaling networks: emerging paradigms. *Trends Pharmacol Sci* 22, 368-376 (2001).

Oskouian, B. & Saba, J. Sphingosine-1-phosphate metabolism and intestinal tumorigenesis: lipid signaling strikes again. *Cell Cycle* 6, 522-527, doi:10.4161/cc.6.5.3903 (2007).

Yang, M. et al. G protein-coupled lysophosphatidic acid receptors stimulate proliferation of colon cancer cells through the {beta}-catenin pathway. *Proceedings of the National Academy of Sciences of the United States of America* 102, 6027-6032, doi:10.1073/pnas.0501535102 (2005).

Churko, J. M., Burridge, P. W. & Wu, J. C. Generation of human iPSCs from human peripheral blood mononuclear cells using non-integrative Sendai virus in chemically defined conditions. *Methods in molecular biology* 1036, 81-88, doi:10.1007/978-1-62703-511-8_7 (2013).

Kam, Y. & Quaranta, V. Cadherin-bound beta-catenin feeds into the Wnt pathway upon adherens junctions dissociation: evidence for an intersection between beta-catenin pools. *PloS one* 4, e4580, doi:10.1371/journal.pone.0004580 (2009).

Veeman, M. T., Slusarski, D. C., Kaykas, A., Louie, S. H. & Moon, R. T. Zebrafish prickle, a modulator of noncanonical Wnt/Fz signaling, regulates gastrulation movements. *Curr Biol* 13, 680-685 (2003).

Paige, S. L. et al. Endogenous Wnt/beta-catenin signaling is required for cardiac differentiation in human embryonic stem cells. *PloS one* 5, e11134, doi:10.1371/journal.pone.0011134 (2010).

Mendez, M. G., Kojima, S. & Goldman, R. D. Vimentin induces changes in cell shape, motility, and adhesion during the epithelial to mesenchymal transition. *FASEB journal: official publication of the Federation of American Societies for Experimental Biology* 24, 1838-1851, doi:10.1096/fj.0.09-151639 (2010).

Buikema, J. W. et al. Wnt/beta-catenin signaling directs the regional expansion of first and second heart field-derived ventricular cardiomyocytes. *Development* 140, 4165-4176, doi:10.1242/dev.099325 (2013).

Mills, R. J. et al. Functional screening in human cardiac organoids reveals a metabolic mechanism for cardiomyocyte cell cycle arrest. *Proceedings of the National Academy of Sciences of the United States of America*, doi:10.1073/pnas.1707316114 (2017).

Sharma, A. et al. Derivation of highly purified cardiomyocytes from human induced pluripotent stem cells using small molecule-modulated differentiation and subsequent glucose starvation. *Journal of visualized experiments: JOVE*, doi:10.3791/52628 (2015).

Titmarsh, D. M. et al. Induction of Human iPSC-Derived Cardiomyocyte Proliferation Revealed by Combinatorial Screening in High Density Microbioreactor Arrays. *Scientific reports* 6, 24637, doi:10.1038/srep24637 (2016).

Yusuf, S. W., Sharma, J., Durand, J. B. & Banchs, J. Endocarditis and myocarditis: a brief review. *Expert review of cardiovascular therapy* 10, 1153-1164, doi:10.1586/erc.12.107 (2012).

Heallen, T. et al. Hippo pathway inhibits Wnt signaling to restrain cardiomyocyte proliferation and heart size. *Science* 332, 458-461, doi:10.1126/science.1199010 (2011).

Morikawa, Y., Heallen, T., Leach, J., Xiao, Y. & Martin, J. F. Dystrophin-glycoprotein complex sequesters Yap to inhibit cardiomyocyte proliferation. *Nature* 547, 227-231, doi:10.1038/nature22979 (2017).

Leach, J. P. et al. Hippo pathway deficiency reverses systolic heart failure after infarction. *Nature* 550, 260-264, doi:10.1038/nature24045 (2017).

von Gise, A. et al. YAP1, the nuclear target of Hippo signaling, stimulates heart growth through cardiomyocyte proliferation but not hypertrophy. *Proceedings of the National Academy of Sciences of the United States of America* 109, 2394-2399, doi:10.1073/pnas.1116136109 (2012).

Zhang, W. & Liu, H. T. MAPK signal pathways in the regulation of cell proliferation in mammalian cells. *Cell research* 12, 9-18, doi:10.1038/sj.cr.7290105 (2002).

Kim, K. B. et al. Phase II study of the MEK1/MEK2 inhibitor Trametinib in patients with metastatic BRAF-mutant cutaneous melanoma previously treated with or without a BRAF inhibitor. *Journal of clinical oncology: official journal of the American Society of Clinical Oncology* 31, 482-489, doi:10.1200/JCO.2012.43.5966 (2013).

Davis, M. D., Clemens, J. J., Macdonald, T. L. & Lynch, K. R. Sphingosine 1-phosphate analogs as receptor antagonists. *The Journal of biological chemistry* 280, 9833-9841, doi:10.1074/jbc.M412356200 (2005).

Hannun, Y. A. & Obeid, L. M. Principles of bioactive lipid signalling: lessons from sphingolipids. *Nature reviews. Molecular cell biology* 9, 139-150, doi:10.1038/nrm2329 (2008).

Lamouille, S., Xu, J. & Derynck, R. Molecular mechanisms of epithelial-mesenchymal transition. *Nature reviews. Molecular cell biology* 15, 178-196, doi:10.1038/nrm3758 (2014).

Burkhalter, R. J., Westfall, S. D., Liu, Y. & Stack, M. S. Lysophosphatidic Acid Initiates Epithelial to Mesenchymal Transition and Induces beta-Catenin-mediated Transcription in Epithelial Ovarian Carcinoma. *The Journal of biological chemistry* 290, 22143-22154, doi:10.1074/jbc.M115.641092 (2015).

McMullen, M. E., Bryant, P. W., Glembotski, C. C., Vincent, P. A. & Pumiglia, K. M. Activation of p38 has opposing effects on the proliferation and migration of endothelial cells. *The Journal of biological chemistry* 280, 20995-21003, doi:10.1074/jbc.M407060200 (2005).

Lin, Z. et al. Pi3kcb links Hippo-YAP and PI3K-AKT signaling pathways to promote cardiomyocyte proliferation and survival. *Circulation research* 116, 35-45, doi: 10.1161/CIRCRESAHA.115.304457 (2015).

Bassat, E. et al. The extracellular matrix protein agrin promotes heart regeneration in mice. *Nature* 547, 179-184, doi:10.1038/nature22978 (2017).

Tohyama, S. et al. Distinct metabolic flow enables large-scale purification of mouse and human pluripotent stem cell-derived cardiomyocytes. *Cell stem cell* 12, 127-137, doi:10.1016/j.stem.2012.09.013 (2013).

Sharma, A. et al. Human induced pluripotent stem cell-derived cardiomyocytes as an in vitro model for coxsackievirus B3-induced myocarditis and antiviral drug screening platform. *Circulation research* 115, 556-566, doi: 10.1161/CIRCRESAHA.115.303810 (2014).

Schmittgen, T. D. & Livak, K. J. Analyzing real-time PCR data by the comparative C(T) method. *Nat Protoc* 3, 1101-1108 (2008).

What is claimed is:

1. A method for expanding beating cardiomyocytes, the method comprising treating in vitro the beating cardiomyocytes with a combination of:
   a WNT agonist; and
   a bioactive lipid comprising sphingosine-1-phosphate (S1P) and lysophosphatidic acid (LPA);
   wherein treating in vitro the beating cardiomyocytes with the combination of the WNT agonist and the bioactive lipid induces proliferation of the beating cardiomyocytes and increases a number of the beating cardiomyocytes in comparison to a method in which beating cardiomyocytes are treated with the WNT agonist without the bioactive lipid.

2. The method of claim 1, wherein the beating cardiomyocytes are human cardiomyocytes.

3. The method of claim 1, wherein the method further comprises, prior to the step of treating the beating cardiomyocytes, a step of differentiating pluripotent stem cells into the beating cardiomyocytes.

4. The method of claim 3, wherein the pluripotent stem cells are embryonic stem cells, cardiomyocyte progenitor cells and/or induced pluripotent stem (iPS) cells.

5. The method of claim 1, wherein the beating cardiomyocytes are treated during a period of time from 1 day to 120 days.

6. A method for obtaining human cardiomyocytes, the method comprising:
   differentiating hiPS cells into beating cardiomyocytes via a biphasic Wnt signalling protocol, wherein
   a) the hiPS cells are treated with at least one Wnt agonist and a bioactive lipid comprising sphingosine-1-phosphate (S1P) and lysophosphatidic acid (LPA) at any time during a first phase of the biphasic Wnt signalling protocol; and
   b) after step a), the hiPS cells are further treated with at least one-Wnt antagonist during a second phase of the biphasic Wnt signalling protocol, and thereby obtaining the beating cardiomyocytes; and
   after step b), expanding the beating cardiomyocytes by treating in vitro the beating cardiomyocytes with the bioactive lipid comprising sphingosine-1-phosphate (S1P) and lysophosphatidic acid (LPA), and at least one Wnt agonist;
   wherein treating in vitro the beating cardiomyocytes with the combination of the WNT agonist and the bioactive lipid induces proliferation of the beating cardiomyocytes and increases a number of the beating cardiomyocytes in comparison to a method in which beating cardiomyocytes are treated with the WNT agonist without the bioactive lipid.

7. The method of claim 1, wherein the beating cardiomyocytes are treated with one or more of the following WNT agonists: CHIR99021, BIO, Wnt3A, Wnt3A plus R-spondin, Wnt surrogate ScFv-DKK1c, ScFv-DKK1c plus R-spondin, or any combination thereof.

8. The method of claim 1, wherein the beating cardiomyocytes are treated with:
   sphingosine-1-phosphate (S1P) in a concentration from 1 to 50 µM,
   lysophosphatidic acid (LPA) in a concentration from 1 to 50 µM, and
   the WNT agonist selected from CHIR99021 and BIO in a concentration from 1 to 50 µM.

9. The method of claim 6, wherein in step a) the hiPS cells are treated with at the least one Wnt agonist and the bioactive lipid between days 0-2 of the first phase of the biphasic Wnt signalling protocol.

* * * * *